US012753940B2

(12) United States Patent
Malik et al.

(10) Patent No.: US 12,753,940 B2
(45) Date of Patent: Oct. 6, 2026

(54) ENVIRONMENTAL ADJUSTMENT USING ARTIFICIAL INTELLIGENCE

(71) Applicant: View, Inc., Milpitas, CA (US)

(72) Inventors: Ajay Malik, Milpitas, CA (US); Mingzhu Lu, Temple Terrace, FL (US); Keivan Ebrahimi, Fremont, CA (US); Luis Miguel Candanedo Ibarra, San Jose, CA (US); Bhabani Sankar Nayak, Fremont, CA (US); Anurag Gupta, San Jose, CA (US); Nitesh Trikha, Pleasanton, CA (US); Brandon Dillan Tinianov, Santa Clara, CA (US); Aditya Dayal, Sunnyvale, CA (US)

(73) Assignee: View Operating Corporation, San Jose, CA (US)

( * ) Notice: Subject to any disclaimer, the term of this patent is extended or adjusted under 35 U.S.C. 154(b) by 505 days.

(21) Appl. No.: 17/924,105

(22) PCT Filed: May 21, 2021

(86) PCT No.: PCT/US2021/033544

§ 371 (c)(1),
(2) Date: Nov. 8, 2022

(87) PCT Pub. No.: WO2021/237019

PCT Pub. Date: Nov. 25, 2021

(65) Prior Publication Data

US 2023/0194115 A1 Jun. 22, 2023

Related U.S. Application Data

(63) Continuation-in-part of application No. PCT/US2021/030798, filed on May 5, 2021, and a (Continued)

(51) Int. Cl.
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
CPC . F24F 11/63; G05B 19/042; G05B 2219/2614
See application file for complete search history.

(56) References Cited

U.S. PATENT DOCUMENTS

| | | | |
|---|---|---|---|
| 4,340,813 | A | 7/1982 | Sauer |
| 5,729,824 | A | 3/1998 | O'Neill et al. |

(Continued)

FOREIGN PATENT DOCUMENTS

| | | | |
|---|---|---|---|
| AU | 2015101660 | A4 | 12/2015 |
| CN | 103119845 | A | 5/2013 |

(Continued)

OTHER PUBLICATIONS

Alarifi, A. et al., "Ultra Wideband Indoor Positioning Technologies: Analysis and Recent Advances", Sensors, May 16, 2016, vol. 16 No. 5, pp. 1-36.

(Continued)

*Primary Examiner* — Michael W Choi
(74) *Attorney, Agent, or Firm* — Cha & Reiter, LLC

(57) ABSTRACT

Changing environmental characteristics of an enclosure are controlled to promote health, wellness, and/or performance for occupant(s) of the enclosure using sensor data, three dimensional modeling, physical properties of the enclosure, and machine learning (e.g., Artificial Intelligence).

20 Claims, 19 Drawing Sheets

Related U.S. Application Data continuation-in-part of application No. 16/447,169, filed on Jun. 20, 2019, now Pat. No. 11,743,071, and a continuation-in-part of application No. PCT/US2021/015378, filed on Jan. 28, 2021, and a continuation-in-part of application No. 16/950,774, filed on Nov. 17, 2020, now abandoned, which is a continuation of application No. 16/608,157, filed as application No. PCT/US2018/029476 on Apr. 25, 2018, now Pat. No. 11,886,089, said application No. PCT/US2021/033544 is a continuation-in-part of application No. 17/083,128, filed on Oct. 28, 2020, now abandoned, which is a continuation of application No. 16/664,089, filed on Oct. 25, 2019, now Pat. No. 11,294,254, which is a continuation-in-part of application No. PCT/US2019/030467, filed on May 2, 2019, said application No. 17/083,128 is a continuation-in-part of application No. PCT/US2018/029460, filed on Apr. 25, 2018, said application No. PCT/US2021/033544 is a continuation-in-part of application No. 17/081,809, filed on Oct. 27, 2020, now Pat. No. 11,460,749, which is a continuation of application No. 16/608,159, filed as application No. PCT/US2018/029406 on Apr. 25, 2018, now Pat. No. 11,300,849.

(60) Provisional application No. 63/029,301, filed on May 22, 2020, provisional application No. 63/033,474, filed on Jun. 2, 2020, provisional application No. 63/079,851, filed on Sep. 17, 2020, provisional application No. 63/034,792, filed on Jun. 4, 2020, provisional application No. 63/020,819, filed on May 6, 2020, provisional application No. 62/688,957, filed on Jun. 22, 2018, provisional application No. 62/858,100, filed on Jun. 6, 2019, provisional application No. 62/803,324, filed on Feb. 8, 2019, provisional application No. 62/768,775, filed on Nov. 16, 2018, provisional application No. 62/967,204, filed on Jan. 29, 2020, provisional application No. 62/607,618, filed on Dec. 19, 2017, provisional application No. 62/523,606, filed on Jun. 22, 2017, provisional application No. 62/507,704, filed on May 17, 2017, provisional application No. 62/506,514, filed on May 15, 2017, provisional application No. 62/490,457, filed on Apr. 26, 2017, provisional application No. 62/666,033, filed on May 2, 2018.

(56) References Cited

U.S. PATENT DOCUMENTS 6,104,513 A 8/2000 Bloom
6,588,250 B2 7/2003 Schell
6,897,936 B1 5/2005 Li et al.
6,965,813 B2 11/2005 Granqvist et al.
7,031,727 B2 4/2006 Baskin
7,111,952 B2 9/2006 Veskovic
7,310,355 B1 12/2007 Krein et al.
7,382,636 B2 6/2008 Baarman et al.
7,554,437 B2 6/2009 Axelsen
7,588,067 B2 9/2009 Veskovic
7,629,400 B2 12/2009 Hyman
7,911,348 B2 3/2011 Rodgers
7,950,827 B2 5/2011 Veskovic
7,963,675 B2 6/2011 Veskovic
8,022,977 B2 9/2011 Kanade et al.
8,086,433 B2 12/2011 Lee et al.
8,249,731 B2 8/2012 Tran et al.
8,705,162 B2 4/2014 Brown et al.
8,711,465 B2 4/2014 Bhatnagar et al.
8,927,069 B1 1/2015 Estinto et al.
9,121,837 B2 9/2015 Chan et al.
9,551,913 B2 1/2017 Kim et al.
9,715,242 B2 7/2017 Pillai et al.
9,898,912 B1 2/2018 Jordan, II et al.
9,965,865 B1 5/2018 Agrawal et al.
10,156,852 B2 12/2018 Bakhishev et al.
10,178,638 B1 1/2019 Stamatakis et al.
10,289,094 B2 5/2019 Ashdown et al.
10,322,680 B2 6/2019 Terashima et al.
10,488,837 B2 11/2019 Cirino
10,724,867 B1 7/2020 Waful et al.
10,867,266 B1 12/2020 Carlin et al.
10,917,259 B1 2/2021 Chein et al.
10,921,675 B2 2/2021 Barnum et al.
10,923,226 B2 2/2021 Macary et al.
10,954,677 B1 3/2021 Scanlin
10,982,487 B2 4/2021 Ramirez
2003/0039257 A1 2/2003 Manis et al.
2003/0163351 A1 8/2003 Brown et al.
2003/0227663 A1 12/2003 Agrawal et al.
2005/0002662 A1 1/2005 Arpa et al.
2005/0063036 A1 3/2005 Bechtel et al.
2005/0157675 A1 7/2005 Feder et al.
2005/0213992 A1 9/2005 Piehler
2006/0074494 A1 4/2006 McFarland
2006/0270440 A1 11/2006 Shearer et al.
2007/0067048 A1 3/2007 Bechtel et al.
2007/0191074 A1 8/2007 Harrist et al.
2007/0222542 A1 9/2007 Joannopoulos et al.
2008/0182506 A1 7/2008 Jackson et al.
2008/0277486 A1 11/2008 Seem et al.
2009/0210252 A1 8/2009 Silver
2009/0322347 A1 12/2009 Hashimshony et al.
2010/0188057 A1 7/2010 Tarng
2010/0243427 A1 9/2010 Kozlowski et al.
2010/0245973 A1 9/2010 Wang et al.
2010/0315693 A1 12/2010 Lam et al.
2011/0050756 A1 3/2011 Cassidy et al.
2011/0148218 A1 6/2011 Rozbicki
2011/0266137 A1 11/2011 Wang et al.
2011/0266138 A1 11/2011 Wang et al.
2011/0267674 A1 11/2011 Wang et al.
2011/0267675 A1 11/2011 Wang et al.
2011/0310519 A1 12/2011 Baba et al.
2012/0032855 A1 2/2012 Reede et al.
2012/0033287 A1 2/2012 Friedman et al.
2012/0039526 A1 2/2012 Garaas et al.
2012/0062975 A1 3/2012 Mehtani et al.
2012/0112883 A1 5/2012 Wallace et al.
2012/0133315 A1 5/2012 Berman et al.
2012/0143516 A1 6/2012 Mezic et al.
2012/0239209 A1 9/2012 Brown et al.
2012/0296610 A1 11/2012 Hailemariam et al.
2013/0057937 A1 3/2013 Berman et al.
2013/0073681 A1 3/2013 Jiang et al.
2013/0130227 A1 5/2013 Peltz et al.
2013/0226353 A1 8/2013 Park
2013/0250422 A1 9/2013 Tandler
2013/0271814 A1 10/2013 Brown
2013/0277539 A1 10/2013 Smilansky et al.
2014/0007244 A1 1/2014 Martin et al.
2014/0101573 A1 4/2014 Kuo
2014/0236323 A1 8/2014 Brown et al.
2014/0247475 A1 9/2014 Parker et al.
2014/0300945 A1 10/2014 Parker
2014/0317514 A1 10/2014 Bokotey
2014/0368899 A1 12/2014 Greer
2015/0032264 A1 1/2015 Emmons et al.
2015/0070745 A1 3/2015 Pradhan
2015/0106121 A1 4/2015 Muhsin et al.
2015/0116811 A1 4/2015 Shrivastava et al.
2015/0122474 A1 5/2015 Petersen
2015/0195644 A1 7/2015 Wilson et al.
2015/0255651 A1 9/2015 Barr et al.
2015/0270823 A1 9/2015 Sobolewski
2015/0323915 A1 11/2015 Warren et al.
2015/0327010 A1 11/2015 Gottschalk et al.

(56) References Cited

U.S. PATENT DOCUMENTS

| | | | |
|---|---|---|---|
| 2015/0362819 A1 | 12/2015 | Bjornard et al. | |
| 2015/0378715 A1 | 12/2015 | Solnit et al. | |
| 2016/0071183 A1 | 3/2016 | Joshi et al. | |
| 2016/0091769 A1 | 3/2016 | Rozbicki | |
| 2016/0134932 A1 | 5/2016 | Karp et al. | |
| 2016/0210711 A1 | 7/2016 | Krupa et al. | |
| 2016/0231755 A1 | 8/2016 | Ajax et al. | |
| 2016/0261837 A1 | 9/2016 | Thompson et al. | |
| 2016/0285416 A1* | 9/2016 | Tiwari | H02S 50/15 |
| 2016/0376831 A1 | 12/2016 | Plummer | |
| 2017/0010880 A1 | 1/2017 | Yamazaki | |
| 2017/0039339 A1 | 2/2017 | Bitran et al. | |
| 2017/0061037 A1* | 3/2017 | Makem | G06F 30/23 |
| 2017/0075183 A1 | 3/2017 | Brown | |
| 2017/0080341 A1 | 3/2017 | Mao et al. | |
| 2017/0082903 A1 | 3/2017 | Vigano et al. | |
| 2017/0085834 A1 | 3/2017 | Kim et al. | |
| 2017/0122802 A1 | 5/2017 | Brown et al. | |
| 2017/0146884 A1 | 5/2017 | Vigano et al. | |
| 2017/0161911 A1 | 6/2017 | Kumar et al. | |
| 2017/0248564 A1 | 8/2017 | Miyajima | |
| 2017/0264865 A1 | 9/2017 | Huangfu | |
| 2017/0276542 A1 | 9/2017 | Klawuhn et al. | |
| 2017/0374255 A1 | 12/2017 | Campbell et al. | |
| 2017/0374437 A1 | 12/2017 | Schwarzkopf et al. | |
| 2018/0090992 A1 | 3/2018 | Shrivastava et al. | |
| 2018/0119973 A1 | 5/2018 | Rothman et al. | |
| 2018/0129172 A1 | 5/2018 | Shrivastava et al. | |
| 2018/0130455 A1 | 5/2018 | Plummer et al. | |
| 2018/0139517 A1 | 5/2018 | Schwartz et al. | |
| 2018/0153454 A1 | 6/2018 | Hayter et al. | |
| 2018/0156484 A1 | 6/2018 | Kim et al. | |
| 2018/0181085 A1 | 6/2018 | Gabriel et al. | |
| 2018/0187484 A1 | 7/2018 | Hebeisen et al. | |
| 2018/0195752 A1 | 7/2018 | Sasaki et al. | |
| 2018/0225585 A1 | 8/2018 | Dong et al. | |
| 2018/0259373 A1 | 9/2018 | Staton et al. | |
| 2018/0269974 A1 | 9/2018 | Luciano | |
| 2018/0306609 A1 | 10/2018 | Agarwal et al. | |
| 2018/0307114 A1 | 10/2018 | Brown et al. | |
| 2018/0321042 A1 | 11/2018 | Brewer et al. | |
| 2018/0349710 A1 | 12/2018 | Houri et al. | |
| 2018/0364654 A1 | 12/2018 | Locke et al. | |
| 2019/0025661 A9 | 1/2019 | Brown et al. | |
| 2019/0049812 A1 | 2/2019 | Brown | |
| 2019/0058977 A1 | 2/2019 | Gherardi et al. | |
| 2019/0097827 A1 | 3/2019 | Angle et al. | |
| 2019/0178511 A1 | 6/2019 | Zimmerman et al. | |
| 2019/0205774 A1 | 7/2019 | Ba et al. | |
| 2019/0215932 A1* | 7/2019 | Ashdown | H05B 45/20 |
| 2019/0229768 A1 | 7/2019 | Jeremy et al. | |
| 2019/0257143 A1 | 8/2019 | Nagel et al. | |
| 2019/0317458 A1 | 10/2019 | Shrivastava et al. | |
| 2019/0324431 A1 | 10/2019 | Cella et al. | |
| 2019/0354071 A1 | 11/2019 | Turney et al. | |
| 2019/0356508 A1 | 11/2019 | Trikha et al. | |
| 2020/0026141 A1 | 1/2020 | Brown et al. | |
| 2020/0041967 A1 | 2/2020 | Shrivastava et al. | |
| 2020/0045261 A1 | 2/2020 | Lim et al. | |
| 2020/0090089 A1 | 3/2020 | Aston et al. | |
| 2020/0096775 A1 | 3/2020 | Franklin et al. | |
| 2020/0103841 A1 | 4/2020 | Pillai et al. | |
| 2020/0176125 A1 | 6/2020 | Chatterjea et al. | |
| 2020/0193155 A1 | 6/2020 | Keohane et al. | |
| 2020/0227159 A1 | 7/2020 | Boisvert et al. | |
| 2021/0021788 A1 | 1/2021 | Mcnelley et al. | |
| 2021/0210053 A1 | 7/2021 | Ng et al. | |
| 2021/0375440 A1 | 12/2021 | Schlameuss et al. | |
| 2021/0383804 A1 | 12/2021 | Makker et al. | |
| 2021/0390953 A1 | 12/2021 | Makker et al. | |
| 2022/0231396 A1 | 7/2022 | Rozbicki et al. | |

FOREIGN PATENT DOCUMENTS

| | | | |
|---|---|---|---|
| CN | 203019761 | U | 6/2013 |
| CN | 103649826 | A | 3/2014 |
| EP | 0917667 | A1 | 5/1999 |
| EP | 2090961 | A1 | 8/2009 |
| EP | 3299957 | A1 | 3/2018 |
| EP | 3328000 | A1 | 5/2018 |
| JP | H0611477 | A | 1/1994 |
| JP | H06308073 | A | 11/1994 |
| KR | 20120092921 | A | 8/2012 |
| KR | 20170121858 | A | 11/2017 |
| KR | 20170134321 | A | 12/2017 |
| KR | 20180012615 | A | 2/2018 |
| TW | I607269 | B | 12/2017 |
| WO | WO-02054086 | A1 | 7/2002 |
| WO | WO-2013121103 | A1 | 8/2013 |
| WO | WO-2014032023 | A1 | 2/2014 |
| WO | WO-2014209812 | A1 | 12/2014 |
| WO | WO-2015100419 | A1 | 7/2015 |
| WO | WO-2015113592 | A1 | 8/2015 |
| WO | WO-2016054112 | A1 | 5/2016 |
| WO | WO-2016072620 | A1 | 5/2016 |
| WO | WO-2016085964 | A1 | 6/2016 |
| WO | WO-2017007841 | A1 | 1/2017 |
| WO | WO-2017058568 | A1 | 4/2017 |
| WO | WO-2017075472 | A1 | 5/2017 |
| WO | WO-2017120262 | A1 | 7/2017 |
| WO | WO-2017192881 | A1 | 11/2017 |
| WO | WO-2018039080 | A1 | 3/2018 |
| WO | WO-2018063919 | A1 | 4/2018 |
| WO | WO-2018102103 | A1 | 6/2018 |
| WO | WO-2018200702 | A1 | 11/2018 |
| WO | WO-2018200740 | A2 | 11/2018 |
| WO | WO-2018200752 | A1 | 11/2018 |
| WO | WO-2019178282 | A1 | 9/2019 |
| WO | WO-2019213441 | A1 | 11/2019 |
| WO | WO-2020243690 | A1 | 12/2020 |
| WO | WO-2021211798 | A1 | 10/2021 |

OTHER PUBLICATIONS

Chan, E.C.L, et al., "Effect of Channel Interference on Indoor Wireless Local Area Network Positioning" IEEE 6th International Conference on Wireless and Mobile Computing, Networking and Communications, Oct. 11, 2010, pp. 239-245.

CN Office Action dated Nov. 2, 2022, in ApplicationNo. CN201980042340.1.

CN Office Action dated Mar. 2, 2022 in Application No. CN201980042340.1 with English translation.

Density DPU Technical Specifications v1.0, Density, 2018, downloaded from www.density.io.

Dols, W. Stuart, et al., A tool to model the fate and transport of indoor microbiological aerosols (FaTIMA), NIST Technical Note 2095, National Institute of Standards and Technology, US Department of Commerce, Jun. 2020, 32 pp. https://doi.org/10.6028/NIST.TN.2095.

EP Office action dated Jan. 10, 2022, in Application No. EP19745809.4.

"Halio Rooftop Sensor Kit (Model SR500)," Product Data Sheet, Kinestral Technologies, 2020, 4 pp.

International Preliminary Report on Patentability and written opinion dated Jul. 21, 2022 in Application PCT/US2021/012313.

International Preliminary Report on Patentability dated Oct. 6, 2022 in PCT Application PCT/US2021/023433.

International Search Report and Written Opinion dated Aug. 2, 2022 in Application No. PCT/US2022/030757.

International Search Report and Written Opinion dated Aug. 22, 2022 in Application No. PCT/US2022/024343.

International Search Report and Written Opinion dated Mar. 25, 2022 in Application No. PCT/US2021/062774.

International Search Report and Written Opinion dated Sep. 26, 2022 in Application No. PCT/US2022/032993.

International Preliminary Report on Patentability dated Aug. 11, 2022 in PCT Application No. PCT/US2021/015378.

(56) References Cited

OTHER PUBLICATIONS

International Preliminary Report on Patentability dated Dec. 1, 2022, in PCT Application No. PCT/US2021/033544.
International Preliminary Report on Patentability dated Dec. 9, 2021, in PCT Application No. PCT/US2020/035485.
International Preliminary Report on Patentability dated Dec. 22, 2020 in PCT/US2019/038429.
International Search Report and Written Opinion dated Aug. 8, 2022, in Application No. PCT/US2022/023605.
International Search Report and Written Opinion dated Jul. 6, 2022, in PCT Application No. PCT/US2022/020730.
International Search Report and Written Opinion dated Jun. 23, 2021 in PCT Application No. PCT/US2021/015378.
International Search Report and Written Opinion dated Nov. 10, 2021 in PCT Application No. PCT/US2021/043143.
International Search Report and Written Opinion dated Sep. 1, 2022, in Application No. PCT/US2022/024812.
International Search Report and Written Opinion dated Sep. 16, 2019 in PCT/US2019/038429.
International Search Report and Written Opinion (ISA/EP) dated Sep. 30, 2020 in PCT Application No. PCT/US2020/035485.
Joseph, J., "Xiaomi shows off near perfect Under Screen Camera Technology," Gizchina.com, Aug. 28, 2020, 7 pp., https://www.gizmochina.com/2020/08/28/xiaomi-perfected-third-gen-under-screen-camera-technology-prototype/, retrieved Apr. 21, 2021.
PCT Application No. PCT/US2021/012313 filed Jan. 6, 2021.
PCT Application No. PCT/US2021/015378 filed Jan. 28, 2021.
PCT Application No. PCT/US2021/023433 filed Mar. 23, 2021.
PCT Application No. PCT/US2021/030798 filed May 5, 2021.
PCT Application No. PCT/US2021/052587 filed Sep. 29, 2021.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
TW Office Action dated Jul. 14, 2022, in Application No. TW108121734 with English translation.
TW Office Action dated Mar. 15, 2022, in Application No. TW109112242 with English translation.
U.S Advisory Action dated Aug. 31, 2022 in U.S. Appl. No. 16/447,169.
U.S. Advisory Action dated Apr. 29, 2022 in U.S. Appl. No. 17/328,346.
U.S. Advisory Action dated Dec. 15, 2021 in U.S. Appl. No. 16/447,169.
U.S. Appl. No. 62/958,653, inventors Gopinathanasari et al., filed Jan. 8, 2020.
U.S. Appl. No. 62/993,617, inventors Gupta et al., filed Mar. 23, 2020.
U.S. Appl. No. 63/020,819, inventors Gupta et al., filed May 6, 2020.
U.S. Appl. No. 63/029,301, inventors Gupta et al., filed May 22, 2020.
U.S. Appl. No. 63/033,474, inventors Gupta et al., filed Jun. 2, 2020.
U.S. Appl. No. 63/034,792, inventors Gupta et al., filed Jun. 4, 2020.
U.S. Appl. No. 63/041,002, inventors Gupta et al., filed Jun. 18, 2020.
U.S. Appl. No. 63/057,120, Inventors Gupta et al., filed Jul. 27, 2020.
U.S. Appl. No. 63/069,358, inventors Gupta et al., filed Aug. 24, 2020.
U.S. Appl. No. 63/078,805, Inventors Gupta et al., filed Sep. 15, 2020.
U.S. Appl. No. 63/079,851, inventors Gupta et al., filed Sep. 17, 2020.
U.S. Appl. No. 63/106,058, inventors Rasmus-Vorrath et al., filed Oct. 27, 2020.
U.S. Appl. No. 63/115,886, Inventors Gupta et al., filed Nov. 19, 2020.
U.S. Appl. No. 63/133,725, inventors Gopinathanasari et al., filed Jan. 4, 2021.
U.S. Appl. No. 63/159,814, Inventors Gupta et al., filed Mar. 11, 2021.
U.S. Appl. No. 63/173,759, inventors Rasmus-Vorrath et al., filed Apr. 12, 2021.
U.S. Appl. No. 63/209,362, Inventors Gomez-Martinez et al., filed Jun. 10, 2021.
U.S. Appl. No. 63/233,122, inventors Gupta et al., filed Aug. 13, 2021.
US Final Office Action dated Aug. 13, 2021 in U.S. Appl. No. 16/447,169.
U.S. Final office Action dated Dec. 1, 2021 in U.S. Appl. No. 17/328,346.
U.S. Final Office Action dated Dec. 2, 2022 in U.S. Appl. No. 16/550,052.
US Final Office Action dated Jan. 1, 2021 in U.S. Appl. No. 16/550,052.
U.S. Final Office Action dated Jun. 24, 2022, in U.S. Appl. No. 16/447,169.
US Final Office Action dated Oct. 28, 2021 in U.S. Appl. No. 16/550,052.
U.S. Non Final office Action dated Sep. 2, 2021 in U.S. Appl. No. 17/328,346.
U.S. Non-Final office Action dated Jul. 22, 2022 in U.S. Appl. No. 17/328,346.
U.S. Non-Final office Action dated Nov. 15, 2022 in U.S. Appl. No. 16/447,169.
U.S. Non-Final Office Action dated Mar. 25, 2022, in U.S. Appl. No. 16/550,052.
US Office Action dated Jan. 25, 2021 in U.S. Appl. No. 16/447,169.
US Office Action dated May 5, 2021 in U.S. Appl. No. 16/550,052.
US Office Action dated Sep. 18, 2020 in U.S. Appl. No. 16/550,052.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/171,871, inventors Gomez-Martinez et al., filed Apr. 7, 2021.
U.S. Appl. No. 63/181,648, inventors Makker et al., filed Apr. 29, 2021.
U.S. Pat. Appl. No. PCT/US2021/017946, filed on Feb. 12, 2021.
U.S. Appl. No. 63/212,483, inventors Martinson et al., filed Jun. 18, 2021.
U.S. Appl. No. 63/246,770, Inventors Martinson et al., filed Sep. 21, 2021.
U.S. Appl. No. 17/759,709, Inventors Trikha et al., filed Jul. 28, 2022.
U.S. Appl. No. 17/791,507, inventors Gopinathanasari et al., filed Jul. 7, 2022.
U.S. Appl. No. 17/910,722, inventor Trikha et al., filed Sep. 9, 2022.
US Preliminary Amendment dated Apr. 6, 2020 in U.S. Appl. No. 16/550,052.
US Preliminary Amendment dated Nov. 13, 2019 in U.S. Appl. No. 16/447,169.

* cited by examiner

ENVIRONMENTAL ADJUSTMENT USING ARTIFICIAL INTELLIGENCE

RELATED APPLICATIONS

An Application Data Sheet is filed concurrently with this specification as part of the present application. Each application that the present application claims benefit of or priority to as identified in the concurrently filed Application Data Sheet is incorporated herein by reference in its entirety and for all purposes. This application is also related to: International Patent Application Serial No. PCT/US21/17603, filed Feb. 11, 2021, titled "PREDICTIVE MODELING FOR TINTABLE WINDOWS." U.S. patent application Ser. No. 17/250,586, filed Feb. 5, 2021, titled "CONTROL METHODS AND SYSTEMS USING EXTERNAL 3D MODELING AND NEURAL NETWORKS," and to U.S. patent application Ser. No. 16/982,535, filed Sep. 18, 2020, titled "CONTROL METHODS AND SYSTEMS USING EXTERNAL 3D MODELING AND SCHEDULE-BASED COMPUTING." each of which patent applications is incorporated herein by reference in its entirety and for all purposes.

BACKGROUND

Occupants of an enclosure (e.g., facility, building, or office) may benefit from certain environmental characteristic(s). For example, health, wellness and/or performance of an individual in an environment of an enclosure may be improved when the environment is adjusted, e.g., in terms of environmental characteristics such as light, (e.g., visual comfort), heat (e.g., thermal comfort), air quality, noise (e.g., noise privacy), carbon dioxide level, VOC, humidity, potential pathogen load, ventilation, and the like. The environmental characteristic(s) can be adjusted to match requested comfort, health, and/or safety standards. The enclosure may include a workplace, a hospital, a transit hub, a building, a vehicle, or a facility. Conventional sensor feedback to environmental inputs, such as HVAC systems, may not be sufficient to achieve this objective. For instance, such sensor feedback does not consider the ever-changing environmental conditions such as people count and/or activities within the enclosure. For instance, a traditional sensor network may not consider the use case and/or occupant behaviors that can led to sub-optimal, unhealthy, and/or dangerous conditions including, e.g., occupant proximity, pathogen load, increased viral exposure, visual glare, thermal discomfort, and/or reduced privacy. In some instances, it may be difficult and/or expensive to provide sensor placement at a sufficiently high density to accurately characterize the sensed environmental conditions for all locations of interest within the enclosure.

SUMMARY

Various aspects disclosed herein alleviate at least part of the shortcomings related to monitoring and adjustment of environmental characteristic(s) of an enclosure.

Various aspects disclosed herein may relate to the environmental characteristic(s) of an enclosure and its control (e.g., monitor and/or adjustment). Environmental characteristics of an enclosure can be monitored and adjusted to promote enhanced health, wellness, reduced illness and/or contamination risk, and/or performance of the enclosure occupant(s). The control may utilize machine learning. The machine learning may include at least one Artificial Intelligence (AI) engine. The environmental characteristic(s) can be monitored by one or more sensors disposed in the enclosure. Models can be constructed using baseline readings from the sensors, three-dimensional (abbreviated herein as "3D") schematics of the enclosure, and/or physical properties (e.g., material properties and/or configuration) of fixture(s) of the enclosure. A control system can use the AI engine to refine the models using sensor readings of the enclosure environment, to monitor and adjust the environment of the enclosure. The AI engine can refine the model(s), e.g., using predictive extrapolation based at least in part on trend, and/or expected physical parameters. The environment may be adjusted, e.g., by administering environmental adjustments of various devices (e.g., lighting; heating, ventilation, and air conditioning system, abbreviated herein as "HVAC") adjustments directly, and/or by using a Building Management System (abbreviated herein as "BMS"). The AI modeling of the enclosure may include usage of locations on a grid. The grid may be adjustable. The grid may have a higher spatial resolution than the spacing of the sensors. The grid may have constant resolution or varied resolution on some of its portions. The grid may be homogenous or non-homogenous.

In another aspect, a method of environmental adjustment, the method comprises: (a) generating a virtual enclosure model for a physical enclosure using (i) a virtual representation of the physical enclosure, (ii) a virtual grid of vertex points, and (iii) one or more material properties of the physical enclosure; (b) using the virtual enclosure model to generate a map of one or more environmental characteristics of the physical enclosure; and (c) using the map to control the one or more environmental characteristics of the physical enclosure.

In some embodiments, the method further comprises receiving a selection of a first vertex point from the virtual grid as a first point of interest. In some embodiments, the method further comprises analyzing the one or more environmental characteristics at the first vertex point and at a second vertex point of the virtual grid. In some embodiments, a greater precision is used for the first vertex point relative to the second vertex point. In some embodiments, the method further comprises receiving a selection of a second point of interest that is not a vertex point of the virtual grid. In some embodiments, the method further comprises performing (a) alteration of the virtual grid in response to receiving the selection of the second point of interest, and/or (b) migrating the second point of interest to a closest vertex point of the virtual grid. In some embodiments, a first vertex point from the virtual grid is identified as a first point of interest. In some embodiments, the one or more environmental characteristics are acquired at the first vertex point and at a second vertex point of the virtual grid. In some embodiments, a greater precision is applied to the first vertex point relative to the second vertex point. In some embodiments, a second point of interest is identified that is not a vertex point of the virtual grid. In some embodiments, the first point of interest has an analogous first location in the physical enclosure, which first location includes a sensor. In some embodiments, the first point of interest is at a distance from the nearest sensor. In some embodiments, the second point of interest has an analogous first location in the physical enclosure, which first location is at a distance from the nearest sensor. In some embodiments, the method further comprises inputting data into the virtual enclosure model from one or more sensors disposed at a physical location analogous to the virtual grid vertex points adjacent to the first point of interest, for extrapolating a sensed property at the first point of interest. In some embodiments, the virtual grid of vertex points is a non-homogeneous grid. In some embodiments, the non-homogeneity of the virtual grid relates to an area of interest. In some embodiments, the non-homogeneity of the virtual grid relates to a grid density. In some embodiments, the non-homogeneity of the virtual grid relates to a grid resolution. In some embodiments, the virtual enclosure model comprises a consideration of one or more structural features of the physical enclosure. In some embodiments, the virtual enclosure model comprises a consideration of one or more fixtures of the physical enclosure. In some embodiments, the physical enclosure includes one or more sensors. In some embodiments, the method further comprises receiving baseline readings from the one or more sensors. In some embodiments, the method further comprises constructing the virtual enclosure model using the baseline readings. In some embodiments, the method further comprises constructing the virtual enclosure model using a three-dimensional schematic of the physical enclosure. In some embodiments, the method further comprises constructing the virtual enclosure model using a building information model. In some embodiments, the method further comprises constructing the virtual enclosure model using one or more physical properties of the one or more fixtures of the physical enclosure. In some embodiments, the method further comprises constructing the virtual enclosure model using one or more material properties of the one or more fixtures of the physical enclosure. In some embodiments, the method further comprises refining the virtual enclosure model using an artificial intelligence engine. In some embodiments, the physical enclosure includes one or more sensors. In some embodiments, the artificial intelligence engine receives readings from the one or more sensors. In some embodiments, the method further comprises using the artificial intelligence engine to model (i) location of the one or more sensors, (ii) operation of the one or more sensors, (iii) spatial distribution of at least one property sensed by the one or more sensors, and/or (iv) evolution of at least one property sensed by the one or more sensors over time. In some embodiments, the method further comprises the artificial intelligence engine refining the modeling using predictive extrapolation. In some embodiments, the predictive extrapolation is based at least in part on a trend in sensor data. In some embodiments, the predictive extrapolation is based at least in part on an expected physical parameter. In some embodiments, the one or more sensors are not at a location analogous to a vertex point of the virtual grid. In some embodiments, the method further comprises controlling the one or more environmental characteristics of the physical enclosure using a hierarchical control system. In some embodiments, the method further comprises the control system controlling the one or more environmental characteristics of the physical enclosure. In some embodiments, controlling the one or more environmental characteristics of the physical enclosure is by adjusting (i) a heating, ventilation, and air conditioning (HVAC) system, (ii) adjusting a security system, (iii) a lighting system, and/or (iv) a tint of a tintable window. In some embodiments, controlling the one or more environmental characteristics of the physical enclosure is by regulating a velocity of an air flowing through a vent to and/or from the enclosure. In some embodiments, controlling the one or more environmental characteristics of the physical enclosure is by controlling a building management system. In some embodiments, the hierarchical control system comprises a master controller that is configured to control one or more floor controllers. In some embodiments, a floor controller of the one or more floor controllers is configured to control one or more local controllers. In some embodiments, a local controller of the one or more local controllers is configured to control one or more tintable windows. In some embodiments, a local controller of the one or more local controllers is configured to control one or more sensors. In some embodiments, a local controller of the one or more local controllers is configured to control one or more output devices. In some embodiments, the master controller is configured to operatively couple to a building management system. In some embodiments, the master controller is configured to operatively couple to a database. In some embodiments, the master controller is configured to operatively couple to a network. In some embodiments, the master controller and/or the floor controller is in the Cloud. In some embodiments, the master controller is disposed in the physical enclosure. In some embodiments, the floor controller is disposed in the physical enclosure. In some embodiments, the master controller is disposed at a location different from that of the physical enclosure. In some embodiments, the floor controller is disposed at a location different from that of the physical enclosure. In some embodiments, the building management system is configured to control the one or more environmental characteristics of the physical enclosure. In some embodiments, controlling the one or more environmental characteristics of the physical enclosure comprises providing an energy consumption savings for the operating the physical enclosure. In some embodiments, the enclosure is a facility. In some embodiments, the enclosure is a building. In some embodiments, the virtual grid is a three dimensional grid that spans at least a portion of a volume of the virtual representation of the physical enclosure. In some embodiments, the virtual grid is a two dimensional grid that spans at least a portion of a surface of the virtual representation of the physical enclosure. In some embodiments, the virtual grid is a one dimensional grid that spans at least a portion of a line of the virtual representation of the physical enclosure. In some embodiments, the virtual grid is a fourth dimensional grid that spans at least a portion of a volume of the virtual representation of the physical enclosure and changes over time. In some embodiments, the method further comprises varying the virtual grid over time.

In another aspect, an apparatus for environmental adjustment, the apparatus comprises one or more controllers comprising at least one circuitry and configured to: (a) generate, or direct generation of, a virtual enclosure model for a physical enclosure using (i) a virtual representation of the physical enclosure, (ii) a virtual grid of vertex points, and (iii) one or more material properties of the physical enclosure; (b) use, or direct utilization of, the virtual enclosure model to generate a map of one or more environmental characteristics of the physical enclosure; and (c) use, or direct utilization of, the map to control the one or more environmental characteristics of the physical enclosure.

In some embodiments, the one or more controllers are configured for receiving a selection of a first vertex point from the virtual grid as a first point of interest. In some embodiments, the one or more controllers are configured for analyzing the one or more environmental characteristics at a first vertex point and at a second vertex point of the virtual grid. In some embodiments, a greater precision is used for the first vertex point relative to the second vertex point. In some embodiments, the one or more controllers are configured for receiving a selection of a second point of interest that is not any of the vertex points of the virtual grid. In some embodiments, the one or more controllers are configured for performing, or directing performance of, (a) alteration of the virtual grid in response to receiving the selection of the second point of interest, and/or (b) migrating the second point of interest to a closest vertex point of the virtual grid. In some embodiments, a first vertex point from the virtual grid is identified as a first point of interest. In some embodiments, the one or more environmental characteristics are acquired at the first vertex point and at a second vertex point of the virtual grid. In some embodiments, a greater precision is applied to the first vertex point relative to the second vertex point. In some embodiments, a second point of interest is not on a vertex point of the virtual grid. In some embodiments, the first point of interest corresponds to a respective location in the physical enclosure where a sensor is disposed. In some embodiments, the first point of interest corresponds to a respective location in the physical enclosure that is at a distance from the nearest sensor. In some embodiments, the second point of interest corresponds to a respective location in the physical enclosure that is at a distance from the nearest sensor. In some embodiments, the one or more controllers are configured for inputting data into the virtual enclosure model from one or more sensors disposed at grid vertex points adjacent to the first point of interest. In some embodiments, inputting of the data is utilized in extrapolating a sensed property at the first point of interest. In some embodiments, the virtual grid of vertex points is a non-homogeneous grid. In some embodiments, the non-homogeneity of the virtual grid relates to an area of interest. In some embodiments, the non-homogeneity of the virtual grid relates to a grid density. In some embodiments, the non-homogeneity of the virtual grid relates to a grid resolution. In some embodiments, the virtual enclosure model comprises a consideration of one or more structural features of the physical enclosure. In some embodiments, the virtual enclosure model comprises a consideration of one or more fixtures of the physical enclosure. In some embodiments, the physical enclosure includes one or more sensors. In some embodiments, the one or more controllers are configured for receiving baseline readings from the one or more sensors. In some embodiments, the apparatus further comprises circuitry configured for constructing the physical enclosure model using the baseline readings. In some embodiments, the one or more controllers are configured for constructing the virtual enclosure model using a three-dimensional schematic of the physical enclosure. In some embodiments, the one or more controllers are configured for constructing the virtual enclosure model using a building information model. In some embodiments, the one or more controllers are configured for constructing the virtual enclosure model using one or more physical properties of the one or more fixtures of the physical enclosure. In some embodiments, the one or more controllers are configured for constructing the virtual enclosure model using one or more material properties of the one or more fixtures of the physical enclosure. In some embodiments, the one or more controllers are configured for refining, or direct refinement of, the physical enclosure model using an artificial intelligence engine. In some embodiments, the physical enclosure includes one or more sensors. In some embodiments, the artificial intelligence engine is configured for receiving readings from the one or more sensors. In some embodiments, the artificial intelligence engine is configured for modeling (i) location of the one or more sensors, (ii) operation of the one or more sensors, (iii) spatial distribution of at least one property sensed by the one or more sensors, and/or (iv) evolution of at least one property sensed by the one or more sensors over time. In some embodiments, operation includes a status that comprise standard operation or malfunction of at least one of the one or more sensors. In some embodiments, the artificial intelligence engine is configured for refining the modeling using predictive extrapolation. In some embodiments, the predictive extrapolation is based at least in part on a trend. In some embodiments, the predictive extrapolation is based at least in part on an expected physical parameter. In some embodiments, the one or more sensors are not at a vertex point of the virtual grid. In some embodiments, the one or more controllers are configured for controlling the one or more environmental characteristics of the physical enclosure using a hierarchical control system. In some embodiments, the one or more controllers are configured for controlling the one or more environmental characteristics of the physical enclosure. In some embodiments, the one or more controllers are configured to control the one or more environmental characteristics by adjusting (a) a heating, ventilation, and air conditioning system (HVAC), (b) a security system, (c) a lighting system, and/or (d) a tintable window. In some embodiments, the one or more controllers are configured for controlling the one or more environmental characteristics of the physical enclosure by regulating, or directing regulation of, a velocity of an air flowing through a vent to and/or from the physical enclosure. In some embodiments, the one or more controllers are configured for controlling the one or more environmental characteristics of the physical enclosure by controlling a building management system. In some embodiments, the one or more controllers comprises a master controller that controls one or more floor controllers. In some embodiments, a floor controller of the one or more floor controllers is configured to control one or more local controllers. In some embodiments, a local controller of the one or more local controllers is configured to control one or more devices comprising a tintable window. In some embodiments, a local controller of the one or more local controllers is configured to control devices comprising one or more sensors. In some embodiments, a local controller of the one or more local controllers is configured to control devices comprising one or more output devices. In some embodiments, the master controller is configured to operatively couple to a building management system. In some embodiments, the master controller is configured to operatively couple to a database. In some embodiments, the master controller is configured to operatively couple to a network. In some embodiments, the master controller is disposed in the Cloud. In some embodiments, the floor controller is disposed in the Cloud. In some embodiments, the master controller is disposed in the physical enclosure. In some embodiments, the floor controller is disposed in the physical enclosure. In some embodiments, the master controller is disposed at a location different from the physical enclosure. In some embodiments, the floor controller is disposed at a location different from the physical enclosure. In some embodiments, the building management system is configured to control the one or more environmental characteristics of the physical enclosure. In some embodiments, the building management system is configured to control the one or more environmental characteristics to provide an energy consumption savings for the physical enclosure. In some embodiments, the virtual grid is a three dimensional grid that spans at least a portion of a volume of the virtual representation of the physical enclosure. In some embodiments, the virtual grid is a two dimensional grid that spans at least a portion of a surface of the virtual representation of the physical enclosure. In some embodiments, the virtual grid is a one dimensional grid that spans at least a portion of a line of the virtual representation of the physical enclosure. In some embodiments, the virtual grid is a fourth dimensional grid that spans at least a portion of a volume of the virtual representation of the physical enclosure and changes over time. In some embodiments, the one or more controllers are configured to vary, or direct varying, the virtual grid over time.

In another aspect, a non-transitory computer readable medium including instructions for environmental adjustment that, when the instructions are executed by one or more processors, the one or more processors are cause execution of operations comprises: (a) generating a virtual enclosure model for a physical enclosure using (i) a virtual representation of the physical enclosure, (ii) a grid of vertex points, and (iii) one or more material properties of the physical enclosure; (b) using the physical enclosure model to generate a map of one or more environmental characteristics of the physical enclosure; and (c) using the map to control the one or more environmental characteristics of the physical enclosure.

In some embodiments, the non-transitory computer readable medium further comprises instructions for receiving a selection of a first vertex point from the virtual grid as a first point of interest. In some embodiments, the non-transitory computer readable medium further comprises instructions for analyzing, or for directing analysis of, the one or more environmental characteristics at the first vertex point and at a second vertex point of the virtual grid. In some embodiments, a greater precision is used for the first vertex point relative to the second vertex point. In some embodiments, the non-transitory computer readable medium further comprises instructions for receiving a selection of a second point of interest that is not any of the vertex points of the virtual grid. In some embodiments, the non-transitory computer readable medium, further comprises instructions for performing, or for directing performance of (a) alteration of the virtual grid in response to receiving the selection of the second point of interest, and/or (b) migrating the second point of interest to a closest vertex point of the virtual grid. In some embodiments, a first vertex point from the virtual grid is identified as a first point of interest. In some embodiments, the one or more environmental characteristics are acquired at the first vertex point and at a second vertex point of the virtual grid. In some embodiments, a greater precision is applied to the first vertex point relative to the second vertex point. In some embodiments, a second point of interest is identified that is does not coincide with the vertex points of the virtual grid. In some embodiments, the first point of interest includes a corresponding location in the physical enclosure in which a sensor is disposed. In some embodiments, the first point of interest is at a distance from a corresponding location in the physical enclosure in which a nearest sensor is disposed. In some embodiments, the second point of interest is at a corresponding location in the physical enclosure in which a nearest sensor is disposed. In some embodiments, the non-transitory computer readable medium further comprises inputting, or directing input of, data into the virtual enclosure model from one or more sensors disposed at location in the physical enclosure that correspond to grid vertex points adjacent to the first point of interest. In some embodiments, the non-transitory computer readable medium further comprises utilizing, or directing utilization of, the data for extrapolating a sensed property at the first point of interest. In some embodiments, the virtual grid of vertex points is a non-homogeneous grid. In some embodiments, the non-homogeneity of the virtual grid relates to an area of interest and/or a point of interest. In some embodiments, the non-homogeneity of the virtual grid relates to a density of the virtual grid. In some embodiments, the non-homogeneity of the virtual grid relates to a resolution of the virtual grid. In some embodiments, construction and/or usage of the virtual enclosure model comprises a consideration of one or more structural features of the physical enclosure. In some embodiments, construction and/or usage of the virtual enclosure model comprises a consideration of one or more fixtures of the physical enclosure. In some embodiments, the physical enclosure includes one or more sensors. In some embodiments, the operations comprise receiving, or directing receipt of, baseline readings from the one or more sensors. In some embodiments, the operations comprise constructing, or directing construction of, the physical enclosure model using the baseline readings. In some embodiments, the operations comprise constructing, or directing construction of, the virtual enclosure model using a three-dimensional schematic of the physical enclosure. In some embodiments, the operations comprise constructing, or directing construction of, the virtual enclosure model using a building information model. In some embodiments, the operations comprise constructing, or directing construction of, the virtual enclosure model using one or more physical properties of the one or more fixtures of the physical enclosure. In some embodiments, the operations comprise constructing, or directing construction of, the virtual enclosure model using one or more material properties of the one or more fixtures of the physical enclosure. In some embodiments, the operations comprise refining, or directing refinement of, the virtual enclosure model using an artificial intelligence engine. In some embodiments, the physical enclosure includes one or more sensors. In some embodiments, the artificial intelligence engine is configured to receive readings from the one or more sensors. In some embodiments, the non-transitory computer readable medium further comprises instructions for the artificial intelligence engine to model (i) location of the one or more sensors, (ii) operation of the one or more sensors, (iii) spatial distribution of at least one property sensed by the one or more sensors, and/or (iv) evolution of at least one property sensed by the one or more sensors over time. In some embodiments, the non-transitory computer readable medium further comprises instructions for the artificial intelligence engine to refine the artificial intelligence engine model by using predictive extrapolation. In some embodiments, the predictive extrapolation is based at least in part on a trend. In some embodiments, the predictive extrapolation is based at least in part on an expected physical parameter. In some embodiments, the one or more sensors are disposed in the physical enclosure at one or more locations that do not correspond to the vertex points of the virtual grid. In some embodiments, the operations comprise directing to a hierarchical control system to control the one or more environmental characteristics of the physical enclosure. In some embodiments, the operations comprise directing to a hierarchical control system to adjusting (I) a heating, ventilation, and air conditioning system (HVAC), (II) a security system, (Ill) a lighting system, and/or (IV) tint of a tintable window. In some embodiments, the operations comprise directing a building management system to control the one or more environmental characteristics of the physical enclosure. In some embodiments, the operations comprise directing to a hierarchical control system to regulate, or direct regulation of, a velocity of an air flow (e.g., through a vent) to and/or from the physical enclosure. In some embodiments, the hierarchical control system comprises a master controller that controls one or more floor controllers. In some embodiments, a floor controller of the one or more floor controllers is configured to control one or more local controllers. In some embodiments, a local controller of the one or more local controllers is configured to control one or more tintable windows. In some embodiments, a local controller of the one or more local controllers is configured to control devices including one or more sensors. In some embodiments, a local controller of the one or more local controllers is configured to control devices including one or more output devices. In some embodiments, the master controller is configured to operatively couple to a building management system. In some embodiments, the master controller is configured to operatively couple to a database. In some embodiments, the master controller is configured to operatively couple to a network. In some embodiments, the master controller is disposed in the Cloud. In some embodiments, the floor controller is disposed in the Cloud. In some embodiments, the master controller is disposed in the physical enclosure. In some embodiments, the floor controller is disposed in the physical enclosure. In some embodiments, the master controller is disposed at a location different from the physical enclosure. In some embodiments, the floor controller is disposed at a location different from the physical enclosure. In some embodiments, the operations comprise directing a building management system to control the one or more environmental characteristics of the physical enclosure. In some embodiments, controlling the one or more environmental characteristics of the physical enclosure comprises providing an energy consumption savings in the operation of (e.g., devices associated with, and/or devices controlling the environment of) the physical enclosure. In some embodiments, the virtual grid is a three dimensional grid that spans at least a portion of a volume of the virtual representation of the physical enclosure. In some embodiments, the virtual grid is a two dimensional grid that spans at least a portion of a surface of the virtual representation of the physical enclosure. In some embodiments, the virtual grid is a one dimensional grid that spans at least a portion of a line of the virtual representation of the physical enclosure. In some embodiments, the virtual grid is a fourth dimensional grid that spans at least a portion of a volume of the virtual representation of the physical enclosure and changes over time. In some embodiments, the operations comprise varying, or direct varying, the virtual grid over time.

In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, the present disclosure provides networks that are configured for transmission of any communication (e.g., signal) and/or (e.g., electrical) power facilitating any of the operations disclosed herein. The communication may comprise control communication, cellular communication, media communication, and/or data communication. The data communication may comprise sensor data communication and/or processed data communication. The networks may be configured to abide by one or more protocols facilitating such communication. For example, a communications protocol used by the network (e.g., with a BMS) can be a building automation and control networks protocol (BACnet). For example, a communication protocol may facilitate cellular communication abiding by at least a $2^{nd}$, $3^{rd}$, $4^{th}$, or $5^{th}$ generation cellular communication protocol.

In another aspect, the present disclosure provides systems, apparatuses (e.g., controllers), and/or non-transitory computer-readable medium or media (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein. The at least one controller may implement any of the methods disclosed herein. In some embodiments, at least two operations (e.g., of the method) are directed/executed by the same controller. In some embodiments, at less at two operations are directed/executed by different controllers.

In some embodiments, one controller of the at least one controller is configured to perform two or more operations. In some embodiments, two different controllers of the at least one controller are configured to each perform a different operation.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product (e.g., inscribed on one or more non-transitory medium) in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable program instructions (e.g., included in a program product comprising one or more non-transitory medium) comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium or media comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium or media coupled thereto. The non-transitory computer-readable medium comprises machine-executable code that, upon execution by the one or more processors, implements any of the methods disclosed herein and/or effectuates directions of the controller(s) disclosed herein.

In another aspect, the present disclosure provides a non-transitory computer readable program instructions that, when read by one or more processors, causes the one or more processors to execute any operation of the methods disclosed herein, any operation performed (or configured to be performed) by the apparatuses disclosed herein, and/or any operation directed (or configured to be directed) by the apparatuses disclosed herein.

In some embodiments, the program instructions are inscribed in a non-transitory computer readable medium or media. In some embodiments, at least two of the operations are executed by one of the one or more processors. In some embodiments, at least two of the operations are each executed by different processors of the one or more processors.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

Figure 1:
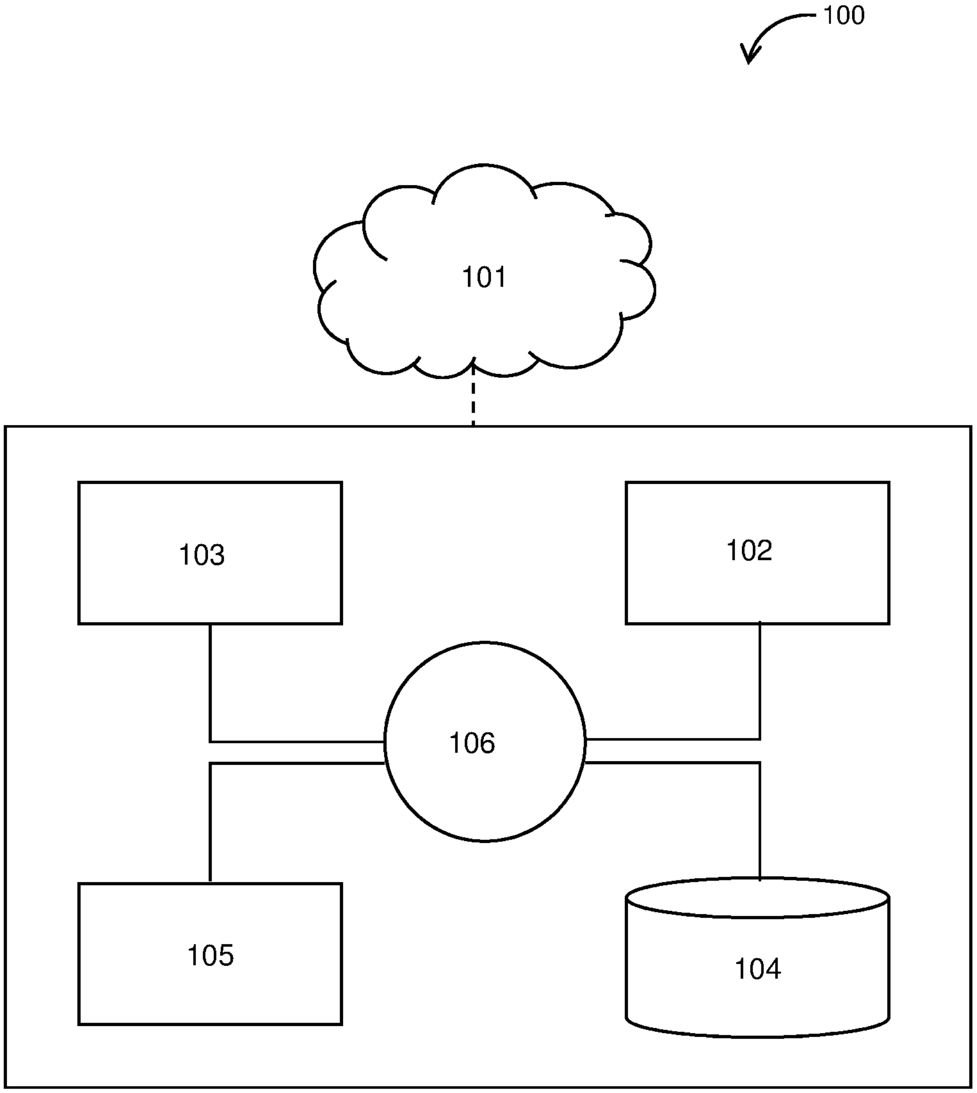
FIG. 1 schematically shows a processing system.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

As used herein, including in the claims, the conjunction "and/or" in a phrase such as "including X, Y, and/or Z", refers to in inclusion of any combination or plurality of X, Y, and Z. For example, such phrase is meant to include X. For example, such phrase is meant to include Y. For example, such phrase is meant to include Z. For example, such phrase is meant to include X and Y. For example, such phrase is meant to include X and Z. For example, such phrase is meant to include Y and Z. For example, such phrase is meant to include a plurality of Xs. For example, such phrase is meant to include a plurality of Ys. For example, such phrase is meant to include a plurality of Zs. For example, such phrase is meant to include a plurality of Xs and a plurality of Ys. For example, such phrase is meant to include a plurality of Xs and a plurality of Zs. For example, such phrase is meant to include a plurality of Ys and a plurality of Zs. For example, such phrase is meant to include a plurality of Xs and Y. For example, such phrase is meant to include a plurality of Xs and Z. For example, such phrase is meant to include a plurality of Ys and Z. For example, such phrase is meant to include X and a plurality of Ys. For example, such phrase is meant to include X and a plurality of Zs. For example, such phrase is meant to include Y and a plurality of Zs. The conjunction "and/or" is meant to have the same effect as the phrase "X, Y, Z, or any combination or plurality thereof." The conjunction "and/or" is meant to have the same effect as the phrase "one or more X, Y, Z, or any combination thereof."

The term "operatively coupled" or "operatively connected" refers to a first element (e.g., mechanism) that is coupled (e.g., connected) to a second element, to allow the intended operation of the second and/or first element. The coupling may comprise physical or non-physical coupling (e.g., communicative coupling). The non-physical coupling may comprise signal-induced coupling (e.g., wireless coupling). Coupled can include physical coupling (e.g., physically connected), or non-physical coupling (e.g., via wireless communication). Operatively coupled may comprise communicatively coupled.

An element (e.g., mechanism) that is "configured to" perform a function includes a structural feature that causes the element to perform this function. A structural feature may include an electrical feature, such as a circuitry or a circuit element. A structural feature may include an actuator. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors. Additionally, in the following description, the phrases "operable to," "adapted to," "configured to," "designed to," "programmed to," or "capable of" may be used interchangeably where appropriate.

In some embodiments, an enclosure comprises an area defined by at least one structure. The at least one structure may comprise at least one wall. An enclosure may comprise and/or enclose one or more sub-enclosures. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure at most about 30%, 20%, 10%, 5%, or 1% of the walls(s). The wall(s) may comprise a floor, a ceiling, or a side wall. The closable opening may be closed by at least one window or door. The enclosure may be at least a portion of a facility. The facility may comprise a building. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, an airplane, a ship, a vehicle, or a rocket).

In some embodiments, the enclosure encloses an atmosphere. The atmosphere may comprise one or more gases. The gases may include inert gases (e.g., comprising argon or nitrogen) and/or non-inert gases (e.g., comprising oxygen or carbon dioxide). The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), airborne agents (e.g., pollutants, Volatile organic compounds, dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), airborne agents (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity of the gas in the enclosure may be (e.g., substantially) similar throughout the enclosure. The velocity of the gas in the enclosure may be different in different portions of the enclosure (e.g., by flowing gas through to a vent that is coupled with the enclosure).

Certain disclosed embodiments provide a network infrastructure in the enclosure (e.g., a facility such as a building).

The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network may be a local network. The network may comprise a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. The communication may comprise media communication facilitating stills, music, or moving picture streams (e.g., movies or videos). The communication may comprise data communication (e.g., sensor data). The communication may comprise control communication, e.g., to control the one or more nodes operatively coupled to the networks. The network may comprise a first (e.g., cabling) network installed in the facility. The network may comprise a (e.g., cabling) network installed in an envelope of the facility (e.g., such as in an envelope of an enclosure of the facility. For example, in an envelope of a building included in the facility).

In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, bus, train, airplane, helicopter, ship, or boat. The tintable window may be disposed in a (non-transitory) facility such as a building, and/or in a transitory vehicle such as a car, RV, bus, train, airplane, helicopter, ship, or boat.

In some embodiments, a tintable window exhibits a (e.g., controllable and/or reversible) change in at least one optical property of the window, e.g., when a stimulus is applied. The change may be a continuous change. A change may be to discrete tint levels (e.g., to at least about 2, 4, 8, 16, or 32 tint levels). The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. Pat. No. 10,359,681, issued Jul. 23, 2019, filed May 15, 2015, titled "MULTI-PANE WINDOWS INCLUDING ELECTROCHROMIC DEVICES AND ELECTROMECHANICAL SYSTEMS DEVICES," and incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD), or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g. noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g. cations) into the oxide may induce a visible change in a tint (e.g., color) of the oxide. For example, the oxide may transition from a colorless to a colored state. For example, intercalation of lithium ions into tungsten oxide (WO3-y ($0<y\leq\sim0.3$)) may cause the tungsten oxide to change from a transparent state to a colored (e.g., blue) state. EC device coatings as described herein are located within the viewable portion of the tintable window such that the tinting of the EC device coating can be used to control the optical state of the tintable window.

FIG. 1 shows a schematic example of a computer system 100 that is programmed or otherwise configured to perform one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or device ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 106) (also "processor," "computer" and "computer processor" used herein). The computer system may include memory or memory location (e.g., 102) (e.g., random-access memory, read-only memory, flash memory), electronic storage unit (e.g., 104) (e.g., hard disk), communication interface (e.g., 103) (e.g., network adapter) for communicating with one or more other systems, and peripheral devices (e.g., 105), such as cache, other memory, data storage and/or electronic display adapters. In the example shown in FIG. 1, the memory 102, storage unit 104, interface 103, and peripheral devices 105 are in communication with the processing unit 106 through a communication bus (solid lines), such as a motherboard. The storage unit can be a data storage unit (or data repository) for storing data. The computer system can be operatively coupled to a computer network ("network") (e.g., 101) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 102. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 100 can be included in the circuit.

The storage unit can store files, such as drivers, libraries and saved programs. The storage unit can store user data (e.g., user preferences and/or user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 102 or electronic storage unit 104. The machine executable or machine-readable code can be provided in the form of software. During use, the processor 106 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The signal may comprise radio signals comprising ultra-wide band radio signals. The signal may comprise visible, infrared, or ultraviolet light. The infrared sensor may detect animate objects (e.g., people). The signal may comprise an audio signal (e.g., human audio signal). The electromagnetic signal may comprise a visible, infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, visible light camera, CCD camera). The camera can be a high resolution camera (e.g., the resolution can be of at least 2 Kilo Pixel (K), 3K, 4K, or 5K camera). The sensor may comprise an accelerometer. The sensor may sense location and/or presence of people. The sensor may sense and/or locate enclosure occupants. The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

In some embodiments, the one or more devices comprise a sensor (e.g., as part of a transceiver). In some embodiments, a transceiver may be configured transmit and receive one or more signals using a personal area network (PAN) standard, for example such as IEEE 802.15.4. In some embodiments, signals may comprise Bluetooth, Wi-Fi, or EnOcean signals (e.g., wide bandwidth). The one or more signals may comprise ultra-wide bandwidth (UWB) signals (e.g., having a frequency in the range from about 2.4 to about 10.6 Giga Hertz (GHz), or from about 7.5 GHz to about 10.6 GHz). An Ultra-wideband signal can be one having a fractional bandwidth greater than about 20%. An ultra-wideband (UWB) radio frequency signal can have a bandwidth of at least about 500 Mega Hertz (MHz). The one or more signals may use a very low energy level for short-range. Signals (e.g., having radio frequency) may employ a spectrum capable of penetrating solid structures (e.g., wall, door, and/or window). Low power may be of at most about 25 milli Watts (mW), 50 mW, 75 mW, or 100 mW. Low power may be any value between the aforementioned values (e.g., from 25 mW to 100 mW, from 25 mW to 50 mW, or from 75 mW to 100 mW). The sensor and/or transceiver may be configured to support wireless technology standard used for exchanging data between fixed and mobile devices, e.g., over short distances. The signal may comprise Ultra High Frequency (UHF) radio waves, e.g., from about 2.402 gigahertz (GHz) to about 2.480 GHz. The signal may be configured for building personal area networks (PANs).

In some embodiments, the device is configure to enable geo-location technology (e.g., global positioning system (GPS), Bluetooth (BLE), ultrawide band (UWB) and/or dead-reckoning). The geo-location technology may facilitate determination of a position of signal source (e.g., location of the tag) to an accuracy of at least 100 centimeters (cm), 75 cm, 50 cm, 25 cm, 20 cm, 10 cm, or 5 cm. In some embodiments, the electromagnetic radiation of the signal comprises ultra-wideband (UWB) radio waves, ultra-high frequency (UHF) radio waves, or radio waves utilized in global positioning system (GPS). In some embodiments, the electromagnetic radiation comprises electromagnetic waves of a frequency of at least about 300 MHz, 500 MHz, or 1200 MHz. In some embodiments, the signal comprises location and/or time data. In some embodiments, the geo-location technology comprises Bluetooth, UWB, UHF, and/or global positioning system (GPS) technology. In some embodiments, the signal has a spatial capacity of at least about 1013 bits per second per meter squared (bit/s/$m^2$).

In some embodiments, pulse-based ultra-wideband (UWB) technology (e.g., ECMA-368, or ECMA-369) is a wireless technology for transmitting large amounts of data at low power (e.g., less than about 1 millivolt (mW), 0.75 mW, 0.5 mW, or 0.25 mW) over short distances (e.g., of at most about 300 feet ('), 250', 230', 200', or 150'). A UWB signal can occupy at least about 750 MHz, 500 MHz, or 250 MHz of bandwidth spectrum, and/or at least about 30%, 20%, or 10% of its center frequency. The UWB signal can be transmitted by one or more pulses. A component broadcasts digital signal pulses may be timed (e.g., precisely) on a carrier signal across a number of frequency channels at the same time. Information may be transmitted, e.g., by modulating the timing and/or positioning of the signal (e.g., the pulses). Signal information may be transmitted by encoding the polarity of the signal (e.g., pulse), its amplitude and/or by using orthogonal signals (e.g., pulses). The UWB signal may be a low power information transfer protocol. The UWB technology may be utilized for (e.g., indoor) location applications. The broad range of the UWB spectrum comprises low frequencies having long wavelengths, which allows UWB signals to penetrate a variety of materials, including various building fixtures (e.g., walls). The wide range of frequencies, e.g., including the low penetrating frequencies, may decrease the chance of multipath propagation errors (without wishing to be bound to theory, as some wavelengths may have a line-of-sight trajectory). UWB communication signals (e.g., pulses) may be short (e.g., of at most about 70 cm, 60 cm, or 50 cm for a pulse that is about 600 MHz, 500 MHz, or 400 MHz wide; or of at most about 20 cm, 23 cm, 25 cm, or 30 cm for a pulse that is has a bandwidth of about 1 GHz, 1.2 GHz, 1.3 GHz, or 1.5 GHz). The short communication signals (e.g., pulses) may reduce the chance that reflecting signals (e.g., pulses) will overlap with the original signal (e.g., pulse).

In some embodiments, a plurality of devices may be operatively (e.g., communicatively) coupled to the control system. The plurality of devices may be disposed in a facility (e.g., including a building and/or room). The control system may comprise the hierarchy of controllers. The devices may comprise an emitter, a sensor, or a window (e.g., IGU). The devices may compromise a radio emitter and/or receiver (e.g., a wide band, or ultra-wide band radio emitter and/or receiver). The device may include a locating device. The devices may include a Global Positioning System (GPS) device. The devices may include a Bluetooth device. The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times the plurality of devices may comprise at least 20, 50, 100, 500, 1,000, 2,500, 5,000, 7,500, 10,000, 50,000, 100,000, or 500,000 devices. The plurality of devices may be of any number between the aforementioned numbers (e.g., from 20 devices to 500,000 devices, from 20 devices to 50 devices, from 50 devices to 500 devices, from 500 devices to 2,500 devices, from 1,000 devices to 5,000 devices, from 5,000 devices to 10,000 devices, from 10,000 devices to 100,000 devices, or from 100,000 devices to 500,000 devices). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times the devices may be in a multi-story building. At least a portion of the floors of the multi-story building may have devices controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 150 $m^2$, 250 $m^2$, 500 $m^2$, 1,000 $m^2$, 1,500 $m^2$, or 2,000 square meters ($m^2$). The floor may have an area between any of the aforementioned floor area values (e.g., from about 150 $m^2$ to about 2,000 $m^2$, from about 150 $m^2$ to about 500 $m^2$, from about 250 $m^2$ to about 1,000 $m^2$, or from about 1,000 $m^2$ to about 2,000 $m^2$). The building may comprise an area of at least about 1,000 square feet (sqft), 2,000 sqft, 5,000 sqft, 10,000 sqft, 100,000 sqft, 150,000 sqft, 200,000 sqft, or 500,000 sqft. The building may comprise an area between any of the above mentioned areas (e.g., from about 1,000 sqft to about 5,000 sqft, from about 5,000 sqft to about 500,000 sqft, or from about 1,000 sqft to about 500,000 sqft). The building may comprise an area of at least about 100 $m^2$, 200 $m^2$, 500 $m^2$, 1,000 $m^2$, 5,000 $m^2$, 10,000 $m^2$, 25,000 $m^2$, or 50,000 $m^2$. The building may comprise an area between any of the above mentioned areas (e.g., from about 100 $m^2$ to about 1,000 $m^2$, from about 500 $m^2$ to about 25,000 $m^2$, from about 100 $m^2$ to about 50,000 $m^2$). The facility may comprise a commercial or a residential building. The commercial building may include tenant(s) and/or owner(s). The residential facility may comprise a multi or a single family building. The residential facility may comprise an apartment complex. The residential facility may comprise a single family home. The residential facility may comprise multifamily homes (e.g., apartments). The residential facility may comprise townhouses. The facility may comprise residential and commercial portions. The facility may comprise at least about 1, 2, 5, 10, 50, 100, 150, 200, 250, 300, 350, 400, 420, 450, 500, or 550 windows (e.g., tintable windows). The windows may be divided into zones (e.g., based at least in part on the location, façade, floor, ownership, utilization of the enclosure (e.g., room) in which they are disposed, any other assignment metric, random assignment, or any combination thereof. Allocation of windows to the zone may be static or dynamic (e.g., based on a heuristic). There may be at least about 2, 5, 10, 12, 15, 30, 40, or 46 windows per zone.

In some embodiments, the sensor(s) are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system. A control system may comprise a master controller, floor (e.g., comprising network controller) controller, a local controller. The local controller may be a window controller (e.g., controlling an optically switchable window), enclosure controller, or component controller. For example, a controller may be a part of a hierarchal control system (e.g., comprising a main controller that directs one or more controllers, e.g., floor controllers, local controllers (e.g., window controllers), enclosure controllers, and/or component controllers). A physical location of the controller type in the hierarchal control system may be changing. For example: At a first time: a first processor may assume a role of a main controller, a second processor may assume a role of a floor controller, and a third processor may assume the role of a local controller. At a second time: the second processor may assume a role of a main controller, the first processor may assume a role of a floor controller, and the third processor may remain with the role of a local controller. At a third time: the third processor may assume a role of a main controller, the second processor may assume a role of a floor controller, and the first processor may assume the role of a local controller. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater).

In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility.

A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer.

Figure 2:
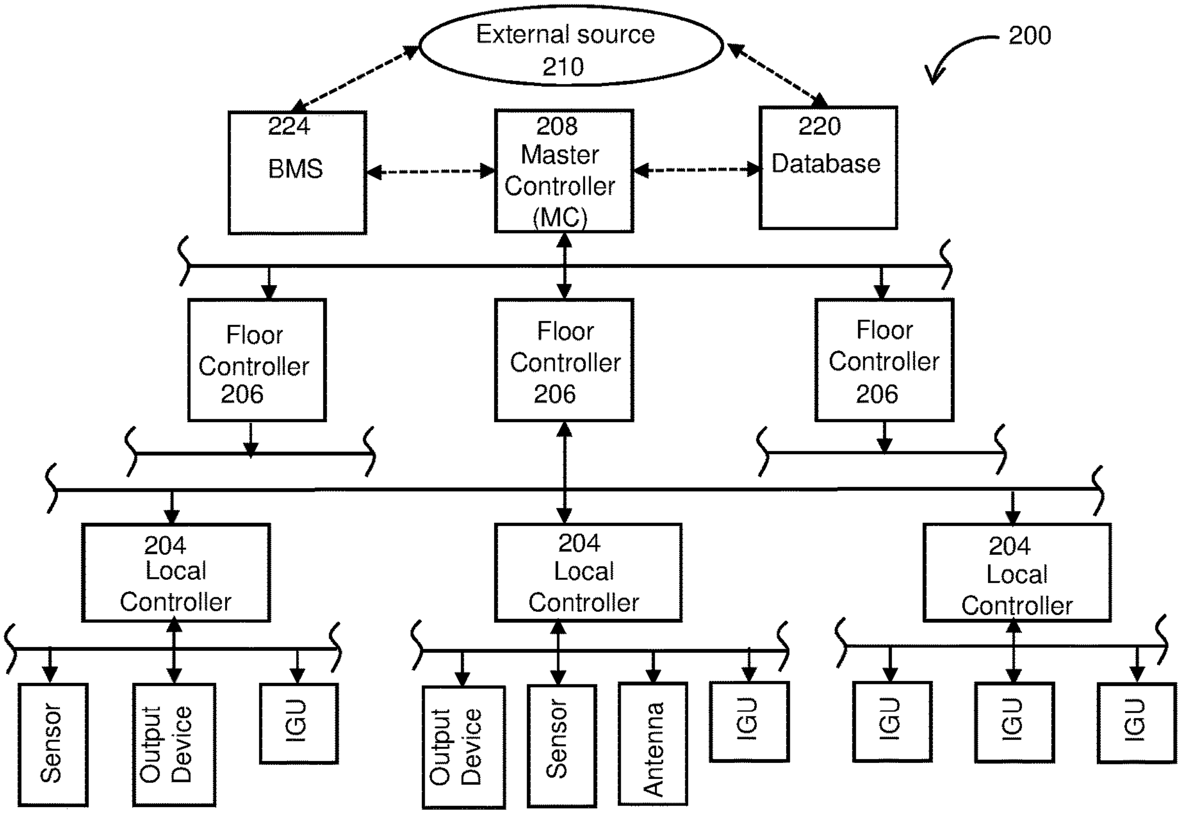
FIG. 2 schematically shows a control system architecture and a building.
Figure 2:
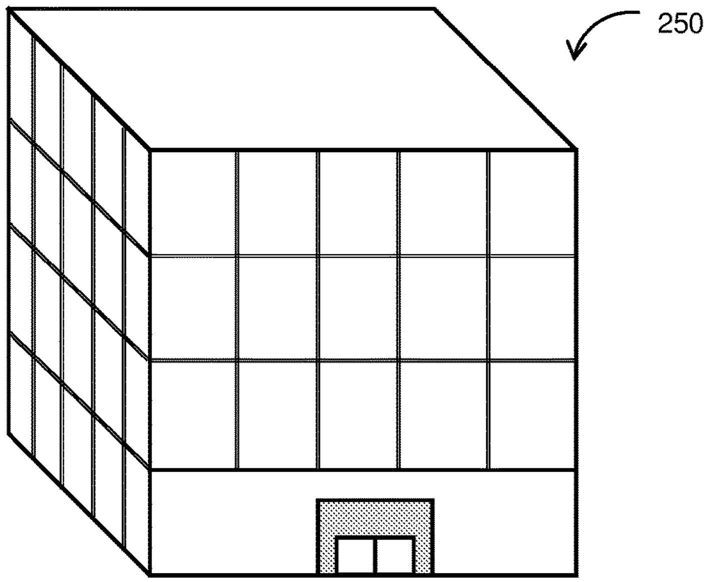

FIG. 2 shows a schematic example of a control system architecture 200 comprising a master controller 208 that controls floor controllers 206, that in turn control local controllers 204. In some embodiments, a local controller controls one or more IGUs, one or more sensors, one or more output devices (e.g., one or more emitters), or any combination thereof. In the illustrative configuration of FIG. 2, the master controller is operatively coupled (e.g., communicatively coupled wirelessly and/or wired) to a building management system (BMS) 224 and to a database 220. Arrows in FIG. 2 represents communication pathways. A controller may be operatively coupled (e.g., directly/indirectly and/or wired and/wirelessly) to an external source 210. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 2, all communication arrows can be bidirectional.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g. temperature, power, voltage, and/or profile). The control can comprise real time or off-line control. A calculation utilized by the controller can be done in real time, and/or offline. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., including lighting, security, occupancy, occupant behavior, HVAC, sensor, emitter, alarms, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

In certain embodiments, a building network infrastructure has a vertical data plane (between building floors) and a horizontal data plane (all within a single floor or multiple (e.g., contiguous) floors). In some cases, the horizontal and vertical data planes have at least one (e.g., all) data carrying capabilities and/or components that is (e.g., substantially) the same or similar data. In other cases, these two data planes have at least one (e.g., all) different data carrying capabilities and/or components. For example, the vertical data plane may contain one or more components for fast data transmission rates and/or bandwidths. In one example, the vertical data plane contains components that support at least about 10 Gigabit/second (Gbit/s) or faster (e.g., Ethernet) data transmissions (e.g., using a first type of wiring (e.g., UTP wires and/or fiber optic cables)), while the horizontal data plane contains components that support at most about 8 Gbit/s, 5 Gbit/s, or 1 Gbit/s (e.g., Ethernet) data transmissions, e.g., via a second type of wiring (e.g., coaxial cable). In some cases, the horizontal data plane supports data transmission via d.hn or MoCA standards (e.g., MoCA 2.5 or MoCA 3.0). In certain embodiments, connections between floors on the vertical data plane employ control panels with high speed (e.g., Ethernet) switches that pair communication between the horizontal and vertical data planes and/or between the different types of wiring. These control panels can communicate with (e.g., IP) addressable nodes (e.g., devices) on a given floor via the communication (e.g., d.hn or MoCA) interface and associated wiring (e.g., coaxial cables, twisted cables, or optical cables) on the horizontal data plane. Horizontal and vertical data planes in a single building structure are depicted in FIG. 3.

Data transmission, and in some embodiments voice services, may be provided in a building via wireless and/or wired communications, to and/or from occupants of the building. The data transmission and/or voice services may become difficult due in part to attenuation by building structures such as walls, floors, ceilings, and windows, in third, fourth, or fifth generation (3G, 4G, or 5G) cellular communication. Relative to 3G and 4G communication, the attenuation becomes more severe with higher frequency protocols such as 5G. To address this challenge, a building can be outfitted with components that serve as gateways or ports for cellular signals. Such gateways couple to infrastructure in the interior of the building that provide wireless service (e.g., via interior antennas and other infrastructure implementing Wi-Fi, small cell service (e.g., via microcell or femtocell devices), CBRS, etc.). The gateways or points of entry for such services may include high speed cable (e.g., underground) from a central office of a carrier and/or a wireless signal received at an antenna strategically located on the building exterior (e.g., a donor antenna and/or sky sensor on the building's roof). The high speed cable to the building can be referred to as "backhaul."

Figure 3:
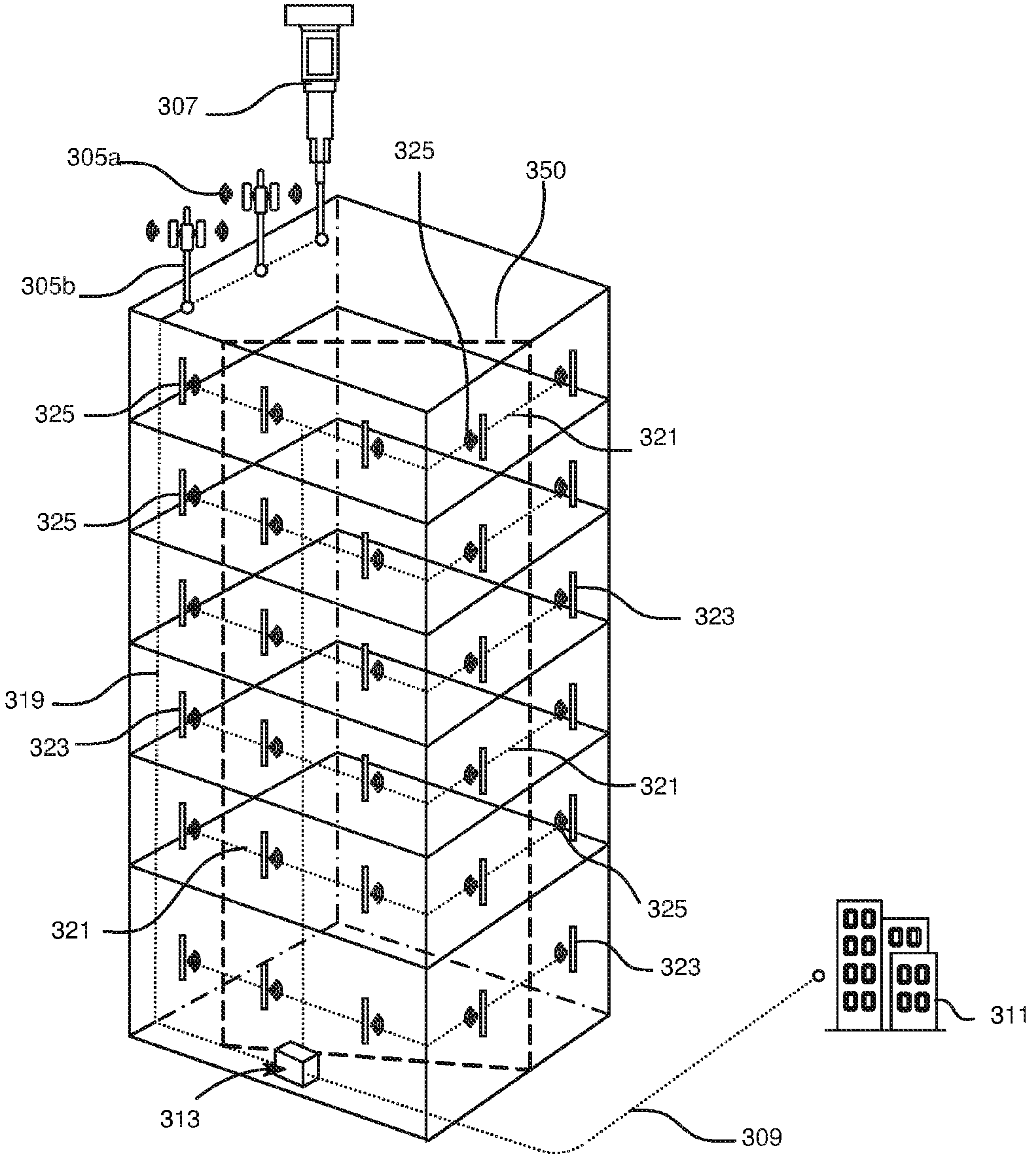
FIG. 3 schematically shows a building and a network.

FIG. 3 shows an example of a building with device ensembles (e.g., assemblies). As points of connection, the building can include multiple rooftop donor antennas such as 305, 305*b* as well as a sky sensor 307 for sending electromagnetic radiation (e.g., infrared, ultraviolet, and/or visible light). Wireless signals from the network (e.g., provided via the antennas) may allow a building services network to wirelessly (at least in part) interface with one or more communications service provider systems. The building depicted in the example shown in FIG. 3, has a control panel 313, e.g., for connecting to a provider's central office 311 via a physical line 309 (e.g., an optical fiber such as a single mode optical fiber, or a coaxial fiber). The control panel 313 may include hardware and/or software configured to provide functions of, for example, a signal source carrier head end, a fiber distribution headend, and/or a (e.g., bi-directional) amplifier or repeater. The rooftop donor antennas 305*a* and 305*b* can allow building occupants and/or devices to access a wireless system communications service of a (e.g., $3^{rd}$ party) provider. The antenna and/or controller(s) may provide access to the same service provider system, a different service provider system, or some variation such as two interface elements providing access to a system of a first service provider, and a different interface element providing access to a system of a second service provider.

As shown in the example of FIG. 3, a vertical data plane may include a (e.g., high capacity, or high-speed) data carrying line 319 such as (e.g., single mode) optical fiber, coaxial cable, and/or UTP copper lines (of sufficient gauge). In some embodiments, at least one control panel could be provided on at least part of the floors of the building (e.g., on each floor). The control panel associate with a controller. The controller may be part of a control system (e.g., as disclosed herein). In some embodiments, one (e.g., high capacity) communication line can directly connect a control panel in another floor (e.g., in the top floor) with (e.g., main) control panel 313 disposed in the bottom floor (or in the basement floor). Note that line 319 directly connects to rooftop antennas 305*a*, 305*b* and/or sky sensor 307, while control panel 313 directly connects also to the (e.g., $3^{rd}$ party) service provider central office 311.

FIG. 3 shows an example of a horizontal data plane that may include one or more of the control panels and data and/or power carrying wiring (e.g., lines), which include trunk lines 321. In certain embodiments, the trunk lines can be made from coaxial cables, optical cables, twisted wires, or any combination thereof. The trunk lines may comprise any wiring disclosed herein. The control panels may be configured to provide data on the trunk lines 321 via a data communication protocol (such as MoCA and/or G.hn). The data communication protocol may comprise (i) a next generation home networking protocol (abbreviated herein as "G.hn" protocol), (ii) communications technology that transmits digital information over power lines that traditionally used to (e.g., only) deliver electrical power, or (iii) hardware devices designed for communication and transfer of data (e.g., Ethernet, USB and Wi-Fi) through electrical wiring of a building. The data transfer protocols may facilitate data transmission rates of at least about 1 Gigabits per second (Gbit/s), 2 Gbit/s, 3 Gbit/s, 4 Gbit/s, or 5 Gbit/s. The data transfer protocol may operate over telephone wiring, coaxial cables, power lines, and/or (e.g., plastic or glass) optical fiber. The data transfer protocol may be facilitated using a chip (e.g., comprising a semiconductor device).

Each horizontal data plane may provide high speed network access to one or more device ensembles 323 (e.g., a set of one or more devices in a housing comprising an assembly of devices) and/or antennas 325, some or all of which are optionally integrated with device ensembles 323. Antennas 325 (and associated radios, not shown) may be configured to provide wireless access by any of various protocols, including, e.g., cellular (e.g., one or more frequency bands at or proximate 28 GHz), Wi-Fi (e.g., one or more frequency bands at 2.4, 5, and 60 GHz), CBRS, and the like. Drop lines may connect device ensembles 323 to trunk lines 321. In some embodiments, a horizontal data plane is deployed on a floor of a building. The devices in the device ensemble may comprise a sensor, emitter, transceiver, processor, controller, memory, network connectivity, or antenna. The device ensemble may comprise a circuitry (e.g., disposed on one or more circuit boards). The devices in the device ensemble may be operatively coupled to the circuitry. Plane 350 shows a vertical plane in the building.

One or more donor antennas 305*a*, 305*b* may connect to the control panel 313 via high speed lines (e.g., single mode optical fiber or copper). In the depicted example of FIG. 3, the control panel 313 may be located in a lower floor of the building. The connection to the donor antenna(s) 305*a*, 305*b* may be via one or more vRAN radios and wiring (e.g., coaxial cable). The communications service provider central office 311 connects to ground floor control panel 313 via a high speed line 309 (e.g., an optical fiber serving as part of a backhaul). This entry point of the service provider to the building is sometimes referred to as a Main Point of Entry (MPOE), and it may be configured to permit the building to distribute both voice and data traffic.

Figure 4:
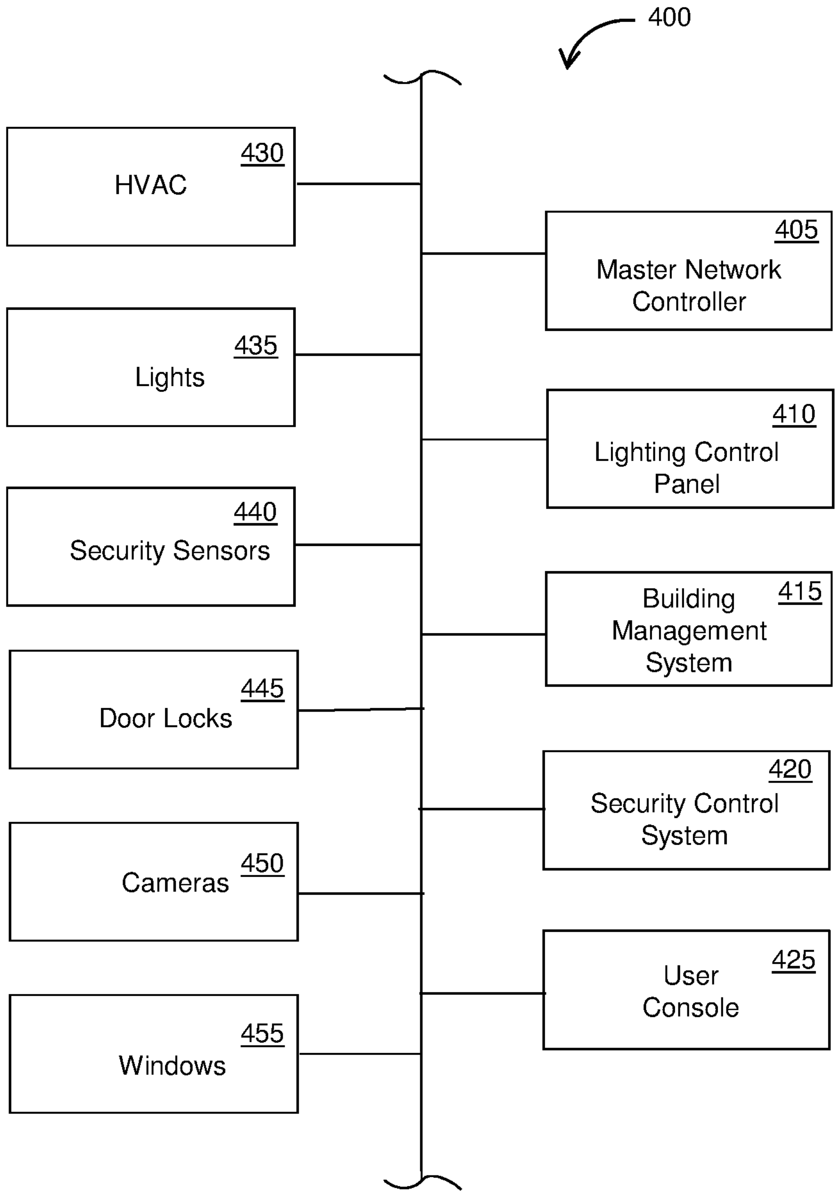
FIG. 4 shows a block diagram of a network of devices.

In some cases, a small cell system is made available to a building, at least in part, via one or more antennas. Examples of antennas, sky sensor, and control systems can be found in U.S. patent application Ser. No. 15/287,646, filed Oct. 6, 2016, which is incorporated herein by reference in its entirety. Use of a roof antenna may provide other advantages such facilitating cellular coverage to an increased area (geographically). In some cases, a small cell system is made available to a building, at least in part, via one or more donor antennas. FIG. 4 depicts a block diagram of an embodiment of a building network 400 for a building. Building network 400 may employ any number of different communication protocols, including BACnet. As shown, building network 400 includes a master network controller 405, a lighting control panel 410, a building management system 415, a security control system 420, and a user console 425. These different controllers and systems in the building may be used to receive input from and/or control an HVAC system 430, lights 435, security sensors 440, door locks 445, cameras 450, and tintable windows 455 of the building.

Master network controller 405 may function in a similar manner as master controller 208 described with respect to FIG. 2. Lighting control panel 410 (FIG. 4) may include circuitry to control any device disclosed herein (e.g., the interior lighting that is operatively coupled to the controller. The device may comprise interior lighting, the exterior lighting, the emergency warning lights, the emergency exit signs, and the emergency floor egress lighting, which lighting is associated with the building and is operatively coupled to the controller. Lighting control panel 410 may include other devices (e.g., an occupancy sensor). Building management system (BMS) 415 may include a computer server that receives data from, and/or issues commands to the, other systems and controllers operatively coupled to the network 400. For example, BMS 415 may receive data from and issue commands to each of the master network controller 405, lighting control panel 410, and security control system 420. Security control system 420 may include magnetic card access, turnstiles, solenoid driven door locks, surveillance cameras, burglar alarms, metal detectors, and the like. User console 425 may be a computer terminal that can be used by the building manager to schedule operations of, control, monitor, optimize, and troubleshoot the different systems of the building. Software from Tridium, Inc., may generate visual representations of data from different systems for user console 425.

Each of the different controls may control individual devices/apparatus. Master network controller 405 may control windows 455. Lighting control panel 410 may control lights 435. BMS 415 may control HVAC 430. Security control system 420 may control security sensors 440, door locks 445, and cameras 450. Data may be exchanged and/or shared between (e.g., all of) the different devices and controllers that are part of the building network 400.

In some cases, at least a portion of the systems of BMS 415 and/or building network 400 may run according to daily, monthly, quarterly, or yearly schedules. For example, the lighting control system, the window control system, the HVAC, and the security system may operate on a 24-hour schedule accounting for when people are in the building during the work-day. At least two device categories (e.g., of 430, 435, 440, 445, 450, and 455) may run at a different schedule from each other. At least two device categories (e.g., of 430, 435, 440, 445, 450, and 455) may run at (e.g., substantially) the same schedule. For example, at night the building may enter an energy savings mode, and during the day the systems may operate in a manner that minimizes the energy consumption of the building while providing for occupant comfort, safety, and health. As another example, the systems may shut down or enter an energy savings mode over a holiday period.

The scheduling information may be combined with geographical information. Geographical information may include the latitude and/or longitude of the building. Geographical information may include information about the direction that at least one side of the building faces. Using such information, different rooms on different sides of the building may be controlled in different manners. For example, for East facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. The modes of operation of the east facing windows and the west facing windows may switch in the evening (e.g., when the sun is setting, the west facing windows may not be tinted to allow sunlight in for both heat and lighting).

Figure 5:
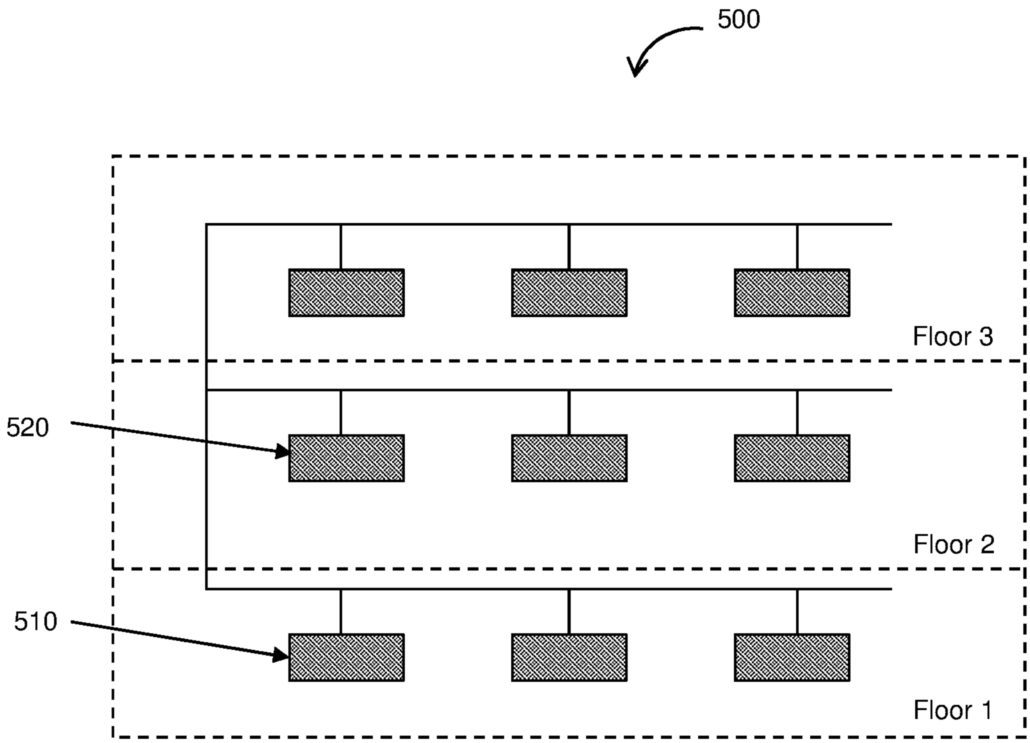
FIG. 5 schematically depicts a communication network disposed in various enclosures.

In some embodiments, a plurality of assemblies (e.g., device ensembles) are deployed as interconnected (e.g., IP) addressable nodes (e.g., devices) within a processing system throughout a particular enclosure (e.g., a building), portions thereof (e.g., rooms or floors), or spanning a plurality of such enclosures. FIG. 5 shows a schematic example of a network system within an enclosure (e.g., building) having a plurality of sub-enclosures (e.g., floors). In the example of FIG. 5, the enclosure 500 is a building having floor 1, floor 2, and floor 3. The enclosure 500 includes a network 520 (e.g., a wired network) that is provided to communicatively couple any addressable circuitry (e.g., addressable node) such as a device or to a device ensemble (also referred to herein as a "community of components" (e.g., community of devices)) collectively represented by 510. In the example shown in FIG. 5, the three floors are sub enclosures within the enclosure 500. At least two devices can be of a different type from each other. At least two devices can be of the same type. At least two device ensembles can be of a different type from each other. At least two device ensembles can be of the same type.

In some embodiments, an enclosure includes one or more sensors. The sensor may facilitate controlling the environment of the enclosure, e.g., such that inhabitants of the enclosure may have an environment that is more comfortable, delightful, beautiful, healthy, productive (e.g., in terms of inhabitant performance), easer to live (e.g., work) in, or any combination thereof. The sensor(s) may be configured as low or high resolution sensors. The sensor may provide on/off indications of the occurrence and/or presence of an environmental event (e.g., one pixel sensors). In some embodiments, the accuracy and/or resolution of a sensor may be improved via artificial intelligence (abbreviated herein as "AI") analysis of its measurements. Examples of artificial intelligence techniques that may be used include: reactive, limited memory, theory of mind, and/or self-aware techniques know to those skilled in the art). Sensors (including their circuitry) may be configured to process, measure, analyze, detect and/or react to: data, temperature, humidity, sound, force, pressure, concentration, electromagnetic waves, position, distance, movement, flow, acceleration, speed, vibration, dust, light, glare, color, gas(es) type, and/or any other aspects (e.g., characteristics) of an environment (e.g., of an enclosure). The gases may include volatile organic compounds (VOCs). The gases may include carbon monoxide, carbon dioxide, water vapor (e.g., humidity), oxygen, radon, and/or hydrogen sulfide. The one or more sensors may be calibrated in a factory setting and/or in the facility. A sensor may be optimized to performing accurate measurements of one or more environmental characteristics present in the factory setting and/or in the facility in which it is deployed. Examples of artificial intelligence techniques, machine learning, their usage is controlling the environment and/or tintable windows, sensors, control system, and network can be found in International Patent application Serial No. PCT/US21/17603, filed Feb. 11, 2021, and International Patent application Serial No. PCT/US19/46524, filed Aug. 14, 2019, each which is incorporated herein by reference in its entirety.

The sensors coupled to the network may be configured to sense properties comprising temperature, Relative Humidity (RH), Illuminance (e.g., in Lux), temperature (in degrees Celsius), correlated color temperature (CCT, e.g., in degrees Kelvin), carbon dioxide (e.g., in parts per million (ppm)), volatile organic compounds (VOC, e.g., as an index value), pressure (e.g., as sound pressure in Decibels), pulverous material, infrared, ultraviolet, or visible light. The sensor may have an accuracy. The sensor may have a random variability. The random variability (e.g., statistical measures of long-term random variability). The random variability of the temperature sensor may be at most about 0.5 degrees Celsius (° C.), 0.3° C., 0.2° C. or 0.1° C. The random variability of the RH sensor may be at most about 3%, 2%, 1.5%, or 1%. The random variability of the Illuminance sensor may be at most about 20 LUX, 15 LUX, 10 LUX, or 5 LUX. The random variability of the CCT sensor may be at most about 250 Kelvin (K), 220K, 210K, 200K, 190K, or 150K. The random variability of the carbon dioxide sensor may be at most about 25 ppm, 23 ppm, 20 ppm, 19 ppm, or 15 ppm. The random variability of the VOC sensor may be at most about 15 index value (IV), 12IV, 11IV, 10IV, or 5IV. The random variability of the sound pressure sensor may be at most about 10 Decibels (dB), 8 dB, 5 dB, 4 dB, or 2 dB. At times, a sensor ensemble may comprise measuring the temperature in the device ensemble (e.g., internal device ensemble temperature) and/or out of the device ensemble (e.g., external device ensemble temperature such as temperature in a room in which the device ensemble is disposed). In some embodiments, data from the sensor(s) undergoes processing and/or analysis. The data processing may comprise removing gaps, removing anomalies (e.g., out of range data), performing spatial extrapolation, or calibration. The data processing may be different for data obtained by different types of sensors. For example, data from a temperature sensor may undergo different processing and/or analysis than data from a VOC sensor. The data processing may comprise data imputation. The data processing may comprise data filtering. The data filtering may be different for data obtained by different types of sensors. The data filtering may comprise median, mean, standard deviation, or select minima, as filtering mechanism(s). The absolute value of the standard deviation may be at most about 1 sigma (a), 2σ, 3σ, or 4σ. The data filtering may comprise finding the absolute deviation (e.g., mean absolute deviation, and/or median absolute deviation). At times, a median based approach may be favored over mean based approach. The media may comprise median of an absolute deviation. At times, the data processing and/or analysis may comprise finding a standard deviation of minima, e.g., to derive a long term variation (e.g., in a specific location of the sensor). The median absolute deviation may comprise a median absolute distance from the median. The mean absolute deviation may comprise a mean absolute distance from the mean. The filtering may comprise removing environmental noise (e.g., fluctuations). The spatial extrapolation may be of the property measured by the sensor(s) to the space in which the sensor is disposed, e.g., to provide a sensor property mapping of the space. For example, the sensor data may be of temperature, the spatial mapping may be temperature mapping of a room in which the temperature sensor is disposed. The calibration engine may consider long term drifts on a device basis. Examples for sensor calibration can be found in International Patent Application Serial No. PCT/US21/15378, filed Jan. 28, 2021, titled "SENSOR CALIBRATION AND OPERATION, which is incorporated herein by reference in its entirety. The data processing and/or analysis may be refreshed, e.g., periodically. For example, sensor sampling may be performed at most every 10 seconds (s), 20 s, 30 s, 45 s, 60 s, 2 minutes (min), 5 min, or 10 min. The sensor sampling may be performed between any of the aforementioned values (e.g., from every 10 s to every 10 min.) For example, spatial mapping of the sensed property (ies) may be performed at most every 1 minute (min), 2.5 min, 5 min, or 10 min. The spatial mapping may be performed between any of the aforementioned values (e.g., from every 1 min to every 10 min.). The sensor sampling and/or spatial mapping may be performed during periods of high and/or low occupancy of the facility. The sensor sampling and/or spatial mapping may be performed during periods of high and/or low activity in the facility (e.g., of personnel and/or machinery). The sensor sampling and/or spatial mapping may be performed randomly and/or at a whim.

In some embodiments, a device (e.g., sensor) can be designated as a golden device that can be used as a reference (e.g., as the golden standard) for calibration of the other sensors (e.g., of the same type in this or in another facility). The golden device may be a device that is the most calibrated in the facility or in a portion thereof (e.g., in the building, in the floor, and/or in the room). A calibrated and/or localized device may be utilized as a standard for calibrating and/or localizing other devices (e.g., of the same type). Such devices may be referred to as the "golden device." The golden device be utilized as a reference device. The golden device may be the one most calibrated and/or accurately localized in the facility (e.g., among devices of the same type).

In some embodiments, a plurality of sensors of the same type may be distributed in a plurality of locations or in a housing. For example, at least one of the plurality of sensors of the same type, may be part of an ensemble. For example, at least two of the plurality of sensors of the same type, may be part of at least two different ensembles. The device ensembles may be distributed in an enclosure. An enclosure may comprise a conference room or a cafeteria. For example, a plurality of sensors of the same type may measure an environmental characteristic (e.g., parameter) in the conference room. Responsive to measurement of the environmental parameter of an enclosure, a parameter topology of the enclosure may be generated. A parameter topology may be generated utilizing output signals from any type of sensor or device ensemble, e.g., as disclosed herein. Parameter topologies may be generated for any enclosure of a facility such as conference rooms, hallways, bathrooms, cafeterias, garages, auditoriums, utility rooms, storage facilities, equipment rooms, piers (e.g., electricity and/or elevator pier), and/or elevators. Examples of artificial intelligence techniques that may be used include: reactive, limited memory, theory of mind, and/or self-aware techniques know to those skilled in the art). Sensors may be configured to process, measure, analyze, detect and/or react to one or more of: data, temperature, humidity, sound, force, pressure, electromagnetic waves, position, distance, movement, flow, acceleration, speed, vibration, dust, light, glare, color, gas (es), pathogen exposure (or likely pathogen exposure), and/or other aspects (e.g., characteristics) of an environment (e.g., of an enclosure). The gases may include volatile organic compounds (VOCs). The gases may include carbon monoxide, carbon dioxide, formaldehyde, Napthalene, Taurine, water vapor (e.g., humidity), oxygen, radon, and/or hydrogen sulfide. The one or more sensors may be calibrated in a factory setting. A sensor may be optimized to be capable of performing accurate measurements of one or more environmental characteristics present in the factory setting. In some instances, a factory calibrated sensor may be less optimized for operation in a target environment. For example, a factory setting may comprise a different environment than a target environment. The target environment can be an environment in which the sensor is deployed. The target environment can be an environment in which the sensor is expected and/or destined to operate. The target environment may differ from a factory environment. A factory environment corresponds to a location at which the sensor was assembled and/or built. The target environment may comprise a factory in which the sensor was not assembled and/or built. In some instances, the factory setting may differ from the target environment to the extent that sensor readings captured in the target environment are erroneous (e.g., to a measurable extent). In this context, "erroneous" may refer to sensor readings that deviate from a specified accuracy (e.g., specified by a manufacture of the sensor). In some situations, a factory-calibrated sensor may provide readings that do not meet accuracy specifications (e.g., by a manufacturer) when operated in the target environments.

In some embodiments, processing sensor data comprises performing sensor data analysis. The sensor data analysis may comprise at least one rational decision making process, and/or learning. The sensor data analysis may be utilized to adjust and environment, e.g., by adjusting one or more components that affect the environment of the enclosure. The data analysis may be performed by a machine based system (e.g., a circuitry). The circuitry may be of a processor. The sensor data analysis may utilize artificial intelligence. The sensor data analysis may rely on one or more models (e.g., mathematical models). In some embodiments, the sensor data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, generalized linear model (GLM) technique, or deep learning technique. The neural network may comprise a dense neural network or along short-term memory (LSTM) network. The neural network may comprise an LSTM network or a deep neural network (DNN). Example DNN architectures that may be used in some implementations include Convolutional Neural Networks (CNNs), Recurrent Neural Networks (RNNs), Deep Belief Networks (DBNs), and the like.

In one embodiment, input features (e.g., a set of two-hundred (200) or more input features) are fed into a neural network. One example of neural network architecture is a deep dense neural network such as one having at least seven (7) layers and at least fifty-five (55) total nodes. In some DNN architectures, at least one (e.g., each) input feature is connected with at least one (e.g., each) first-layer node and at least one (e.g., each) node is a placeholder (variable X) that connects with at least one (e.g., every) other node. The nodes in the first layer model a relationship between all the input features. The nodes in subsequent layers learn a relation of relations modeled in at least one of the previous layers. When executing the DNN, the error can be iteratively minimized, e.g., by updating the coefficient weights of at least one (e.g., each) node placeholder.

Figure 6:
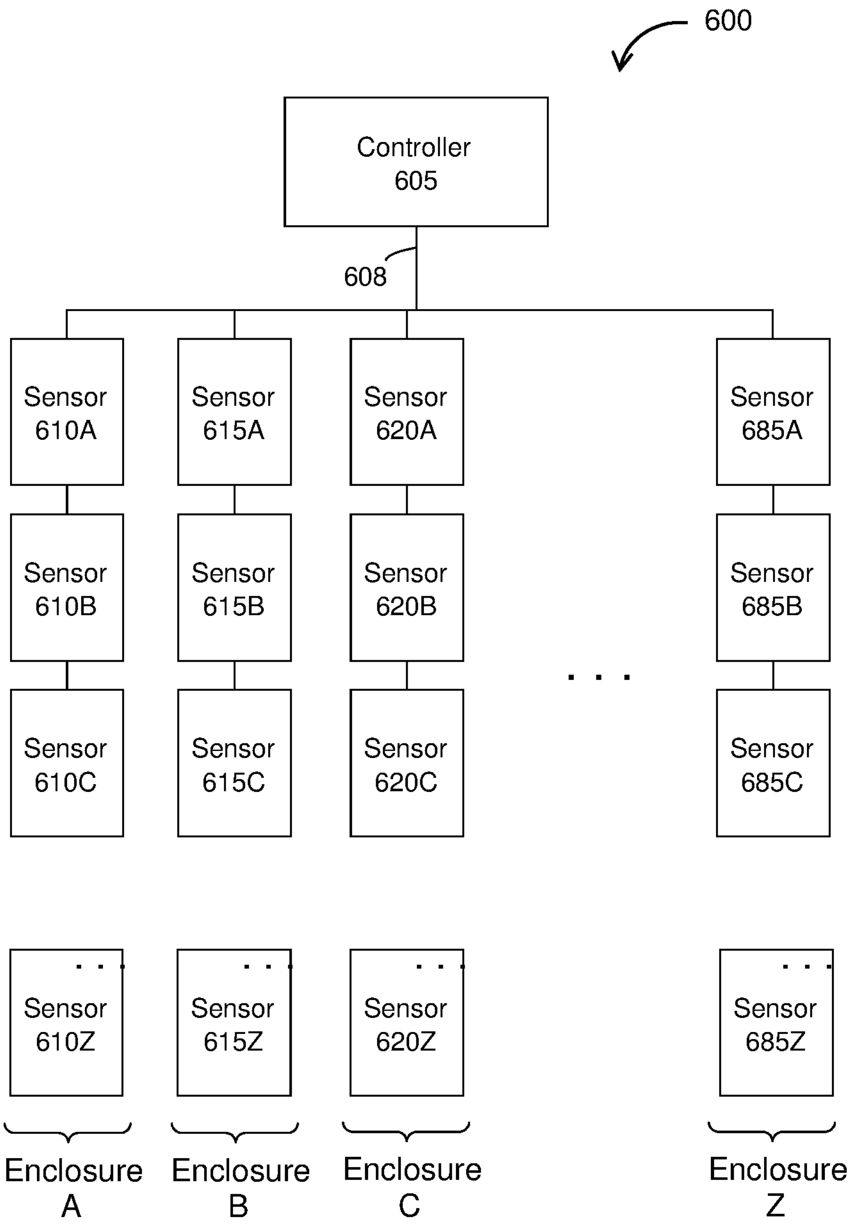
FIG. 6 shows a schematic example of a sensor arrangement.

FIG. 6 shows an example of a diagram 600 of an arrangement of sensors distributed among enclosures. In the example shown in FIG. 6, a controller 605 is communicatively linked 608 with sensors located in enclosure A (sensors 610A, 610B, 610C, . . . 610Z), enclosure B (sensors 615A, 615B, 615C, 615Z), enclosure C (sensors 620A, 620B, 620C, . . . 620Z), and enclosure Z (sensors 685A, 685B, 685C, . . . 685Z). Communicatively linked comprises wired and/or wireless communication. In some embodiments, a device ensemble includes at least two sensors of a differing types. In some embodiments, a device ensemble includes at least two emitters of a differing types. In some embodiments, a device ensemble includes at least two sensors of the same type (e.g., a sensor array). In some embodiments, a device ensemble includes at least two emitters of the same type (e.g., an emitter array such as a light emitting diode array).

In some embodiments, a device ensemble includes at least two sensors of the same type. In the example shown in FIG. 6, sensors 610A, 610B, 610C, . . . 610Z of enclosure A represent an ensemble. An ensemble of sensors can refer to a collection of diverse sensors. In some embodiments, at least two of the sensors in the ensemble cooperate to determine environmental parameters, e.g., of an enclosure in which they are disposed. For example, a device ensemble may include a carbon dioxide sensor, a carbon monoxide sensor, a volatile organic chemical compound sensor, an environmental noise sensor, a light (visible, UV, and IR) sensor, a temperature sensor, and/or a humidity sensor. A device ensemble may comprise other types of sensors, and claimed subject matter is not limited in this respect. The enclosure may comprise one or more sensors that are not part of an ensemble of sensors. The enclosure may comprise a plurality of ensembles. At least two of the plurality of ensembles may differ in at least one of their sensors. At least two of the plurality of ensembles may have at least one of their sensors that is similar (e.g., of the same type). For example, an ensemble can have two motion sensors and one temperature sensor. For example, an ensemble can have a carbon dioxide sensor and an IR sensor. The ensemble may include one or more devices that are not sensors. The one or more other devices that are not sensors may include sound emitter (e.g., buzzer), and/or electromagnetic radiation emitters (e.g., light emitting diode). In some embodiments, a single sensor (e.g., not in an ensemble) may be disposed adjacent (e.g., immediately adjacent such as contacting) another device that is not a sensor.

Sensors of a device ensemble may collaborate with one another. A sensor of one type may have a correlation with at least one other type of sensor. Data from a plurality of sensor types may by synthesized to provide a result. The result may relate to a property measured by at least one of the plurality of sensor types. The result may relate to a property not measured by any of the plurality of sensor types. Various sensors in the facility (e.g., of the same type and/or of different types) may work together, e.g., to bring about a requested result (e.g., to adjust an environment of the facility). The sensors may be included in an array of sensors disposed in the facility. A situation in an enclosure may affect one or more of different sensors. Sensor readings of the one or more different may be correlated and/or affected by the situation. The correlations may be predetermined. The correlations may be determined over a period of time (e.g., using a learning process). The period of time may be predetermined. The period of time may have a cutoff value. The cutoff value may consider an error threshold (e.g., percentage value) between a predictive sensor data and a measured sensor data, e.g., in similar situation(s). The time may be ongoing. The correlation may be derived from a learning set (also referred to herein as "training set"). The learning set may comprise, and/or may be derived from, real time observations in the enclosure. The observations may include data collection (e.g., from sensor(s)). The learning set may comprise sensor(s) data from a similar enclosure. The learning set may comprise third party data set (e.g., of sensor(s) data). The learning set may derive from simulation, e.g., of one or more environmental conditions affecting the enclosure. The learning set may compose detected (e.g., historic) signal data to which one or more types of noise were added. The correlation may utilize historic data, third party data, and/or real time (e.g., sensor) data. The correlation between two sensor types may be assigned a value. The value may be a relative value (e.g., strong correlation, medium correlation, or weak correlation). The learning set that is not derived from real-time measurements, may serve as a benchmark (e.g., baseline) to initiate operations of the sensors and/or various components that affect the environment (e.g., HVAC system, and/or tinting windows). Real time sensor data may supplement the learning set, e.g., on an ongoing basis or for a defined time period. The (e.g., supplemented) learning set may increase in size during deployment of the sensors in the environment. The initial learning set may increase in size, e.g., with inclusion of additional (i) real time measurements, (ii) sensor data from other (e.g., similar) enclosures, (iii) third party data, (iv) other and/or updated simulation.

In some embodiments, data from sensors may be correlated. Once a correlation between two or more sensor types is established, a deviation from the correlation (e.g., from the correlation value) may indicate an irregular situation and/or malfunction of a sensor of the correlating sensors. The malfunction may include a slippage of a calibration. The malfunction may indicate a requirement for re-calibration of the sensor. A malfunction may comprise complete failure of the sensor. In an example, a movement sensor may collaborate with a carbon dioxide sensor. In an example, responsive to a movement sensor detecting movement of one or more individuals in an enclosure, a carbon dioxide sensor may be activated to begin taking carbon dioxide measurements. An increase in movement in an enclosure, may be correlated with increased levels of carbon dioxide. In another example, a motion sensor detecting individuals in an enclosure may be correlated with an increase in noise detected by a noise sensor in the enclosure.

Figure 7:
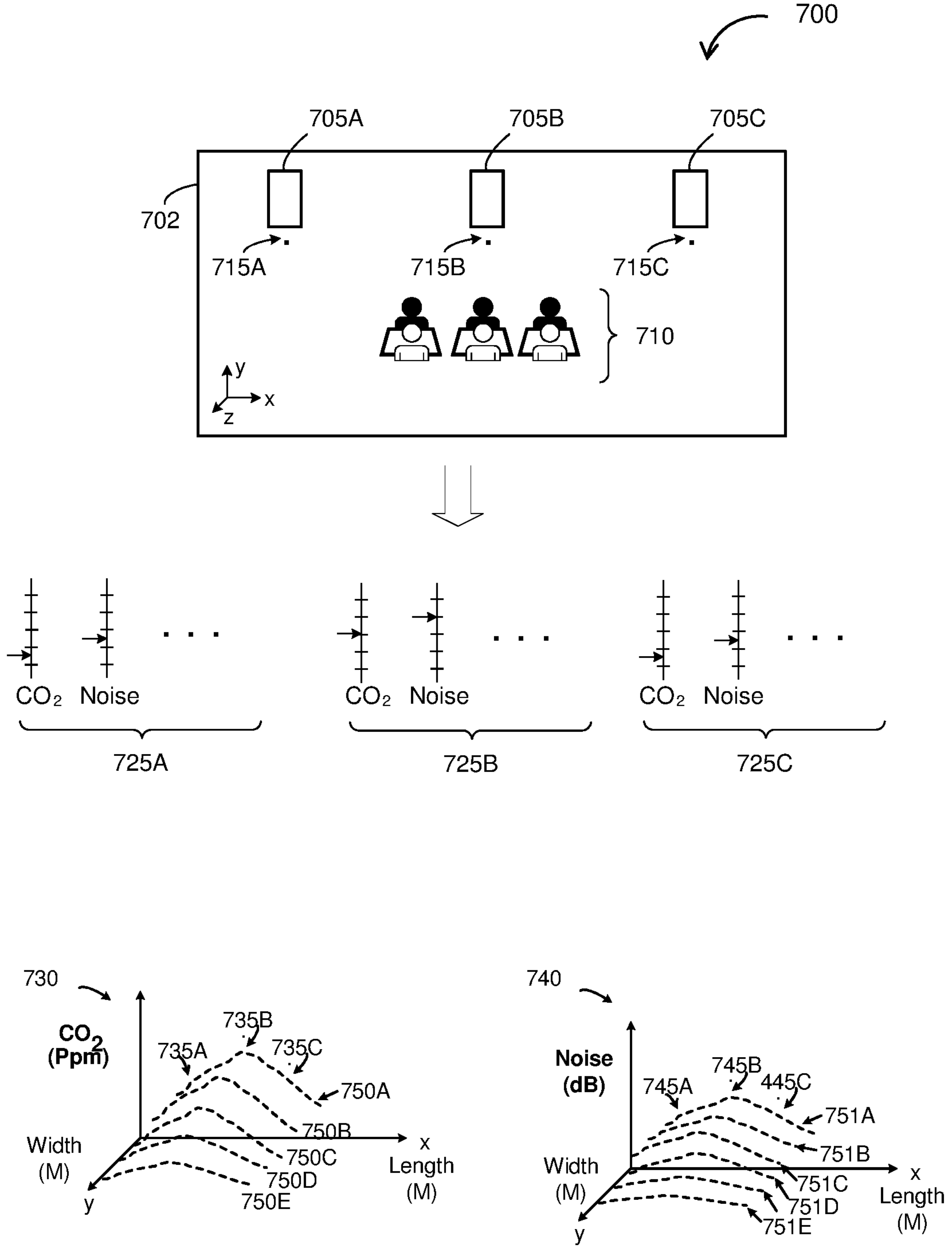
FIG. 7 shows a schematic example of a sensor arrangement and sensor data.

In some embodiments, detection by a first type of sensor that is not accompanied by detection by a second type of sensor, may result in a sensor posting an error message. For example, if a motion sensor detects numerous individuals in an enclosure without detecting an increase in carbon dioxide and/or noise, the carbon dioxide sensor and/or the noise sensor may be identified as having failed or as having an erroneous output. An error message may be posted. A first plurality of different correlating sensors in a first ensemble may include one sensor of a first type, and a second plurality of sensors of different types. If the second plurality of sensors indicate a correlation, and the one sensor indicates a reading different from the correlation, there is an increased likelihood that the one sensor malfunctions. If the first plurality of sensors in the first ensemble detect a first correlation, and a third plurality of correlating sensors in a second ensemble detect a second correlation different from the first correlation, there is an increased likelihood that the situation to which the first ensemble of sensors is exposed to is different from the situation to which the third ensemble of sensors are exposed to. Sensors of a device ensemble may collaborate with one another. The collaboration may comprise considering sensor data of another sensor (e.g., of a different type) in the ensemble. The collaboration may comprise trends projected by the other sensor (e.g., type) in the ensemble. The collaboration may comprise trends projected by data relating to another sensor (e.g., type) in the ensemble. The other sensor data can be derived from the other sensor in the ensemble, from sensors of the same type in other ensembles, or from data of the type collected by the other sensor in the ensemble, which data does not derive from the other sensor. For example, a first ensemble may include a pressure sensor and a temperature sensor. The collaboration between the pressure sensor and the temperature sensor may comprise considering pressure sensor data while analyzing and/or projecting temperature data of the temperature sensor in the first ensemble. The pressure data may be (i) of a pressure sensor in the first ensemble, (ii) of pressure sensor(s) in one or more other ensembles, (iii) pressure data of other sensor(s) and/or (iv) pressure data of a third party. FIG. 7 shows an example of a diagram 700 of an arrangement of device ensembles distributed within an enclosure. In the example shown in FIG. 7, a group 710 of individuals are seated in a conference room 702. The conference room includes an "X" dimension to indicate length, a "Y" dimension to indicate height, and a "Z" dimension to indicate depth. XYZ are directions in a Cartesian coordination system. Device ensembles 705A, 705B, and 705C comprise sensors can operate similar to sensors described in reference to device ensembles 323 of FIG. 3. At least two device ensembles (e.g., 705A, 705B, and 705C) may be integrated into a single sensor module. Device ensembles 705A, 705B, and 705C can include a carbon dioxide ($CO_2$) sensor, an ambient noise sensor, or any other sensor disclosed herein. In the example shown in FIG. 7, a first device ensemble 705A is disposed (e.g., installed) near point 715A, which may correspond to a location in a ceiling, wall, or other location to a side of a table at which the group 710 of individuals are seated. In the example shown in FIG. 7, a second device ensemble 705B is disposed (e.g., installed) near point 715B, which may correspond to a location in a ceiling, wall, or other location above (e.g., directly above) a table at which the group 710 of individuals are seated. In the example shown in FIG. 7, a third device ensemble 705C may be disposed (e.g., installed) at or near point 715C, which may correspond to a location in a ceiling, wall, or other location to a side of the table at which the relatively small group 710 of individuals are seated. Any number of additional sensors and/or sensor modules may be positioned at other locations of conference room 702. The device ensembles may be disposed anywhere in the enclosure. The location of an ensemble of sensors in an enclosure may have coordinates (e.g., in a Cartesian coordinate system). At least one coordinate (e.g., of x, y, and z) may differ between two or more device ensembles, e.g., that are disposed in the enclosure. At least two coordinates (e.g., of x, y, and z) may differ between two or more device ensembles, e.g., that are disposed in the enclosure. All the coordinates (e.g., of x, y, and z) may differ between two or more device ensembles, e.g., that are disposed in the enclosure. For example, two device ensembles may have the same x coordinate, and different y and z coordinates. For example, two device ensembles may have the same x and y coordinates, and a different z coordinate. For example, two device ensembles may have different x, y, and z coordinates. In some embodiments, one or more sensors of the device ensemble provide readings. In some embodiments, the sensor is configured to sense a parameter. The parameter may comprise temperature, particulate matter, volatile organic compounds, electromagnetic energy, pressure, acceleration, time, radar, lidar, glass vibrations, glass breakage, movement, or gas. The gas may comprise a Nobel gas. The gas may be a gas harmful to an average human. The gas may be a gas present in the ambient atmosphere (e.g., oxygen, carbon dioxide, ozone, chlorinated carbon compounds, or nitrogen compounds). The gas may comprise radon, carbon monoxide, hydrogen sulfide, hydrogen, oxygen, water (e.g., humidity), Nitric oxide (NO) or nitrogen dioxide ($NO_2$). The electromagnetic sensor may comprise an infrared, visible light, ultraviolet sensor. The infrared radiation may be passive infrared radiation (e.g., black body radiation). The electromagnetic sensor may sense radio waves. The radio waves may comprise wide band, or ultra-wideband radio signals. The radio waves may comprise pulse radio waves. The radio waves may comprise radio waves utilized in communication. The radio waves may be at a medium frequency of at least about 300 kilohertz (KHz), 500 KHz, 800 KHz, 1,000 KHz, 1,500 KHz, 2,000 KHz, or 2,500 KHz. The radio waves may be at a medium frequency of at most about 500 KHz, 800 KHz, 1,000 KHz, 1,500 KHz, 2,000 KHz, 2,500 KHz, or 3,000 KHz. The radio waves may be at any frequency between the aforementioned frequency ranges (e.g., from about 300 KHz to about 3,000 KHz). The radio waves may be at a high frequency of at least about 3 megahertz (MHz), 5 MHz, 8 MHz, 10 MHz, 15 MHz, 20 MHz, or 25 MHz. The radio waves may be at a high frequency of at most about 5 MHz, 8 MHz, 10 MHz, 15 MHz, 20 MHz, 25 MHz, or 30 MHz. The radio waves may be at any frequency between the aforementioned frequency ranges (e.g., from about 3 MHz to about 30 MHz). The radio waves may be at a very high frequency of at least about 30 Megahertz (MHz), 50 MHz, 80 MHz, 100 MHz, 150 MHz, 200 MHz, or 250 MHz. The radio waves may be at a very high frequency of at most about 50 MHz, 80 MHz, 100 MHz, 150 MHz, 200 MHz, 250 MHz, or 300 MHz. The radio waves may be at any frequency between the aforementioned frequency ranges (e.g., from about 30 MHz to about 300 MHz). The radio waves may be at an ultra-high frequency of at least about 300 kilohertz (MHz), 500 MHz, 800 MHz, 1,000 MHz, 1,500 MHz, 2,000 MHz, or 2,500 MHz. The radio waves may be at an ultra-high frequency of at most about 500 MHz, 800 MHz, 1,000 MHz, 1,500 MHz, 2,000 MHz, 2,500 MHz, or 3,000 MHz. The radio waves may be at any frequency between the aforementioned frequency ranges (e.g., from about 300 MHz to about 3,000 MHz). The radio waves may be at a super high frequency of at least about 3 gigahertz (GHz), 5 GHz, 8 GHz, 10 GHz, 15 GHz, 20 GHz, or 25 GHz. The radio waves may be at a super high frequency of at most about 5 GHz, 8 GHz, 10 GHz, 15 GHz, 20 GHz, 25 GHz, or 30 GHz. The radio waves may be at any frequency between the aforementioned frequency ranges (e.g., from about 3 GHz to about 30 GHz).

The gas sensor may sense a gas type, flow (e.g., velocity and/or acceleration), pressure, and/or concentration. The readings may have an amplitude range. The readings may have a parameter range. For example, the parameter may be electromagnetic wavelength, and the range may be a range of detected wavelengths.

Figure 8:
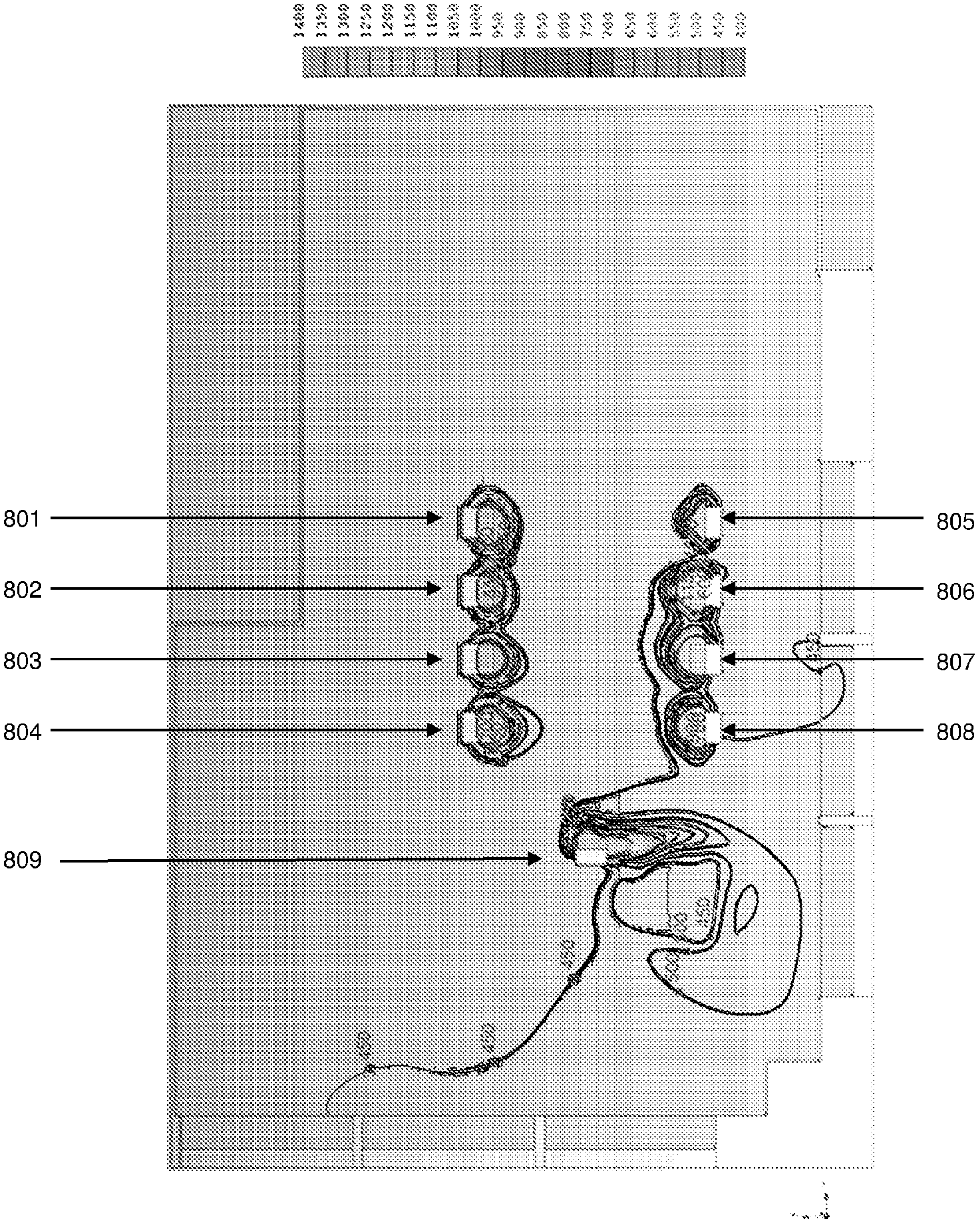
FIG. 8 shows a topographic map of measured property values.

In some embodiments, the sensor data is responsive to the environment in the enclosure and/or to any inducer(s) of a change (e.g., any environmental disruptor) in this environment. The sensors data may be responsive to emitters operatively coupled to (e.g., in) the enclosure (e.g., an occupant, appliances (e.g., heater, cooler, ventilation, and/or vacuum), opening). For example, the sensor data may be responsive to an air conditioning duct, or to an open window. The sensor data may be responsive to an activity taking place in the room. The activity may include human activity, and/or non-human activity. The activity may include electronic activity, gaseous activity, and/or chemical activity. The activity may include a sensual activity (e.g., visual, tactile, olfactory, auditory, and/or gustatory). The activity may include an electronic and/or magnetic activity. The activity may be sensed by a person. The activity may not be sensed by a person. The sensors data may be responsive to the occupants in the enclosure, substance (e.g., gas) flow, substance (e.g., gas) pressure, and/or temperature. In one example, device ensembles 705A, 705B, and 705C may include a carbon dioxide ($CO_2$) sensor, and an ambient noise sensor. A carbon dioxide sensor of device ensemble 705A may provide a reading as depicted in sensor output reading profile 725A. A noise sensor of device ensemble 705A may provide a reading depicted in sensor output reading profile 725A. A carbon dioxide sensor of device ensemble 705B may provide a reading as depicted in sensor output reading profile 725B. A noise sensor of device ensemble 705B may provide a reading also as depicted in sensor output reading profile 725B. Sensor output reading profile 725B may indicate higher levels of carbon dioxide and noise relative to sensor output reading profile 725A. Sensor output reading profile 725C may indicate lower levels of carbon dioxide and noise relative to sensor output reading profile 725B. Sensor output reading profile 725C may indicate carbon dioxide and noise levels similar to those of sensor output reading profile 725A. Sensor output reading profiles 725A, 725B, and 725C may comprise indications representing other sensor readings, such as temperature, humidity, particulate matter, volatile organic compounds, ambient light, pressure, acceleration, time, radar, lidar, ultra-wideband radio signals, passive infrared, and/or glass breakage, movement detectors. In some embodiments, data from a sensor in a sensor in the enclosure (e.g., and in the device ensemble) is collected and/or processed (e.g., analyzed). The data processing can be performed by a processor of the sensor, by a processor of the device ensemble, by another sensor, by another ensemble, in the cloud, by a processor of the controller, by a processor in the enclosure, by a processor outside of the enclosure, by a remote processor (e.g., in a different facility), by a manufacturer (e.g., of the sensor, of the window, and/or of the building network). The data of the sensor may have a time indicator (e.g., may be time stamped). The data of the sensor may have a sensor location identification (e.g., be location stamped). The sensor may be identifiably coupled with one or more controllers. In particular embodiments, sensor output reading profiles 725A, 725B, and 725C may be processed. For example, as part of the processing (e.g., analysis), the sensor output reading profiles may be plotted on a graph depicting a sensor reading as a function of a dimension (e.g., the "X" dimension) of an enclosure (e.g., conference room 702). In an example, a carbon dioxide level indicated in sensor output reading profile 725A may be indicated as point 735A of $CO_2$ graph 730 of FIG. 7. In an example, a carbon dioxide level of sensor output reading profile 725B may be indicated as point 735B of $CO_2$ graph 730. In an example, a carbon dioxide level indicated in sensor output reading profile 725C may be indicated as point 735C of $CO_2$ graph 730. In an example, an ambient noise level indicated in sensor output reading profile 725A may be indicated as point 745A of noise graph 740. In an example, an ambient noise level indicated in sensor output reading profile 725B may be indicated as point 745B of noise graph 740. In an example, an ambient noise level indicated in sensor output reading profile 725C may be indicated as point 745C of noise graph 740. In some embodiments, processing data derived from the sensor comprises applying one or more models. The models may comprise mathematical models. The processing may comprise fitting of models (e.g., curve fitting). The model may be multi-dimensional (e.g., two or three dimensional). The model may be represented as a graph (e.g., 2 or 3 dimensional graph). For example, the model may be represented as a contour map (e.g., as depicted in FIG. 7). The modeling may comprise one or more matrices. The model may comprise a topological model. The model may relate to a topology of the sensed parameter in the enclosure. The model may relate to a time variation of the topology of the sensed parameter in the enclosure. The model may be environmental and/or enclosure specific. The model may consider one or more properties of the enclosure (e.g., dimensionalities, openings, and/or environmental disrupters (e.g., emitters)). Processing of the sensor data may utilize historical sensor data, and/or current (e.g., real time) sensor data. The data processing (e.g., utilizing the model) may be used to project an environmental change in the enclosure, and/or recommend actions to alleviate, adjust, or otherwise react to the change. In particular embodiments, device ensembles 705A, 705B, and/or 705C, may be capable of accessing a model to permit curve fitting of sensor readings as a function of one or more dimensions of an enclosure. In an example, a model may be accessed to generate sensor profile curves 750A, 750B, 750C, 750D, and 750E, utilizing points 735A, 735B, and 735C of $CO_2$ graph 730. In an example, a model may be accessed to generate sensor profile curves 751A, 751B, 751C, 751B, and 751E utilizing points 745A, 745B, and 745C of noise graph 740. Additional models may utilize additional readings from device ensembles (e.g., 705A, 705B, and/or 705C) to provide curves in addition to sensor profile curves 750 and 751 of FIG. 7. Sensor profile curves generated in response to use of a model may sensor output reading profiles indicate a value of a particular environmental parameter as a function of a dimension of an enclosure (e.g., an "X" dimension, a "Y" dimension, and/or a "Z" dimension). In certain embodiments, one or more models utilized to form curves 750A-750E and 751A-751E) may provide a parameter topology of an enclosure. In an example, a parameter topology (as represented by curves 750A-750E and 751A-751E) may be synthesized or generated from sensor output reading profiles. The parameter topology may be a topology of any sensed parameter disclosed herein. In an example, a parameter topology for a conference room (e.g., conference room 702) may comprise a carbon dioxide profile having relatively low values at locations away from a conference room table and relatively high values at locations above (e.g., directly above) a conference room table. In an example, a parameter topology for a conference room may comprise a multi-dimensional noise profile having relatively low values at locations away from a conference table and slightly higher values above (e.g., directly above) a conference room table. In an example, for a carbon dioxide sensor, a relevant parameter may correspond to carbon dioxide concentration. In an example, a carbon dioxide sensor may determine that a time window during which fluctuations in carbon dioxide concentration could be minimal corresponds to a two-hour period, e.g., between 5:00 AM and 7:00 AM. Self-calibration may initiate at 5:00 AM and continue while searching for a duration within these two hours during which measurements are stable (e.g., minimally fluctuating). In some embodiments, the duration is sufficiently long to allow separation between signal and noise. In an example, data from a carbon dioxide sensor may facilitate determination that a 5-minute duration (e.g., between 5:25 AM and 5:30 AM) within a time window between 5:00 AM and 7:00 AM forms an optimal time period to collect a lower baseline. The determination can be performed at least in part (e.g., entirely) at the sensor level. The determination can be performed by one or more processors operatively couple to the sensor. During a selected duration, a sensor may collect readings to establish a baseline, which may correspond to a lower threshold. In an example, for gas sensors disposed in a room (e.g., in an office environment), a relevant parameter may correspond to gas (e.g., $CO_2$) levels, where desired levels are typically in a range of about 1,000 ppm or less. In an example, a $CO_2$ sensor may determine that self-calibration should occur during a time window where $CO_2$ levels are minimal such as when no occupants are in the vicinity of the sensor. Time windows during which fluctuations in $CO_2$ levels are minimal, may correspond to, e.g., a one-hour period during lunch from about 12:00 PM to about 1:00, and during closed business hours. FIG. 8 shows a contour map example of a horizontal (e.g., top) view of an office environment depicting various levels of $CO_2$ concentrations. The office environment may include a first occupant 801, a second occupant 802, a third occupant 803, a fourth occupant 804, a fifth occupant 805, a sixth occupant 806, a seventh occupant 807, an eighth occupant 808, and a ninth occupant 809. The gas ($CO_2$) concentrations may be measured by sensors placed at various locations in the enclosure (e.g., office). In an example, for an ambient noise sensor disposed in a crowded area such as a cafeteria, a relevant parameter may correspond to sound pressure (e.g., noise) level measured in decibels above background atmospheric pressure. In an example, an ambient noise sensor may determine that self-calibration should occur during a time window while fluctuations in sound pressure level are minimal. A time window while fluctuations in sound pressure are minimal may correspond to a one-hour period from about 12:00 AM to about 1:00 AM. Self-calibration may continue with the sensor determining a duration within a window during which may be made to establish a baseline (e.g., an upper threshold). In an example, an ambient noise sensor may determine that a 10-minute duration (e.g., from about 12:30 AM to about 12:40 AM) within a time window of from about 12:00 AM to about 1:00 AM forms an optimal time to collect an upper baseline, which may correspond to an upper threshold.

At least two sensors of the plurality of sensors may be of a different type (e.g., are configured to measure different properties). Various sensor types can be assembled together (e.g., bundled up) and form a device ensemble. The plurality of sensors may be coupled to one electronic board. The electrical connection of at least two of the plurality of sensors in the sensor suit may be controlled (e.g., manually and/or automatically). For example, the device ensemble may be operatively coupled to, or comprise, a controller (e.g., a microcontroller). The controller may control and on/off connectivity of the sensor to electrical power. The controller can thus control the time (e.g., period) at which the sensor will be operative.

Figure 9:
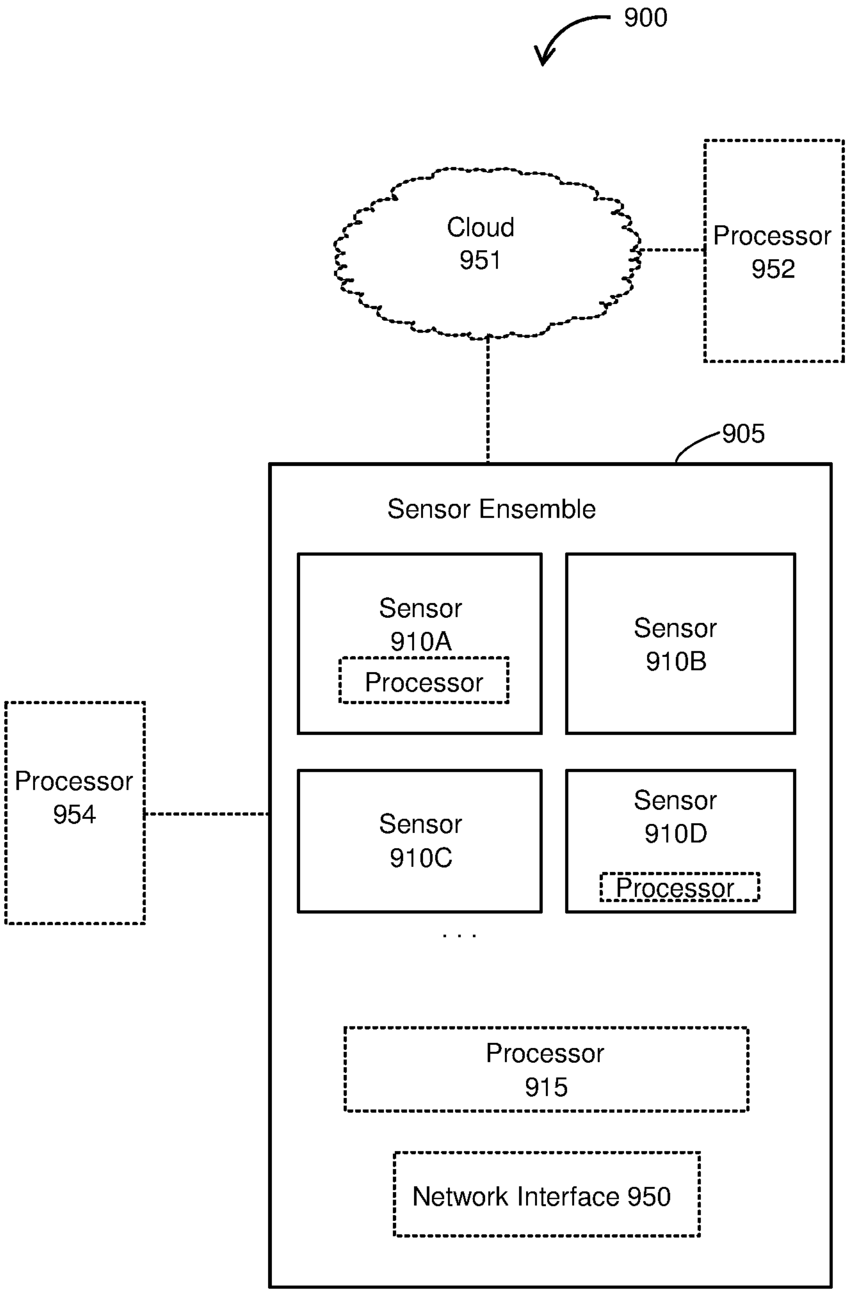
FIG. 9 shows an apparatus, its components, and connectivity options.
Figure 10:
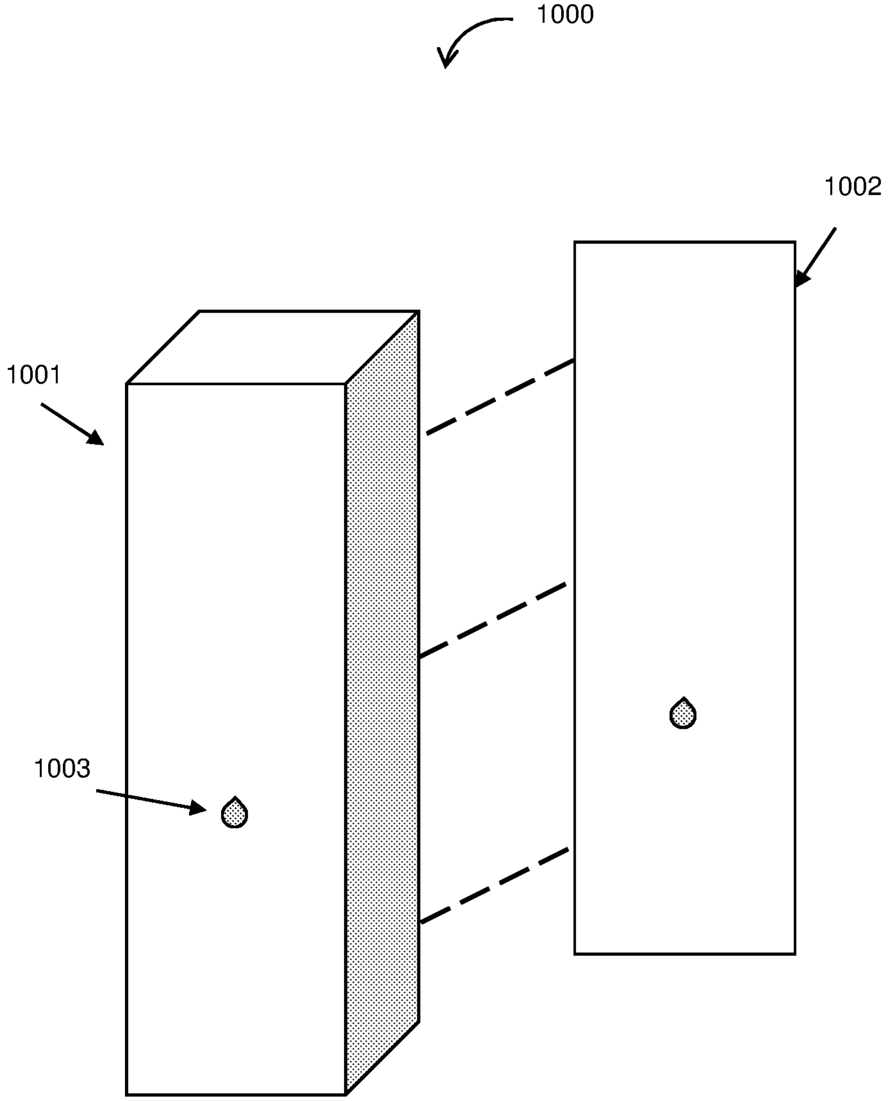
FIG. 10 schematically shows various views and configurations of assembly housings.

In some embodiments, baseline of one or more sensors of the device ensemble may drift. A recalibration may include one or more (e.g., but not all) sensors of a device ensemble. For example, a collective baseline drift can occur in at least two sensor types in a given device ensemble. A baseline drift in one sensor of the device ensemble may indicate malfunction of the sensor. Baseline drifts measured in a plurality of sensors in the device ensemble, may indicate a change in the environment sensed by the sensors in the device ensemble (e.g., rather than malfunction of these baseline drifted sensors). Such sensor data baseline drifts may be utilized to detect environmental changes. For example (i) that a building was erected/destroyed next to the device ensemble, (ii) that a ventilation channel was altered (e.g., damaged) next to the device ensemble, (iii) that a refrigerator is installed/dismantled next to the device ensemble, (iv) that a working location of a person is altered relative (e.g., and adjacent) to the device ensemble, (v) that an electronic change (e.g., malfunction) is experienced by the device ensemble, (vi) that a structure (e.g., interior wall) has been changed, or (vii) any combination thereof. In this manner, the data can be used e.g. to update a three-dimensional (3D) model of the enclosure. In some embodiments, one or more sensors are added or removed from a community of sensors, e.g., disposed in the enclosure and/or in the device ensemble. Newly added sensors may inform (e.g., beacon) other members of a community of sensor of its presence and relative location within a topology of the community. Examples of sensor community(ies) can be found, for example, in U.S. Provisional Patent Application Ser. No. 62/958,653 that was filed Jan. 8, 2020 titled "SENSOR AUTOLOCATION" that is incorporated by reference herein in its entirety. Sensors of a device ensemble may be organized into a sensor module. A device ensemble may comprise at least one circuit board, such as a printed circuit board, in which a number of devices (e.g., sensors and/or emitters) are adhered or affixed to the at least one circuit board. Devices can be removed from the device ensemble. For example, a sensor may be plugged and/or unplugged from the circuit board. Sensors may be individually activated and/or deactivated (e.g., using a switch). The circuit board may comprise a polymer. The circuit board may be transparent or non-transparent. The circuit board may comprise metal (e.g., elemental metal and/or metal alloy). The circuit board may comprise a conductor. The circuit board may comprise an insulator. The circuit board may comprise any geometric shape (e.g., rectangle or ellipse). The circuit board may be configured (e.g., may be of a shape) to allow the ensemble to be disposed in a mullion (e.g., of a window). The circuit board may be configured (e.g., may be of a shape) to allow the ensemble to be disposed in a frame (e.g., door frame and/or window frame). The mullion, transom, and/or frame may comprise one or more holes to allow the sensor(s) to obtain (e.g., accurate) readings. The sensor ensemble may comprise a housing. The housing may comprise one or more holes to facilitate sensor readings. The circuit board may include an electrical connectivity port (e.g., socket). The circuit board may be connected to a power source (e.g., to electricity). The power source may comprise renewable or non-renewable power source. FIG. 9 shows an example of a system 900 including an ensemble of sensors organized into a sensor module. Sensors 910A, 910B, 910C, and 910D are shown as included in a device ensemble 905. The device ensembles (including the device ensemble 905) that are organized into a sensor module may include at least 1, 2, 4, 5, 8, 10, 20, 50, or 500 sensors. The sensor module may include a number of sensors in a range between any of the aforementioned values (e.g., from about 1 to about 1,000, from about 1 to about 500, or from about 500 to about 1,000). Sensors of a sensor module may comprise sensors configured or designed for sensing a parameter comprising, temperature, humidity, carbon dioxide, particulate matter (e.g., between 2.5 μm and 10 μm), total volatile organic compounds (e.g., via a change in a voltage potential brought about by surface adsorption of volatile organic compound), ambient light, audio noise level, pressure (e.g. gas, and/or liquid), acceleration, time, radar, lidar, radio signals (e.g., ultra-wideband radio signals), passive infrared, glass breakage, or movement detectors. The device ensemble (e.g., 905) may comprise non-sensor devices, such as buzzers and light emitting diodes. Examples of device ensembles and their uses can be found in U.S. patent application Ser. No. 16/447,169 filed Jun. 20, 2019, titled "SENSING AND COMMUNICATIONS UNIT FOR OPTICALLY SWITCHABLE WINDOW SYS- TEMS," that is incorporated herein by reference in its entirety. In some embodiments, an increase in the number and/or types of sensors may be used to increase a probability that one or more measured property is accurate and/or that a particular event measured by one or more sensor has occurred. In some embodiments, sensors of device ensemble and/or of different device ensembles may cooperate with one another. In an example, a radar sensor of device ensemble may determine presence of a number of individuals in an enclosure. A processor (e.g., processor 915) may determine that detection of presence of a number of individuals in an enclosure is positively correlated with an increase in carbon dioxide concentration. In an example, the processor-accessible memory may determine that an increase in detected infrared energy is positively correlated with an increase in temperature as detected by a temperature sensor. In some embodiments, network interface (e.g., 950) may communicate with other device ensembles similar to device ensemble. The network interface may additionally communicate with a controller. Individual sensors (e.g., sensor 910A, sensor 910D, etc.) of a device ensemble may comprise and/or utilize at least one dedicated processor. A device ensemble may utilize a remote processor (e.g., 954) utilizing a wireless and/or wired communications link. A device ensemble may utilize at least one processor (e.g., processor 952), which may comprise a cloud-based processor coupled to a device ensemble via the cloud (e.g., 951). Processors (e.g., 952 and/or 954) may be located in the same building, in a different building, in a building owned by the same or different entity, a facility owned by the manufacturer of the window/controller/device ensemble, or at any other location. In various embodiments, as indicated by the dotted lines of FIG. 9, device ensemble 905 is not required to comprise a separate processor and network interface. These entities may be separate entities and may be operatively coupled to ensemble 905. The dotted lines in FIG. 9 designate optional features. In some embodiments, onboard processing and/or memory of one or more ensemble of sensors may be used to support other functions (e.g., via allocation of ensembles(s) memory and/or processing power to the network infrastructure of a building). In some embodiments, a plurality of sensors of the same type may be distributed in an enclosure. At least one of the plurality of sensors of the same type, may be part of an ensemble. For example, at least two of the plurality of sensors of the same type, may be part of at least two ensembles. The device ensembles may be distributed in an enclosure. An enclosure may comprise a conference room. For example, a plurality of sensors of the same type may measure an environmental parameter in the conference room. Responsive to measurement of the environmental parameter of an enclosure, a parameter topology of the enclosure may be generated. A parameter topology may be generated utilizing output signals from any type of sensor of device ensemble, e.g., as disclosed herein. Parameter topologies may be generated for any enclosure of a facility such as conference rooms, hallways, bathrooms, cafeterias, garages, auditoriums, utility rooms, storage facilities, equipment rooms, and/or elevators. FIG. 10 shows an example of a device ensemble (e.g., an assembly) 1,000 having a protective housing 1001. The housing may include mounting features that enable it to be captured in a wall-mount adapter, a window frame portion section (e.g., mullion), or a ceiling-mount adapter. The housing may expose its front face (e.g., only) to a viewer in the enclosure, as its body may be disposed within a wall mounting, ceiling mounting, or frame portion, e.g., as shown in the example of 1002. The front face may be a (e.g., reversibly openable and closeable) cover of the hosing. The housing 1001 may comprise one or more features desirable for optimal performance of modules in corresponding locations, such as one or more opening for admitting external environmental characteristic(s) into the housing to facilitate their sensing by the sensor(s). For example, the housing may comprise one or more openings (e.g., holes 1003) that facilitate air to contact temperature, humidity, pressure, and dust sensors. The opening may have any shape. The opening may comprise a straight line or a curvature. A plurality of openings may form a (e.g., natural or abstract) shape such as petals of a flower. The external housing cover may comprise smooth and/or rough portions. The rough portions may visually mask the hole(s). The external cover may have at least a portion that comprises a rough texture, e.g., that comprises a screen, cloth, embossing, scribing, or indentations. Other examples of housing features include speaker or microphone grilles and an aperture for a camera lens, motion sensor, or an ambient light sensor. The one or more openings may be exposed in the front of the housing that faces an occupant of the enclosure. The housing may be masked by a textured area surrounding and/or engulfing the openings. The textured area may be patterned or irregular. The pattern may comprise any geometric shape such as space filling polygons (e.g., squares, rectangles, hexagons, or triangles). The pattern may be devoid of space filling polygons. The space filling polygons may be of a single type or of a plurality of types (e.g., at least 2 or 3 types). The textured pattern may comprise a curved line, or a straight line. The textured pattern may be devoid of a curved line or a straight line. The textured pattern may be a mesh. The textured pattern may be formed by the same, or by a different material than the rest of the hosing. For example, the housing may be formed of plastic, and the textured area may be a mesh and/or cloth at least partially covering the openings portion of the housing. The textured pattern may comprise a shape that resembles the opening. The opening may resemble flower petals or leaves. The textured pattern may cover at least an eight, a fifth, a fourth, a third, or a half of a front portion of the housing, which front portion faces an occupant. The housing may be attached to a fixture such as wall and/or ceiling, directly, using a frame, and/or by a post or mast. In some embodiments, the housing encloses at least one circuit board. The circuit board can be configured to accommodate (or accommodate) one or more devices. The devices can be reversibly integrated into the circuit board. For example, at least one device can be inserted or extracted from the circuit board (e.g., for maintenance, repair, exchange, or removal). The board may have one side on which the circuitry and/or devices are disposed. The one side may face the front of the housing. The front of the housing may face an occupant in the enclosure in which the housing is disposed. The one side may face the back of the housing. The back of the housing may face away from an occupant in the enclosure in which the housing is disposed. The board may have two sides onto which the circuitry and/or devices are disposed. The board may have one or more holes. The holes may facilitate passing of at least one environmental characteristic. The holes may facilitate passing of gas, sound, or electromagnetic radiation. For example, a sensor may be disposed at a back of the circuit board and sense an environmental quality that reaches the sensor from the enclosure, through the one or more holes. The board may have first device(s) disposed on a first side, and circuitry disposed on a second side. The board may have first device(s) disposed on a first side, and second device(s) disposed on a second side. The board may include one or more heat sinks. The heat sink(s) may be disposed at locations that are prone to heat generation and/or accumulation. The board may be operatively coupled and/or include partition(s). The partition(s) may be utilized to reduce unwanted consequences (e.g., interference) of device coexistence in the housing and/or on the board. The housing may comprise one or more circuit boards. The circuit boards are communicatively coupled with each other (e.g., directly or indirectly). The circuit boards may be operatively (e.g., communicatively) coupled to each other by wiring and/or wireless. The circuit boards may be operatively (e.g., communicatively) coupled to the network wiring and/or wireless. The housing may comprise an elemental metal, metal alloy, polymer, resin, glass, or sapphire. The housing may comprise transparent or non-transparent portions. Transparent may be to any electromagnetic radiation range disclosed herein (e.g., UV, IR, and/or visible radiation).

In some embodiments, environmental characteristics of an enclosure can be monitored and adjusted to promote enhanced health, wellness, and/or performance of the enclosure occupant(s). The control may utilize at least one Artificial Intelligence (AI) engine. The environmental characteristic(s) can be monitored by one or more sensors disposed in the enclosure. Models can be constructed using baseline readings from the sensors, three-dimensional (abbreviated herein as "3D") schematics of the enclosure, and/or physical properties (e.g., material properties) of fixture(s) of the enclosure. A control system can use the AI engine to refine the models using sensor readings of the enclosure environment, to monitor and adjust the environment of the enclosure. The AI engine can refine the model(s), e.g., using predictive extrapolation based at least in part on trend, and/or expected physical parameters. The environment may be adjusted, e.g., by administering environmental adjustments of various devices (e.g., heating, ventilation, and air conditioning system, abbreviated herein as "HVAC") adjustments directly, and/or by using a Building Management System (abbreviated herein as "BMS"). The AI modeling of the enclosure may include usage of locations on a grid. The grid may be adjustable. The grid may have a higher spatial resolution than the spacing of the sensors. The grid may have varied resolution on some of its portions. The grid may be non-homogenous.

In some embodiments, an artificial Intelligence (AI) engine can be used for control and/or prediction of environmental characteristics in the environment. The AI engine can provide recommendation regarding an alteration of one or more environmental characteristics based at least in part on the results (e.g., predications) of the AI engine. The AI engine may use data from one or more buildings. A facility may comprise one or more buildings. The AI engine may use structural data of the facility (e.g., building, and/or layout such as workplace layout), (e.g., real time) sensor data, simulation data, third party data, and/or experimental (e.g., sensor) data. The structural data of the facility may be historical, presently planned interior (e.g., workplace) configuration and/or updated in real-time. Data gathered from building(s) may be received by a physics engine. The physics engine may use physics based simulations of a subject property characteristic(s) (e.g., its preparation in time and space), the material property characteristic(s) of the one or more buildings, and the interaction of the subject property with the at least one material properties of the one or more buildings. The physics simulation may use energy distribution simulation. The physics model may utilize occupancy characteristics (e.g., number of predicted occupants, their physical nature, and/or predicted time of occupancy). The physics engine may utilized a digital twin of the building that may incorporate the structure of the building and various (e.g., network connected) devices in the building. The physics engine can be implemented, for example, using a processing system programmed with ray-tracing software. The physics engine can generate simulation data based at least in part on the material properties of the building data. Models (used by the physics engine and/or AI engine) can be constructed using baseline readings from the sensors, three-dimensional (abbreviated herein as "3D") schematics of the enclosure, and/or physical properties (e.g., material properties and/or configuration) of fixture(s) of the enclosure. In some embodiments, the physics engine does not use the baseline readings from the sensors. For example, the simulation data can be used to construct a first model for use by the AI engine. Experimental (e.g., sensor) data can be used to construct a second model for use by the AI engine. The experimental data can be gathered by placing a plurality of sensors sensing the subject property in the enclosure (e.g., when the enclosure is unoccupied and/or not in typical operational service (e.g., not deployed)) or in another enclosure substantially similar to the subject enclosure (e.g., building). The experimental data can be gathered from a set of test sense devices (e.g., sensors). A model can be constructed using the experimental data, and/or experimental data gathered by a device ensemble. Raw data can be gathered by the sensor and/or device ensemble. For example, the structure can be excited with a signal and/or condition whereby the plurality of sensors measures a response signal, e.g., to develop an accurate AI engine. The raw data can be cleaned (e.g., from noise using at least one filter) to generate cleaned data (also referred to herein as "silver data" for use by the AI engine. A grid of vertices can be superimposed within the enclosure (e.g., a building or a room). One or more points of interest (POIs) can be defined with reference to the grid of vertices. The AI engine can analyze the silver data using one or more models to generate a result (e.g., a set of one or more values at the one or more POIs). The set of one or more values at the one or more POIs can be stored in a database. A control system can use the database, e.g., for prediction, for recommendations, to refine the models using sensor readings of the enclosure environment, and/or for control of (e.g., to monitor and adjust) the environment of the enclosure.

Figure 11:
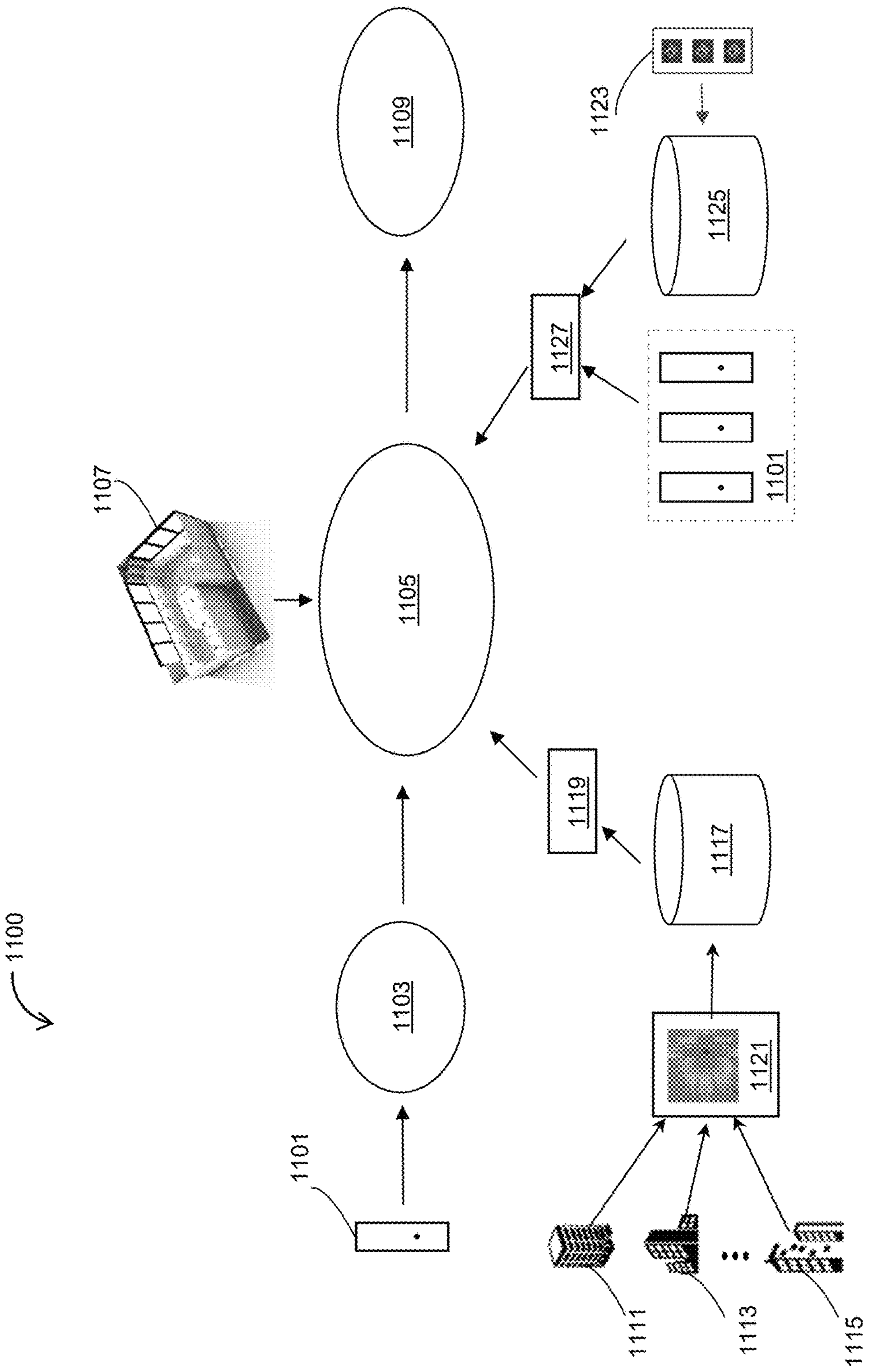
FIG. 11 schematically depicts an Artificial Intelligence (AI) engine and associated components.

FIG. 11 schematically depicts an Artificial Intelligence (AI) engine 1105. Data gathered from a first building 1111, a second building 1112, and an $N^{th}$ building 1115 is received by a physics engine 1121. N can be any integer 1 or greater. The physics engine 1121 can be implemented, for example, using a processing system programmed with ray-tracing software. The physics engine 1121 prepares simulation data 1117 based at least in part on the building data. Models (used by the physics engine and/or AI engine) can be constructed using baseline readings from the sensors, three-dimensional (abbreviated herein as "3D") schematics of the enclosure, and/or physical properties (e.g., material properties) of fixture(s) of the enclosure. In some embodiments, the physics engine does not use the baseline readings from the sensors. For example, the simulation data 1117 can be used to construct a first model 1119 (e.g., physics simulation model) for use by the AI engine 1105. Experimental (e.g., sensor) data 1125 can be used to construct a second model 1127 (e.g., that utilizes real sensor data from experiments and/or deployed sensors). for use by the AI engine. The experimental data 1125 is gathered from a set of test sense devices 1123 (e.g., sensor(s) that are used for testing). The second model 1127 is constructed using the experimental data 1125 and data gathered by a device ensemble 1101. In the example shown in FIG. 11, raw data is gathered by the device ensemble 1101. The raw data is cleaned and/or filtered by a cleaning and/or filtering module 1103 to generate silver data for use by the AI engine 1105. A grid of vertices can be superimposed within a virtual representation of an enclosure 1107 (e.g., a building, a floor, or a room). The virtual enclosure model comprising the grid vertices may include an area and/or point of interest (POI). One or more points of interest (POIs) can be defined with reference to the grid of vertices. The AI engine 1105 analyzes the silver data using the first model 1119 and the second model 1127 (e.g., real sensor data driven model) to generate a set of one or more values at the one or more POIs. The set of one or more values at the one or more POIs can be stored in an insights database 1109. The AI engine can computer and store results of sensor value(s) (e.g., at points of interest) in the insights database 1109. A control system can use an insights 1109 database to refine the models using sensor readings of the enclosure environment, to monitor and adjust the environment of the enclosure 1107.

In some embodiments, one or more environmental characteristics are measured in an enclosure using one or more sensors. A virtual (e.g., electronic) map is used to model the enclosure and to control the environmental characteristic(s). The virtual map may be a topographic type map. The map may comprise one or more levels of at least one sensed environmental characteristic. In some embodiments, the enclosure may be divided into portions that form a grid. The grid may parcel the enclosure into grid portions (e.g., grid segments). In some embodiments, the grid includes a number of vertices. A user may define a point of interest (abbreviated herein as "POI") in the enclosure. The POI may include a sensor, and/or may be at a distance from the sensor. When the POI is in a location devoid of a sensor, data from one or more sensors (e.g., disposed at grid vertices adjacent to the point of interest) can be input into the model for extrapolating a sensed property at the point of interest.

Figure 12:
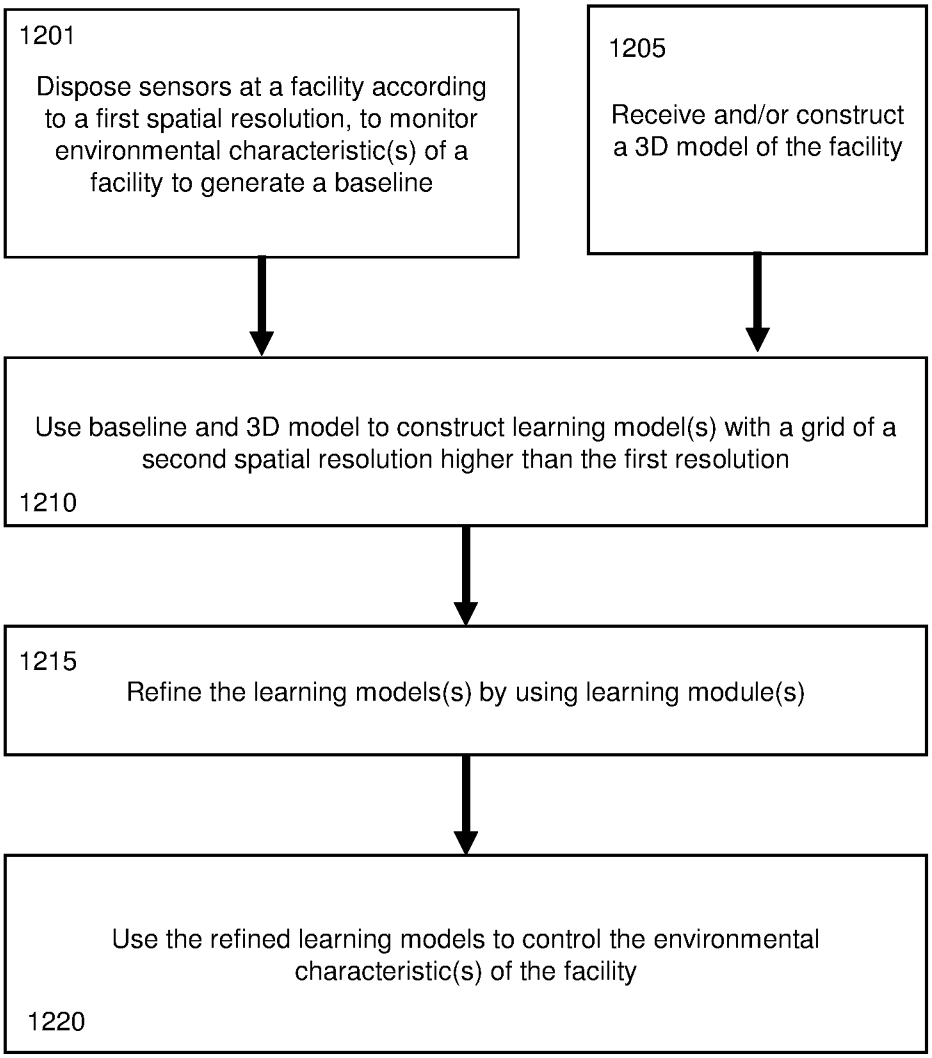
FIG. 12 is a flowchart depicting construction of a learning model.

FIG. 12 shows an example of a flowchart illustrating one example of simulating a set of environmental characteristics for a facility. In block 1201, the set of environmental characteristics are simulated for the facility by modeling the facility using a grid of vertex points. In block 1202, a first selection is received which designates a vertex point from the grid as a first POI. In block 1203, the set of environmental characteristics at the first point of interest is simulated using a greater precision relative to a non-selected vertex point of the grid. In block 1205, a second selection is received which designates a second POI that is not on the grid. At block 1209, in some embodiments, the grid is altered in response to the second selection. At block 1207, in some embodiments, the second POI is migrated to a closest vertex point on the grid.

In some embodiments, the enclosure may be divided into grid portions that form a grid. The grid may parcel the enclosure into grid portions. In some embodiments, the grid includes a number of vertices. The grid can be defined in terms of a coordinate system. The coordinate system can comprise Cartesian, Polar, Cylindrical, Canonical, or Trilinear. For example, the grid can be defined in terms of an x, y, z Cartesian coordinate system. The grid may comprise space-filling polygons. The grid may comprise tessellations. The grid may comprise a boundary representation topological model (e.g., of the enclosure). The grid may be defined such that there is a minimum distance and a maximum distance between any two adjacent vertex points of the grid. The two adjacent vertex points of the grid may be disposed in the enclosure. For example, the minimum distance may be about 1 foot and the maximum distance may be about 3 feet. The grid may be defined such that there is a constant distance between any two adjacent vertex points of the grid. For example, the constant distance may be about 2 feet. The grid may divide the enclosure into portions. The portions may be of the same fundamental length scale. The fundamental length scale may comprise a length, a width, a height, or a radius of a bounding circle. The fundamental length scale is abbreviated herein as "FLS." The FLS of the grid portion may be smaller than the FLS of the enclosure. There may be a plurality of grid portions in the enclosure.

In some embodiments, one or more sensors are placed throughout the enclosure (e.g., the facility). A sensor of the one or more portions may be disposed at a grid coordinate (e.g., at a vertex of the grid). The sensor can be located (i) at vertex point, or (ii) between vertex points. At least one sensor can be located at vertex points with one or more sensors being located between vertex points. A user may define a point of interest in the enclosure. The POI includes a sensor or be at a distance from the sensor. When the point of interest is in a location devoid of a sensor, data from one or more sensors (e.g., disposed at grid vertices adjacent to the point of interest) can be input into the model for extrapolating a sensed property at the point of interest. When a grid point (e.g., vertex) is devoid of a sensor, data from one or more sensors (e.g., disposed at other grid vertices adjacent to the vertex of interest) can be input into the model for extrapolating a sensed property at the vertex of interest that is devoid of a sensor.

In some embodiments, a partitioning of the facility using the grid is performed. The partitioning can be performed manually and/or automatically. For example, a user can manually alter the grid, e.g., by adding one or more vertex points to the grid. The grid can be automatically partitioned, e.g., in response to receiving a user input specifying a POI that is not a vertex point of the grid. The grid can include cross points which may be treated as vertices. The grid can be automatically partitioned, e.g., by specifying and/or altering a mesh size of the grid. The grid can be automatically partitioned, e.g., by adding one or more additional points to the grid. The portions of the grid may have the same FLS. The portions of the grid may have different FLS. The grid may be formed of space-filling polygons. The space-filing polygons may be of at least one type, two types, three types, or more. The POIs can be visualized as pinpoints on a grid (mesh). The grid can be placed manually (e.g., for some properties such as sound), and/or automatically (e.g., for other properties such as temperature). Determining whether to place the grid manually or automatically can be performed according to the property (e.g., humidity, temperature, $CO_2$, VOCs, atmospheric movement, and/or vent speed), and/or to cover (e.g., significant) variability of the data. Determining whether to place the grid manually or automatically can be performed depending on the room (e.g., size, location, openings), and/or depending on the density of the grid (e.g., enclosures can have multiple sensors or a single sensor). The grid can be provided with multiple vertices or with a single vertex in the enclosure. This can minimize the required number of grid points.

In some embodiments, if the POI is not on the grid, the POI will migrate to the closest grid point. The migration can be facilitated using a "snap to grid" procedure (e.g., algorithm). The POI can coincide with a place of a sensor. The POI can coincide with a place devoid of a sensor. The POI can be at a distance from the sensor.

In some embodiments, sensor data from relevant sensors is input into the model(s) for extrapolating a sensed property, e.g., to compensate for an absence of a sensor at a grid point (e.g., vertex). Behavior of the property in space and/or time can be calculated and/or estimated. The calculation and/or estimation can utilize physical behavior of the sensed property and/or accumulated data regarding the sensed property. The accumulated data can be in the enclosure or in similar enclosures. The similar enclosures can be in the facility, or outside of the facility (e.g., in a remote location). The similar enclosure may have a similar setting and/or experience similar environmental conditions. Behavior of the sensed property (e.g., data thereof) sensed by a first sensor at a first location can be extrapolated to a second location that is at a distance from the first sensor, which second location does not have a second sensor. For example, a first set of measured property data from the first sensor can be utilized to simulate a virtual second set of property data, which property is the environmental characteristic sensed by the first sensor. The first location can be a grid vertex. The second location can be a grid vertex, or can be a location that is outside of the grid vertex. A third location can have a third sensor that senses the property. Data from the third sensor can be used to simulate the virtual second set of property data at the second location. The third location can be at another grid vertex. The second data set derived from the first sensor data can be compared with the second data set derived from the third sensor data. The comparison can measure differences that may be used to optimize the model(s) and/or the extrapolation of the virtual sensor data. The model(s) can be optimized iteratively. The iterative optimization can use (i) data from different sensors, (ii) data from the same sensors sensed different times, or (iii) any combination thereof. Predictive models of physical parameters may be compared between themselves (e.g., using different sets of sensed data to estimate an environmental characteristic at a location), and/or to actual (e.g., real world) readings from the sensors (e.g., disposed on grid vertices and/or outside of grid vertices). Such comparison can be used to further refine the model(s).

In some embodiments, an initial physics simulation is conducted to simulate propagation of the environmental characteristics in the enclosure. A separate simulation may be performed for an environmental characteristic (e.g., for each environmental characteristic). The results of a physics simulation can be compared to a sample (e.g., naturally occurring and/or manually orchestrated) real-time sensor readings of the environment. This comparison can be performed during an experimentation phase. A delta (e.g., difference) may be formed between the physics simulation and the sensed reality in the environment. In response to the delta, a neural network model can be revised. The neural network model may account for a physics engine (e.g., model) according to the comparison results. The physics engine may comprise a number of models. One or more sensor samples can be used to simulate additional samples. A parametric analysis may be performed to feed the model. The analysis can focus on representative samples. The analysis can utilize information from a Building Performance Database (BPD) in the jurisdiction, such as the one maintained by the U.S. Department of Energy. The BPD can combine, cleanse and/or anonymize data collected from buildings by jurisdiction authorities (e.g., federal, state and/or local governments), utilities, energy efficiency programs, building owners and/or private companies. The BPD can make this information available to the public. A variety of physical and operational characteristics for a plurality of building types can be stored in the BPD, e.g., to document trends in energy performance.

In some embodiments, one or more sensors are placed in a grid vertex for experimentation to correlate (e.g., validate) measurements. A learning model may be used (e.g., using Artificial Intelligence (AI) such as neural networks, linear regression, or polynomial) to revise adjustable coefficients in the model according to the sensor samples and according to the delta. In some embodiments, the physics simulation may not be used for the updating process in the learning model. A weighted average can be used to fill in the sensor reading of a grid point that is devoid of sensors.

Figure 13:
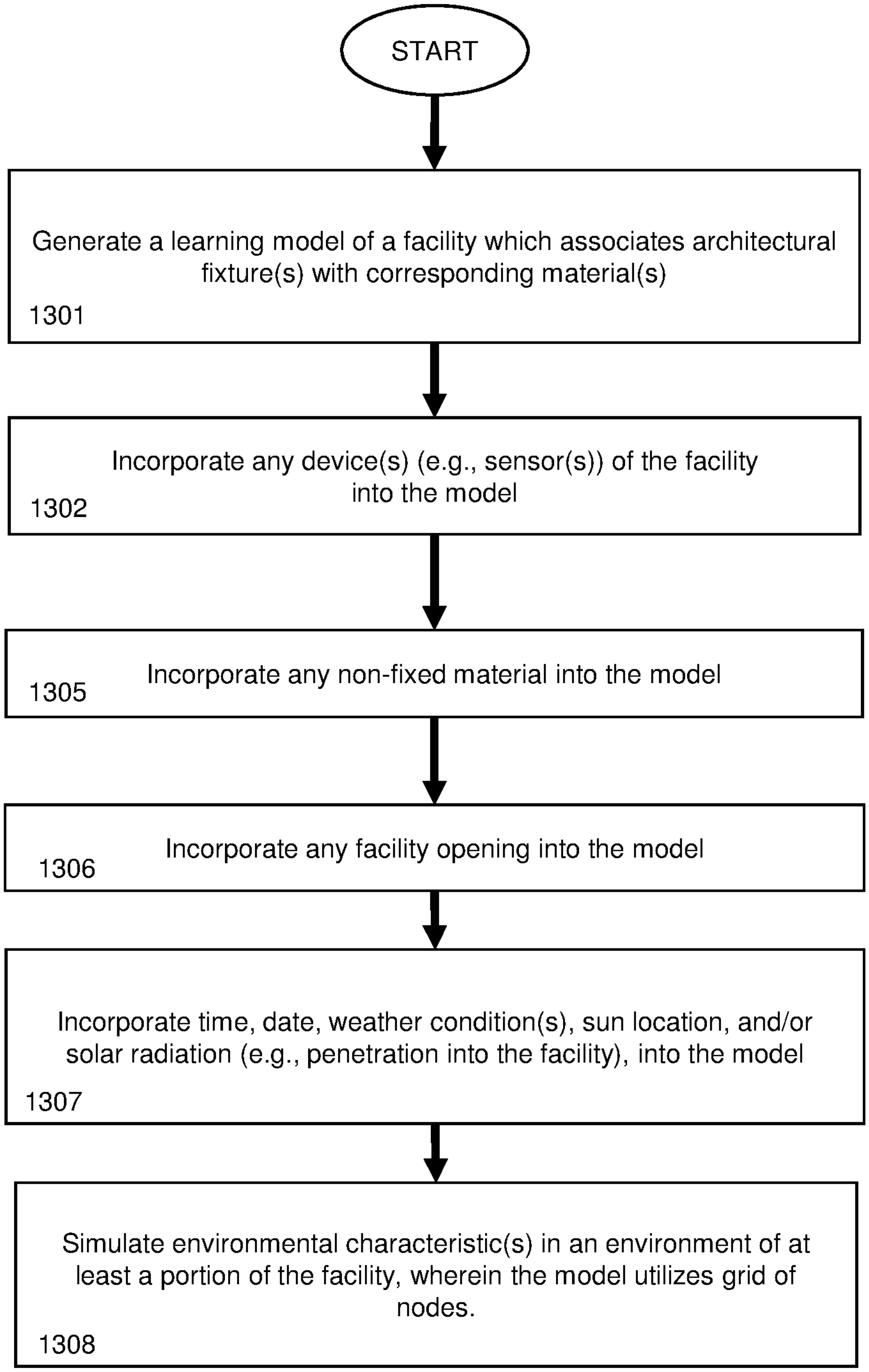
FIG. 13 is a flowchart depicting refinement of a learning model.

FIG. 13 shows an example of a flowchart depicting an exemplary refinement of a learning model. At block 1301, a learning model is generated for a facility. The learning model associates architectural fixture(s) with corresponding material(s). Next, at block 1302, any device(s) (e.g., sensors) of the facility are incorporated into the model. Any non-fixed material is incorporated into the model at block 1305. Any facility opening (e.g., window, door, and/or ventilation opening) is incorporated into the model at block 1306. At block 1307, date, time, weather condition(s), sun location, and/or solar radiation (e.g., penetration into the facility) is incorporated into the model. Environmental characteristic(s) are simulated in an environment of at least a portion of the facility at block 1308. The model can utilize a grid of nodes (e.g., vertex points).

Figure 14:
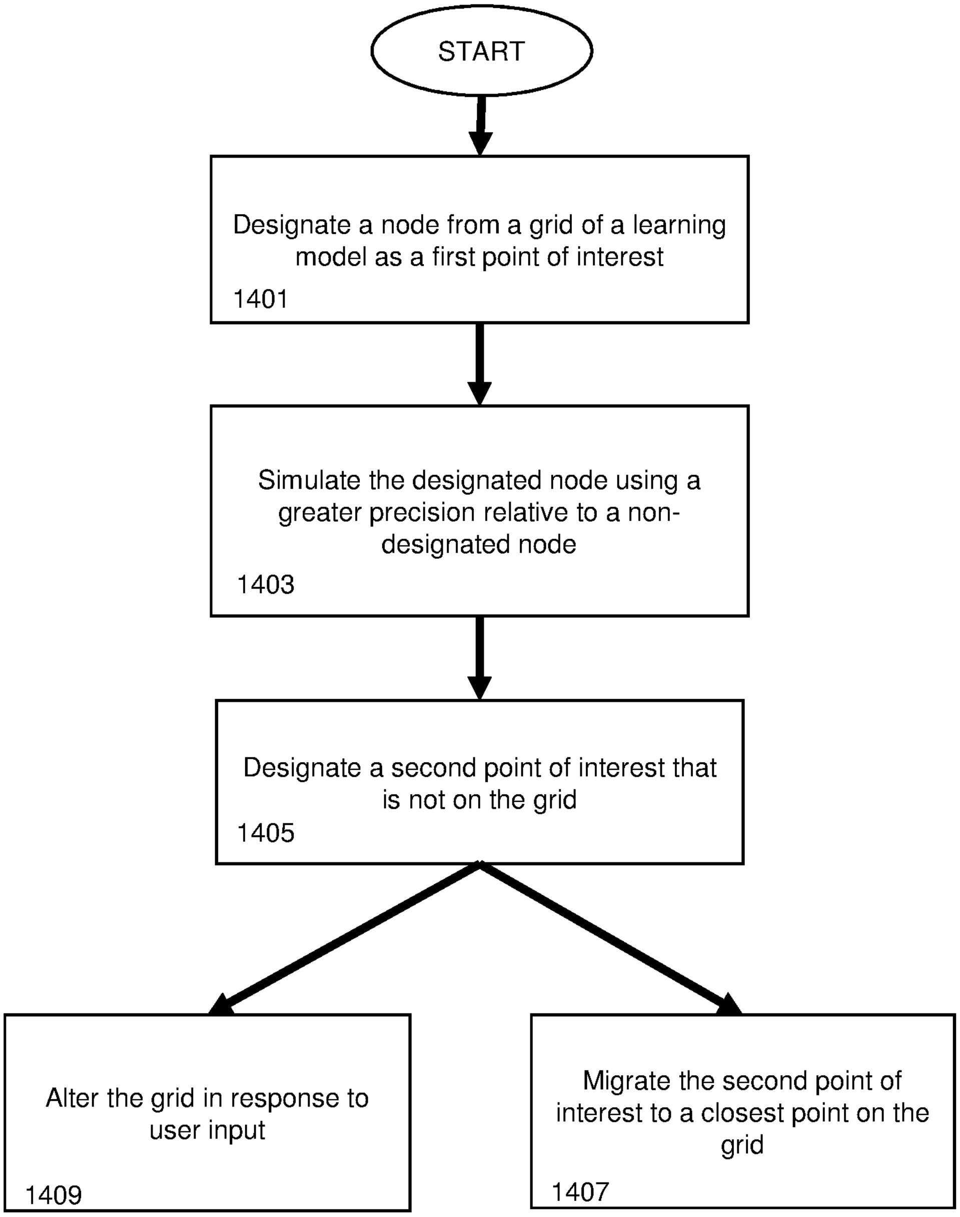
FIG. 14 is a flowchart depicting modeling using a grid of vertex points.

FIG. 14 shows an example of a flowchart depicting example modeling using a grid of vertex points. At block 1401, a node (e.g., vertex point) is designated from a grid of a learning model as a first point of interest (POI). The designated node (e.g., vertex point) is simulated using a greater precision relative to a non-designated node (e.g., vertex point) at block 1403. Then, at block 1405, a second point of interest (POI) that is not on the grid is designated. According to one embodiment, the grid is altered in response to user input at block 1409. According to one embodiment, the second point of interest is migrated to a closest point on the grid at block 1407.

Figure 15:
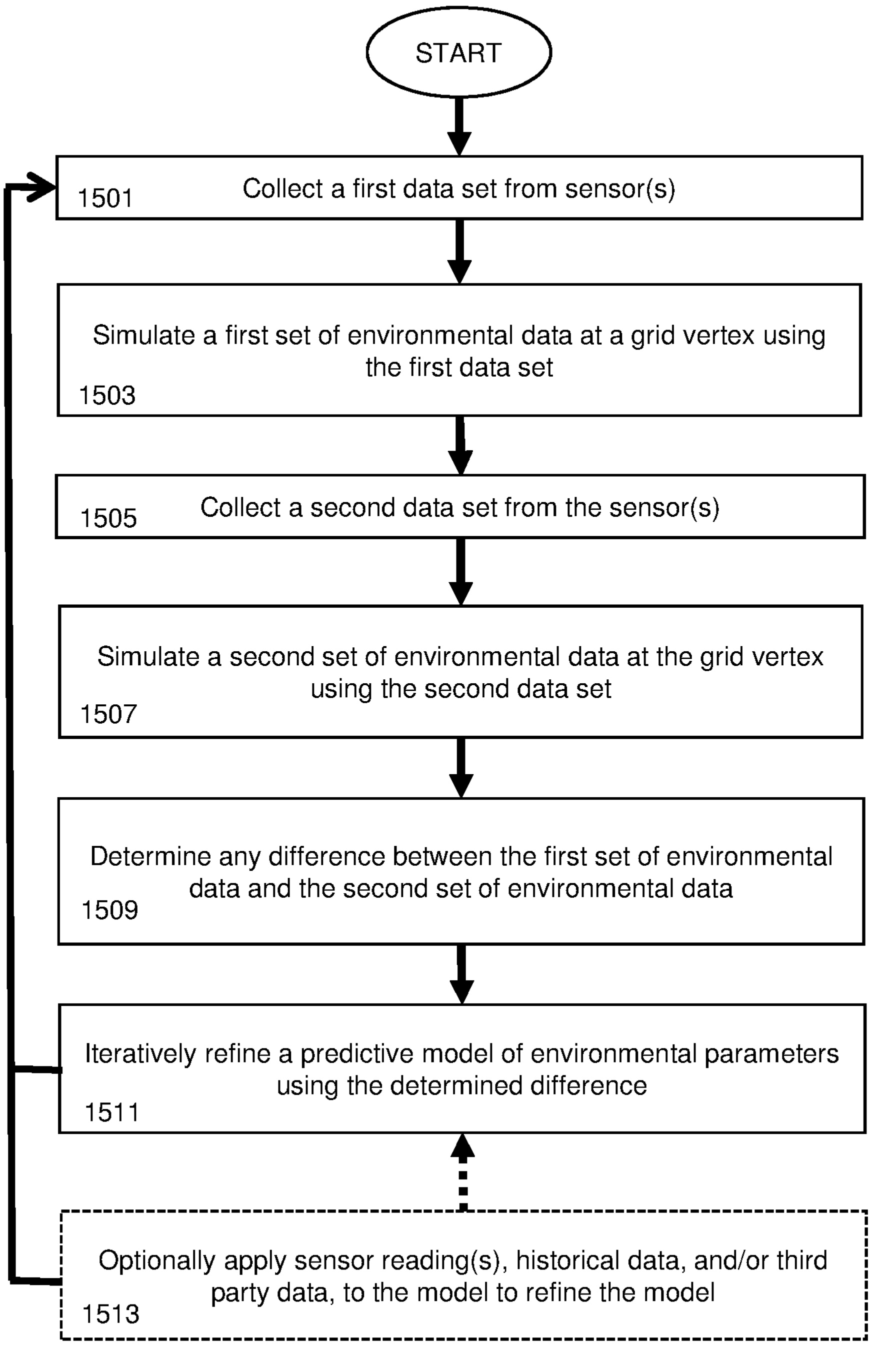
FIG. 15 is a flowchart depicting collection of sensor data.

FIG. 15 shows an example of a flowchart depicting an example collection of sensor data. A first data set is collected from sensor(s) at block 1501. A first set of environmental data is simulated at a grid vertex using the first data set at block 1503. Next, at block 1505, a second data set is collected from the sensor(s). A second set of environmental data is simulated at the grid vertex using the second data set at block 1507. Then, at block 1509, any difference between the first set of environmental data and the second set of environmental data is determined. A predictive model of environmental parameters is iteratively refined at block 1511 using the determined difference, and the operational sequence loops back to block 1501. Optionally, the operational sequence flows form block 1511 to block 1513 where sensor reading(s), historical data, and/or third party data are applied to the model to refine the model. The operational sequence then loops back to block 1501.

In some embodiments, a deep convolutional neural network (e.g., deep learning) can be used to fill in the sensor reading of the grid point that is devoid of sensor(s). One or more sensors can be placed in missing grid points for training, model adjustment, and/or model validation purposes. This placement may occur in a sample of the space of the enclosure. Regression analysis may be performed to fill in the sensor reading of the grid point that is devoid of sensor(s). An analysis may be performed using an input and an output of a function. Linear regression (e.g., a weighted average) can be used to fill in the sensor reading of the grid point that is devoid of sensors. A non-linear function can be employed to fill in the sensor reading of the grid point that is devoid of sensors. The non-linear function may be used, e.g., in a situation of constant variance (e.g., a light sensor measuring a minimum amount of natural light at night, no fluctuation in $CO_2$ at night). A linear function may be used to fill in the sensor reading of the grid point that is devoid of sensors, e.g., in a situation where unequal variance is present (e.g., nonlinear flux and temperature during daylight hours).

Figure 16:
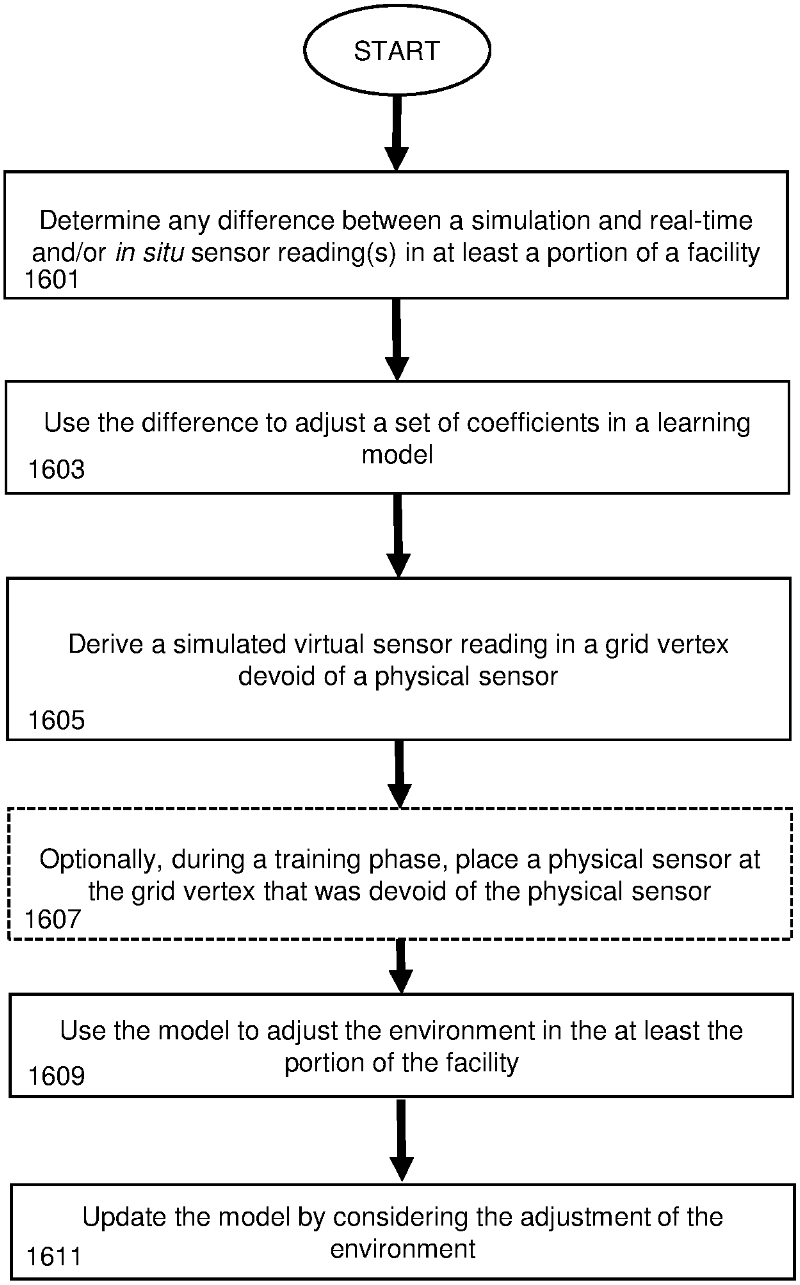
FIG. 16 is a flowchart depicting a performance of environmental adjustments.

FIG. 16 shows an example of a flowchart depicting an exemplary performance of environmental adjustments. Any difference between a simulation and real-time (and/or in-situ) sensor reading(s) in at least a portion of a facility is determined at block 1601. This difference is used to adjust a set of coefficients in a learning model at block 1603. Next, at block 1605, a simulated virtual sensor reading is derived in a grid vertex that is devoid of a physical sensor. Optionally, during a training phase at block 1607, a physical sensor is placed at the grid vertex that was devoid of the physical sensor. The operational sequence progresses from block 1605 or block 1607 to block 1609 where the model is used to adjust the environment in at least a portion of the facility. The model is updated at block 1611 by considering the adjustment of the environment.

In some embodiments, the learning model continues to be used after system deployment to update the model. A control system can direct adjustment, or can be directed to adjust, the environment (e.g., preemptively) of the enclosure by using the learning model.

In some embodiments, various environmental characteristics of the enclosure are controlled (e.g., monitored and/or adjusted). These characteristics can be controlled to provide an optimized occupant environment (e.g., in terms of wellness, health, and/or comfort). The one or more environmental characteristics may be monitored by sensor(s). The sensor(s) may be disposed in the enclosure. One or more models may be constructed using baseline readings and/or 3D schematics of the space. At least one controller (e.g., a control system) and/or a processor can use the AI algorithm(s). The AI algorithms may comprise predictive extrapolation. The predictive extrapolation may be based at least in part on trend, and/or expected physical parameters. The AI algorithm(s) may be utilized to further refine the models using sensor readings of the enclosure space. The AI algorithm(s) may be utilized to control the environment of the enclosure. Controlling the environment may include directly or indirectly controlling any device. The device can be operatively coupled with the building (e.g., HVAC). Indirect control may comprise using a building management system (BMS). The BMS may or may not be communicatively coupled to the controller(s). The BMS may or may not be communicatively coupled to the processor(s). The AI modeling of the enclosure space may include locations on a grid. The AI modeling of the enclosure space may utilize locations on a grid. The locations of the grid may have a different (e.g., higher or lower) spatial resolution than the spacing of the sensors.

In some embodiments, an enclosure includes one or more sensors. The sensor may facilitate controlling the environment of the enclosure, e.g., such that inhabitants of the enclosure may have an environment that is more comfortable, delightful, beautiful, healthy, productive (e.g., in terms of inhabitant performance), easer to live (e.g., work) in, or any combination thereof. The sensor(s) may be configured as low or high resolution sensors. Sensor may provide on/off indications of the occurrence and/or presence of an environmental event (e.g., one pixel sensors). In some embodiments, the accuracy and/or resolution of a sensor may be improved via artificial intelligence (abbreviated herein as "AI") analysis of its measurements. Examples of artificial intelligence techniques that may be used include: reactive, limited memory, theory of mind, and/or self-aware techniques).

In some embodiments, the sensor data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. Sensors may be configured to process, measure, analyze, detect and/or react to: data, temperature, humidity, sound, force, pressure, concentration, electromagnetic waves, position, distance, movement, flow, acceleration, speed, vibration, dust, light, glare, color, gas(es) type, and/or other aspects (e.g., characteristics) of an environment (e.g., of an enclosure). The gases may include volatile organic compounds (VOCs). The gases may include carbon monoxide, carbon dioxide, water vapor (e.g., humidity), oxygen, radon, and/or hydrogen sulfide. The one or more sensors may be calibrated in a factory setting and/or in the facility. A sensor may be optimized to performing accurate measurements of one or more environmental characteristics present in the factory setting and/or in the facility in which it is deployed.

In some embodiments, a processor interfaces with actuators and/or sensors. This interfacing may be provided for control purposes. The processor may include a hierarchy of controllers. The processor may control an enclosure such as a smart building. A smart building can be any structure that uses one or more automated processes to automatically control the operation of the building. These automated processes can include heating, ventilation, air conditioning, lighting, security, window blind controls, and/or other systems. The smart building may use sensors, actuators and/or microchips to collect data. The smart building can use this data to manage the environment of the building. This infrastructure may help owners, operators and facility managers to enhance the comfort of building occupants. Energy use may be reduced. The manner in which space is used may be improved. The environmental impact of buildings can be reduced.

In some embodiments, the enclosure may have interacting systems. The enclosure can be a facility, a room, and/or a collection of portions of multiple buildings. The enclosure can be any enclosure disclosed herein. The processor may operate in a network environment, e.g., the processor may be operatively (e.g., communicatively and/or physically) coupled to a network. The network environment may be configured for remote (e.g., Cloud) interaction. The remote interaction may include users and/or a service provider. The network environment may include wired and/or wireless communication. The processor may execute a control scheme. The control scheme may include feed forward, fast forward, open loop, and/or closed loop. The processor may control the BMS and/or any controllable device such as a sensor, emitter, antenna, or tintable window (e.g., an IGU). The controllable device may include optically controllable electrochromic devices. The processor may be communicatively coupled to sensors and/or emitters. Multiple sensors, emitters, actuators, transmitters, and/or receivers may be integrated into a single assembly. The single assembly may be provided in the form of a digital architectural element. The general processor may be communicatively coupled to other output devices. The other output devices may include an HVAC system and/or one or more antennas.

In some embodiments, processing data derived from the sensor comprises applying one or more models. The models may comprise a mathematical model. The processing may comprise fitting of model(s) (e.g., curve fitting). The model may be multi-dimensional (e.g., two or three dimensional). The model may comprise a linear or non-linear equation. The model may comprise an exponential or logarithmic equation. The model may comprise one or more Boolean operations. The model may consider the enclosure. Considering the enclosure may include the structure and/or makeup of the enclosure. Makeup of the enclosure may comprise material makeup of any fixture and/or non-fixture the model in the enclosure. The model may consider a Building Information Modeling (BIM) (e.g., Revit file) of the enclosure before, during, and/or after its construction. The model may consider a two dimensional (e.g., floor plan) and/or three dimensional modeling (e.g., 3D model rendering) of the enclosure. The model may or may not comprise a finite element analysis. The model may comprise, or be utilized in, a simulation. The simulation may be of at least one environmental characteristic of at least a portion of enclosure (e.g., depicting status in various positions in the enclosure such as a POI). The model may be represented as a graph (e.g., 2 or 3 dimensional graph). For example, the model may be represented as a contour map. The modeling may comprise one or more matrices. The model may comprise a topological model. The model may relate to a topology of the sensed parameter in the enclosure. The model may relate to a time variation of the topology of the sensed parameter in the enclosure. The model may be environmental and/or enclosure specific. The model may consider one or more properties of the enclosure (e.g., dimensionalities, openings, and/or environmental disrupters (e.g., emitters)). Processing of the sensor data may utilize historical sensor data, and/or current (e.g., real time) sensor data. The data processing (e.g., utilizing the model) may be used to project an environmental change in the enclosure, and/or recommend actions to alleviate, adjust, or otherwise react to the change.

In some embodiments, the model of the enclosure comprises the architecture of a building (e.g., including one or more fixtures). The model may be a 3D model. The model may identify one or more materials of which these fixtures are comprised. The model may comprise Building Information Modeling (BIM) software (e.g., Autodesk Revit) product (e.g., file). The BIM product may allow a user to design a building with parametric modeling and drafting elements. In some embodiments, the BIM is a Computer Aided Design (CAD) paradigm that allows for intelligent, 3D and/or parametric object-based design. The BIM model may contain information pertaining to a full life cycle for a building, from concept to construction to decommissioning. This functionality can be provided by the underlying relational database architecture of the BIM model, that may be referred to as the parametric change engine. The BIM product may use .RVT files for storing BIM models. Parametric objects—whether 3D building objects (such as windows or doors) or 2D drafting objects—may be referred to as families, can be saved in .RFA files, and can be imported into the RVT database. There are many sources of pre-drawn RFA libraries.

The BIM (e.g., Revit) may allow users to create parametric components in a graphical "family editor." The model can capture relationships between components, views, and annotations, such that a change to any element is automatically propagated to keep the model consistent. For example, moving a wall updates neighboring walls, floors, and roofs, corrects the placement and values of dimensions and notes, adjusts the floor areas reported in schedules, redraws section views, etc. The BIM may facilitate continuous connection, updates, and/or coordination between the model and (e.g., all) documentation of the facility, e.g., for simplification of update in real time and/or instant revisions of the model. The concept of bi-directional associativity between components, views, and annotations can be a feature of BIM.

The BIM model can use a single file database that can be shared among multiple users. Plans, sections, elevations, legends, and schedules can be interconnected. The BIM can provide (e.g., full) bi-directional associativity. Thus, if a user makes a change in one view, the other views can be automatically updated. Likewise, BIM files can be updated automatically in response to an input received from a sensor. BIM drawings and/or schedules can be fully coordinated in terms of the building objects shown in drawings. A base facility (e.g., building) can be drawn using 3D objects to create fixtures (e.g., walls, floors, roofs, structure, windows, and/or doors) and other objects as needed. The BIM model (e.g., BIM virtual model, or BIM virtual file) can incorporate information regarding the structure and/or material associated with the facility. Generally, if a component of the design is going to be seen in more than one view, it can be created using a 3D object. Users can create their own 3D and 2D objects for modeling and drafting purposes. Small-scale views of building components may be created using a combination of 3D and 2D drafting objects, or by importing drafting work done in another computer aided design (CAD) platform, for example, via DWG, DXF, DGN, SAT or SKP.

In some embodiments, when a project database is shared using BIM, a central file can be created which stores a master copy of the project database on a file server. A user can work on a copy of the central file (known as the local file), stored on his/her workstation. Users can save to the central file to update the central file with their changes, and to receive changes from other users. the BIM model can check with the central file whenever a user starts working on an object in the database to see if another user is editing the object. This procedure may prevent two people from making the same change simultaneously and causing a conflict. Multiple disciplines working together on the same project can make their own project databases and link in databases from other consultants for verification. BIM can perform interference checking, which may detect if different components of the building are occupying the same physical space.

In some embodiments, when a structural change takes place in the facility, the BIM model may require manual updates to at least one document associated with the facility to document the change and remain updated. The control system (e.g., using the sensor(s)) of the facility) may (e.g., automatically) feed structural updates to the BIM model, to the AI engine, and/or to the physics engine. The structural updates fed by the control system may be done in real time (e.g., as the changes occur), or at a time in which the facility is not occupied (e.g., at night, during the weekend, or during a holiday). The update may be scheduled (e.g., pre-scheduled). The update may take place at a closest time frame to the structural change made (e.g., the first time in which the facility is idle after the structural change has been made). The update and/or sensor scan may be at a predetermined (e.g., pre-scheduled) intervals.

In some embodiments, one or more models (as disclosed herein) are used by the AI engine. The model may incorporate non-fixed materials, for example, water that occupies pipes, heat capacity of materials, optical absorbance/reflectivity, heat signature, acoustic properties, and/or outgassing/VoC's of materials versus temperature. The model may incorporate openings, time of day, sun angle, and/or penetration depth. The model may be applied to a scenario where room assignments and/or walls are unknown. The model may be applied to a scenario where a dry wall, hallway, open area, reception area, stairs, and/or a closed area are known. The model may include building elements such as fixtures and non-fixtures. The building elements may comprise partitions, walls, floors, roofs, structure, windows, doors, ceilings, cabinets, furniture, desks, cubicles, tables, chairs, ventilation ducts, electrical conduits, lighting fixtures, water supply lines, roof vents, and/or piping for utilities. The model may associate a fixture with one or more physical properties, such as a material for the fixture, a heat capacity for the fixture, an acoustical property for the fixture, and/or any of a number of other physical properties.

The model can include information about the energy-related characteristics of commercial and/or residential buildings. For example, as mentioned previously, the model can include information from a Building Performance Database (BPD) maintained by the U.S. Department of Energy. In some embodiments, the BPD combines, cleanses and/or anonymizes data collected from buildings by jurisdictional authorities (e.g., federal, state and local governments), utilities, energy efficiency programs, building owners and/or private companies. A variety of physical and operational characteristics for a plurality of building types can be stored in the BPD, e.g., to document trends in energy performance. The BPD can allow users to create and/or save customized datasets based on specific variables, e.g., including building types, locations, sizes, ages, equipment, and/or operational characteristics. The BPD can allow users to compare buildings using statistical or actuarial methods. The BPD can comprise a graphical web interface and/or a web API (application programming interface), which may allow applications and/or services to dynamically query the BPD.

In some embodiments, an initial physics simulation is conducted to simulate propagation of the environmental characteristics in the enclosure. A separate simulation may be performed for an environmental characteristic (e.g., for each environmental characteristic). The AI model may be configured using outputs of the physics simulation. The AI model may be an AI engine comprising a neural network, or any other sensor analysis methodology and/or mathematical model disclosed herein. The physics simulation may be lengthy, for example, on the order of hours or days. The physics simulation may simulate the interior as well as the exterior of the enclosure. The physics simulation may simulate the (e.g., entire) interior environment of the enclosure. The interior environment may encompass areas beyond the perimeter skin of the enclosure. The interior of the enclosure may be simulated based at least in part on the grid of nodes (e.g., vertex points). The grid of vertex points may be an intersection of 3D grid lines. There may be any number of vertex points in the grid. The grid may have a constant density or a varied density. For example, at least one portion of the grid may have a higher density (e.g., adjacent to and including the POI). One or more sensors may be placed throughout the enclosure. The at least one of the sensors may be included in an ensemble of sensors (e.g., suite of sensors). The ensemble of sensors may comprise any device disclosed herein (e.g., sensor, emitter, controller, and/or antenna). The sensors may be disposed at coordinates of the grid. The grid may have a vertex occupied by at least one sensor. The grid may have a vertex devoid of any sensor.

In some embodiments, the model uses a variate model. The variate model may be a single-variate model or a multi-variate model. The single-variate model may be applicable to one type of environmental characteristic (and use corresponding one type of sensor data). The multi-variate model may be applicable to a plurality of environmental characteristic types (and use corresponding multiple types of sensor data). The multi-variate model may be applicable to one environmental characteristic type (and use multiple types of sensor data). The variate model may determine a missing value imputation. The missing value imputation may be used to increase the trust in a sensor reading (e.g., verify that the sensor reading is correct). The multi-variate model can use sensors reading of different properties (e.g., different environmental characteristics). The multi-variate model can use sensors reading at different portions of the enclosure (e.g., different rooms in a floor, different floors of a building, or different building of a facility). The single-variate model can use (e.g., only) one sensor property. The variate model may use anomaly detection of sudden spikes and/or outliers.

Figure 17:
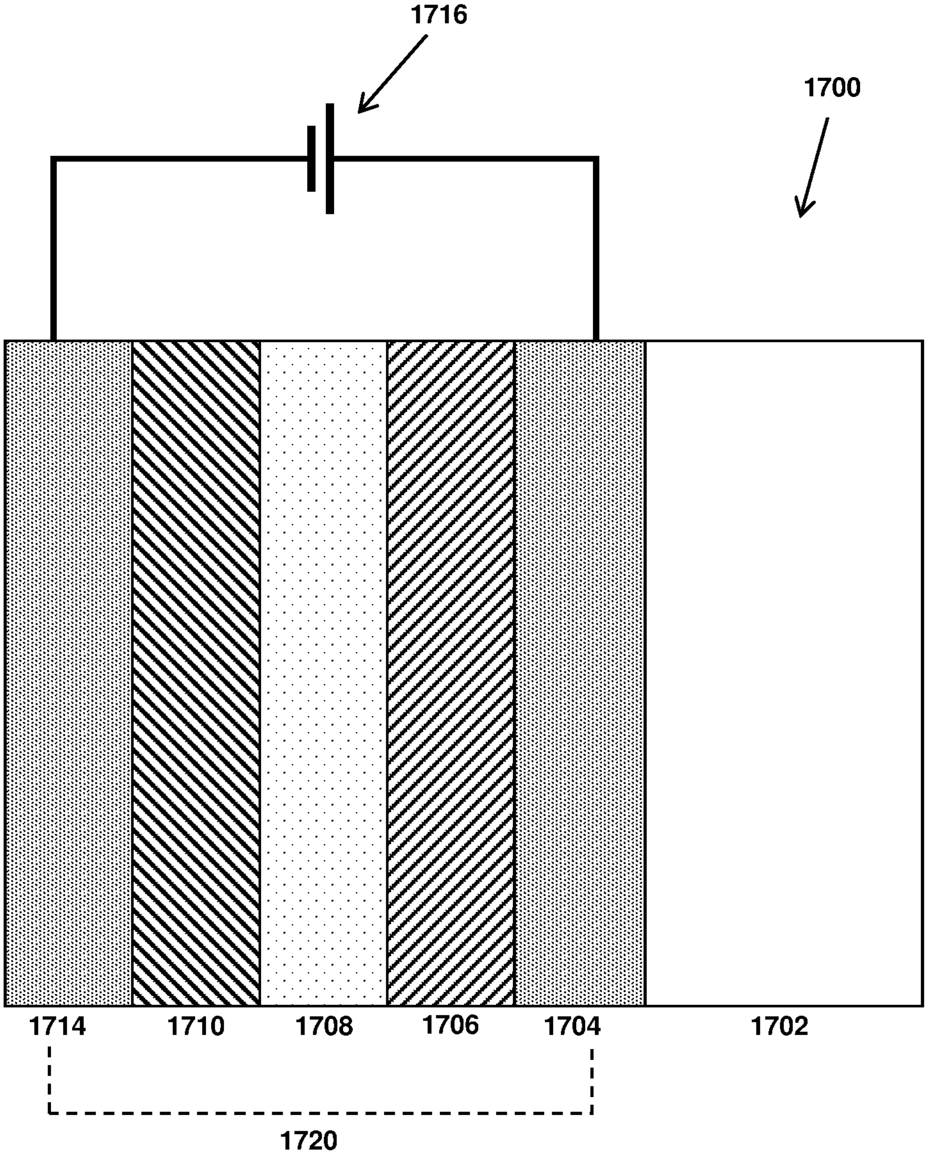
FIG. 17 schematically shows an electrochromic device.

FIG. 17 shows an example of a schematic cross-section of an electrochromic device 1700 in accordance with some embodiments. The EC device coating is attached to a substrate 1702, a transparent conductive layer (TCL) 1704, an electrochromic layer (EC) 1706 (sometimes referred to as a cathodically coloring layer or a cathodically tinting layer), an ion conducting layer or region (IC) 1708, a counter electrode layer (CE) 1710 (sometimes referred to as an anodically coloring layer or anodically tinting layer), and a second TCL 1714. Elements 1704, 1706, 1708, 1710, and 1714 are collectively referred to as an electrochromic stack 1720. A voltage source 1716 operable to apply an electric potential across the electrochromic stack 1720 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL.

In various embodiments, the ion conductor region (e.g., 1708) may form from a portion of the EC layer (e.g., 1706) and/or from a portion of the CE layer (e.g., 1710). In such embodiments, the electrochromic stack (e.g., 1720) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725 filed May 2, 2012, titled "ELECTROCHROMIC DEVICES," that is incorporated herein by reference in its entirety. In some embodiments, an EC device coating may include one or more additional layers such as one or more passive layers.

Passive layers can be used to improve certain optical properties, to provide moisture, and/or to provide scratch resistance. These and/or other passive layers can serve to hermetically seal the EC stack 1720. Various layers, including transparent conducting layers (such as 1704 and 1714), can be treated with anti-reflective and/or protective layers (e.g., oxide and/or nitride layers).

In certain embodiments, the electrochromic device is configured to (e.g., substantially) reversibly cycle between a clear state and a tinted state. Reversible may be within an expected lifetime of the ECD. The expected lifetime can be at least about 5, 10, 15, 25, 50, 75, or 100 years. The expected lifetime can be any value between the aforementioned values (e.g., from about 5 years to about 100 years, from about 5 years to about 50 years, or from about 50 years to about 100 years). A potential can be applied to the electrochromic stack (e.g., 1720) such that available ions in the stack that can cause the electrochromic material (e.g., 1706) to be in the tinted state reside primarily in the counter electrode (e.g., 1710) when the window is in a first tint state (e.g., clear). When the potential applied to the electrochromic stack is reversed, the ions can be transported across the ion conducting layer (e.g., 1708) to the electrochromic material and cause the material to enter the second tint state (e.g., tinted state).

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, and/or transparent-opaque. In some embodiments, the terms "clear" and "bleached" refer to an optically neutral state, e.g., un-tinted, transparent and/or translucent. In some embodiments, the "color" or "tint" of an electrochromic transition is not limited to any wavelength or range of wavelengths. The choice of appropriate electrochromic material and counter electrode materials may govern the relevant optical transition (e.g., from tinted to un-tinted state).

In certain embodiments, at least a portion (e.g., all of) the materials making up electrochromic stack are inorganic, solid (i.e., in the solid state), or both inorganic and solid. Because various organic materials tend to degrade over time, particularly when exposed to heat and UV light as tinted building windows are, inorganic materials offer an advantage of a reliable electrochromic stack that can function for extended periods of time. In some embodiments, materials in the solid state can offer the advantage of being minimally contaminated and minimizing leakage issues, as materials in the liquid state sometimes do. One or more of the layers in the stack may contain some amount of organic material (e.g., that is measurable). The ECD or any portion thereof (e.g., one or more of the layers) may contain little or no measurable organic matter. The ECD or any portion thereof (e.g., one or more of the layers) may contain one or more liquids that may be present in little amounts. Little may be of at most about 100 ppm, 10 ppm, or 1 ppm of the ECD. Solid state material may be deposited (or otherwise formed) using one or more processes employing liquid components, such as certain processes employing sol-gels, physical vapor deposition, and/or chemical vapor deposition.

Figure 18:
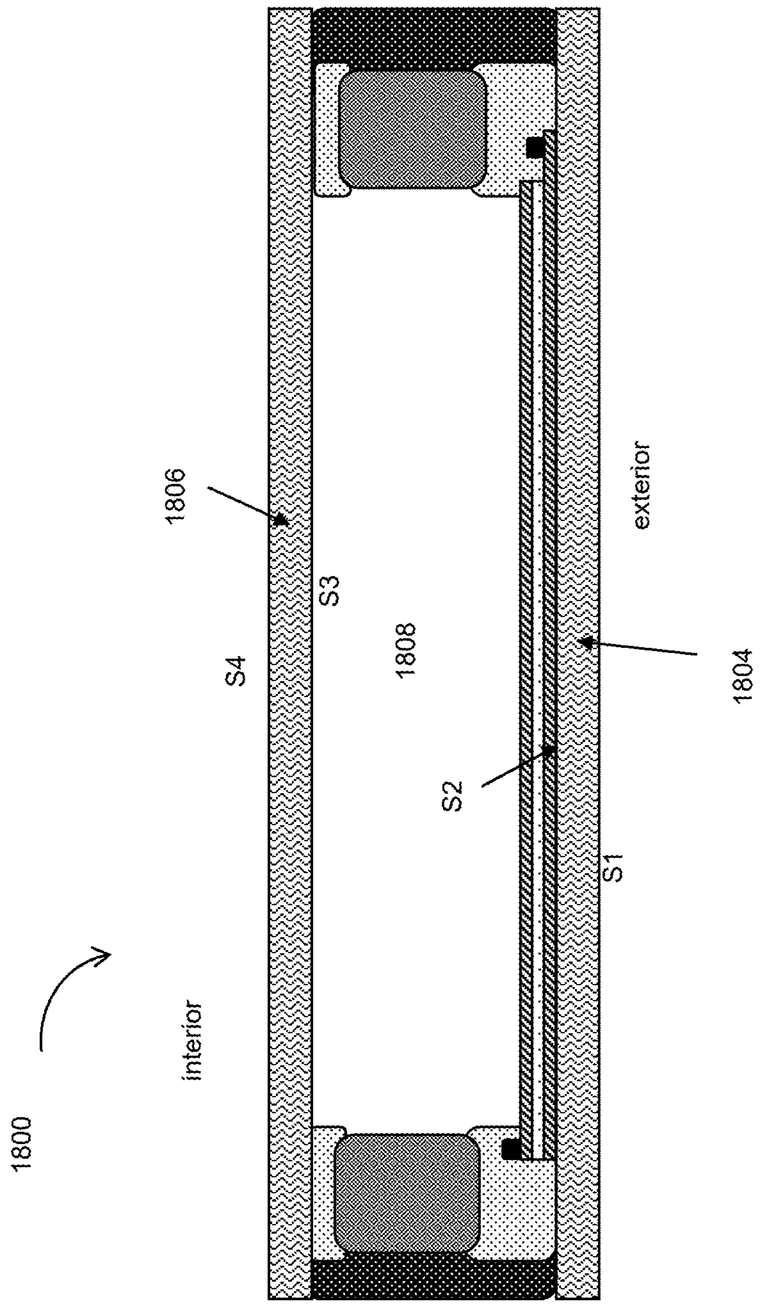
FIG. 18 schematically shows a cross-section of an Integrated Glass Unit (IGU)

FIG. 18 show an example of a cross-sectional view of a tintable window embodied in an insulated glass unit ("IGU") 1800, in accordance with some implementations. The terms "IGU," "tintable window," and "optically switchable window" can be used interchangeably herein. It can be desirable to have IGUs serve as the fundamental constructs for holding electrochromic panes (also referred to herein as "lites") when provided for installation in a building. An IGU lite may be a single substrate or a multi-substrate construct. The lite may comprise a laminate, e.g., of two substrates. IGUs (e.g., having double- or triple-pane configurations) can provide a number of advantages over single pane configurations. For example, multi-pane configurations can provide enhanced thermal insulation, noise insulation, environmental protection and/or durability, when compared with single-pane configurations. A multi-pane configuration can provide increased protection for an ECD. For example, the electrochromic films (e.g., as well as associated layers and conductive interconnects) can be formed on an interior surface of the multi-pane IGU and be protected by an inert gas fill in the interior volume (e.g., 1808) of the IGU. The inert gas fill may provide at least some (heat) insulating function for an IGU. Electrochromic IGUs may have heat blocking capability, e.g., by virtue of a tintable coating that absorbs (and/or reflects) heat and light.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g. connect) one or more electrochromic devices to a voltage source, switches and the like, and may include a frame that supports the IGU or laminate. A window assembly may include a window controller, and/or components of a window controller (e.g., a dock).

FIG. 18 shows an exemplary implementation of an IGU 1800 that includes a first pane 1804 having a first surface S1 and a second surface S2. In some implementations, the first surface S1 of the first pane 1804 faces an exterior environment, such as an outdoors or outside environment. The IGU 1800 includes a second pane 1806 having a first surface S3 and a second surface S4. In some implementations, the second surface (e.g., S4) of the second pane (e.g., 1806) faces an interior environment, such as an inside environment of a home, building, vehicle, or compartment thereof (e.g., an enclosure therein such as a room).

In some implementations, the first and the second panes (e.g., 1804 and 1806) are transparent or translucent, e.g., at least to light in the visible spectrum. For example, each of the panes (e.g., 1804 and 1806) can be formed of a glass material. The glass material may include architectural glass, and/or shatter-resistant glass. The glass may comprise a silicon oxide ($SO_x$). The glass may comprise a soda-lime glass or float glass. The glass may comprise at least about 75% silica ($SiO_2$). The glass may comprise oxides such as $Na_2O$, or CaO. The glass may comprise alkali or alkali-earth oxides. The glass may comprise one or more additives. The first and/or the second panes can include any material having suitable optical, electrical, thermal, and/or mechanical properties. Other materials (e.g., substrates) that can be included in the first and/or the second panes are plastic, semi-plastic and/or thermoplastic materials, for example, poly(methyl methacrylate), polystyrene, polycarbonate, allyl diglycol carbonate, SAN (styrene acrylonitrile copolymer), poly(4-methyl-1-pentene), polyester, and/or polyamide. The first and/or second pane may include mirror material (e.g., silver). In some implementations, the first and/or the second panes can be strengthened. The strengthening may include tempering, heating, and/or chemically strengthening.

Figure 19:
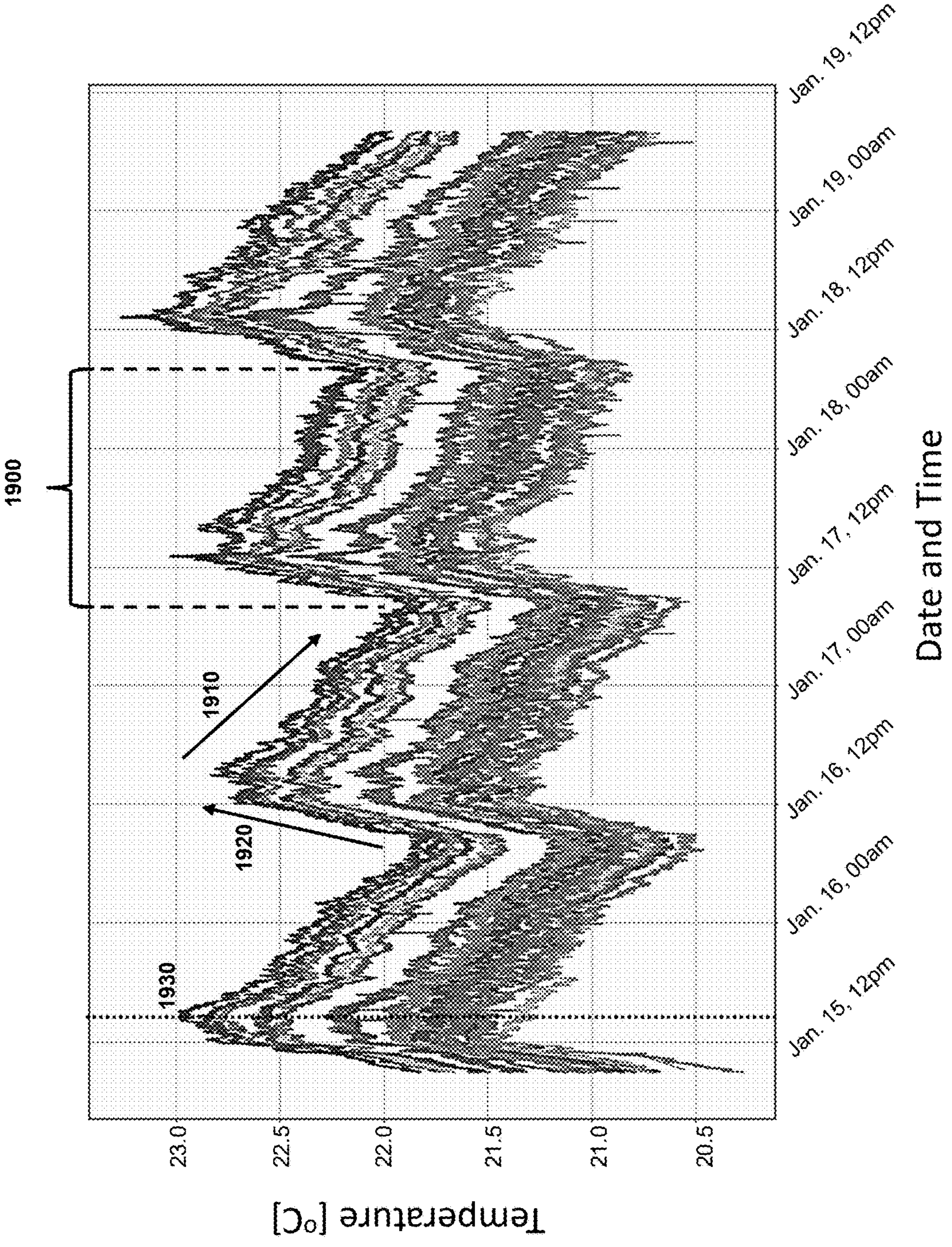
FIG. 19 depicts various graphs of temperature as a function of time.

At times, relationships between a measured property (e.g., by one or more sensors) with time shows repetitive behavior. Such properties can lead to various predictive behavior. When the predicted behavior does not occur as predicted (e.g., within a threshold), an alert may be provided. The alert may signal the non-confirming signal (e.g., that may represent a non-confirming behavior). The non-conforming signal may be due to a change in an environment, in the sensor(s), or both. FIG. 19 shows an example of various sensors measuring temperature over a course of a few days, which sensor data is superimposed in the graph shown in FIG. 19. A daily pattern emerges from the temperature values being more elevated during the day as compared to the night. For each cycle such as 1900, the elevation such as 1920 appears to raise with a steeper slope (e.g., higher absolute value of slope) as compared to a slope of the temperature's decline such as 1910. A timing and value of the daily maxima such as 1930 can also be visible.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of environmental adjustment, the method comprising:

generating a virtual enclosure model for a physical enclosure using a virtual representation of the physical enclosure, a virtual grid of vertex points, and one or more material properties of the physical enclosure, wherein the physical enclosure includes one or more sensors;

using the virtual enclosure model to generate a map of one or more environmental characteristics of the physical enclosure;

learning, by an artificial intelligence engine, from data from the one or more sensors;

predicting, by the artificial intelligence engine, a selected one of the environmental characteristics at a test location within the physical enclosure, wherein the test location is devoid of a sensor sensitive to the selected environmental characteristic;

placing at the test location a test sensor sensitive to the selected environmental characteristic;

comparing a reading produced by the test sensor to the predicted environmental characteristic at the test location;

adjusting coefficients of the artificial intelligence engine to bring its prediction closer to the test sensor's reading; and using, by the adjusted artificial intelligence engine, the map to control the one or more environmental characteristics of the physical enclosure, by regulating distribution of at least one of air or energy by an environmental control system coupled to the physical enclosure, to maintain one or more environmental conditions.

2. The method of claim 1, further comprising receiving a selection of a first vertex point from the virtual grid as a first point of interest.

3. The method of claim 2, further comprising analyzing the one or more environmental characteristics at the first vertex point and at a second vertex point of the virtual grid, wherein the one or more environmental characteristics at the first vertex point is simulated using a greater precision relative to the second vertex point.

4. The method of claim 2, further comprising receiving a selection of a second point of interest that is not a vertex point of the virtual grid.

5. The method of claim 4, further comprising performing alteration of the virtual grid in response to receiving the selection of the second point of interest, and/or migrating the second point of interest to a closest vertex point of the virtual grid.

6. The method of claim 1, wherein a first vertex point from the virtual grid is identified as a first point of interest.

7. The method of claim 6, wherein the one or more environmental characteristics are acquired at the first vertex point and at a second vertex point of the virtual grid, wherein the one or more environmental characteristics at the first vertex point is simulated using a greater precision relative to the second vertex point.

8. The method of claim 6, wherein:

the first point of interest has an analogous first location in the physical enclosure, and the first location includes a sensor.

9. The method of claim 6, wherein the first point of interest is at a distance from a nearest sensor.

10. The method of claim 6, further comprising inputting data into the virtual enclosure model from the one or more sensors disposed at a physical location analogous to the virtual grid vertex points adjacent to the first point of interest, for extrapolating a sensed property at the first point of interest.

11. The method of claim 1, wherein the virtual grid of vertex points is a non-homogeneous grid.

12. An apparatus for environmental adjustment, the apparatus comprising one or more controllers comprising at least one circuitry and configured to:

generate, or direct generation of, a virtual enclosure model for a physical enclosure using a virtual representation of the physical enclosure, a virtual grid of vertex points, and one or more material properties of the physical enclosure, wherein the physical enclosure includes one or more sensors;

use, or direct utilization of, the virtual enclosure model to generate a map of one or more environmental characteristics of the physical enclosure;

teach, or direct teaching of, an artificial intelligence engine from data from the one or more sensors;

predict, by the artificial intelligence engine, a selected one of the environmental characteristics at a test location within the physical enclosure, wherein the test location is devoid of a sensor sensitive to the selected environmental characteristic;

receive a reading from a test sensor sensitive to the selected environmental characteristic and located at the test location;

compare the reading produced by the test sensor to the predicted environmental characteristic at the test location;

adjust coefficients of the artificial intelligence engine to bring its prediction closer to the test sensor's reading; and use, or direct utilization of, by the artificial intelligence engine, the map to control the one or more environmental characteristics of the physical enclosure, by regulating a velocity of air flow through vent to/and from the physical enclosure to maintain one or more request environment condition for occupant comfort.

13. The apparatus of claim 12, wherein the virtual enclosure model comprises a consideration of one or more fixtures of the physical enclosure.

14. The apparatus of claim 13, wherein the one or more controllers are configured for constructing the virtual enclosure model using one or more physical properties of the one or more fixtures of the physical enclosure and/or one or more material properties of the one or more fixtures of the physical enclosure.

15. The apparatus of claim 14, wherein:

the one or more controllers are configured for receiving baseline readings from the one or more sensors, and the apparatus further comprises circuitry configured for constructing the virtual enclosure model using the baseline readings.

16. The apparatus of claim 12, wherein the one or more controllers are configured for constructing the virtual enclosure model using a building information model.

17. The apparatus of claim 16, wherein the building information model is a computer aided design paradigm that allows for intelligent, 3D and/or parametric object-based design.

18. The apparatus of claim 12, wherein the one or more controllers are configured for refining, or directing refinement of, the virtual enclosure model using the artificial intelligence engine.

19. The apparatus of claim 12, wherein the artificial intelligence engine is configured for modeling location of the one or more sensors, operation of the one or more sensors, spatial distribution of at least one property sensed by the one or more sensors, and/or evolution of at least one property sensed by the one or more sensors over time.

20. The apparatus of claim 19, wherein the artificial intelligence engine is configured for refining the modeling using predictive extrapolation.

* * * * *